US005699088A

United States Patent [19]

Isono et al.

[11] Patent Number: 5,699,088

[45] Date of Patent: Dec. 16, 1997

[54] RECORDING HEAD FOR A MAGNETIC PRINTER

[75] Inventors: Hitoshi Isono; Tetsuya Inui; Kenji Ohta; Junichiro Nakayama, all of Nara-ken, Japan

[73] Assignee: Sharp Kabushiki Kaisha, Osaka, Japan

[21] Appl. No.: 291,464

[22] Filed: Aug. 17, 1994

[30] Foreign Application Priority Data

Aug. 24, 1993 [JP] Japan .................................... 5-209359

[51] Int. Cl.$^{6}$ ............................ G11B 5/004; G11B 5/127

[52] U.S. Cl. ............................................ 346/74.5; 360/110

[58] Field of Search .................................. 346/74.2, 74.5; 360/59, 110, 119, 122

[56] References Cited

U.S. PATENT DOCUMENTS 4,520,409 5/1985 Kimoto et al. ............................ 360/59

FOREIGN PATENT DOCUMENTS 58-74362 5/1983 Japan .
62-65070 3/1987 Japan .
64-27961 1/1989 Japan .
3-154067 7/1991 Japan .

*Primary Examiner*—Benjamin R. Fuller
*Assistant Examiner*—Craig A. Hallacher
*Attorney, Agent, or Firm*—Nixon & Vanderhye P.C.

[57] ABSTRACT

A recording head for a magnetic printer utilizes a so-called magnetography, in which a magnetic latent image formed on a magnetic recording medium is developed and actualized by a magnetic toner and which image is transferred and fixed on a sheet of recording paper to provide a hard copy. The recording head for a magnetic printer includes a first thermal head member, second thermal head member juxtaposed with the first thermal head member with a space therebetween, and a magnetic head member arranged on the first and the second thermal head members. A magnetic gap of the magnetic head member extends immediately above the space between the first and the second thermal head members linearly in the same direction. By this structure, a recording head for a magnetic printer which has simple structure and allows formation of a magnetic latent image having clear boundary between opposite magnetic polarities on a magnetic recording medium, is provided.

30 Claims, 33 Drawing Sheets

RECORDING HEAD FOR A MAGNETIC PRINTER

BACKGROUND OF THE INVENTION

1. Field of the Invention

The present invention relates to a recording head for a magnetic printer and, more specifically, to a recording head for a magnetic printer having a simple structure and is capable of forming a magnetic latent image with clear boundary at which the magnetic polarity is inverted, on a magnetic medium.

2. Description of the Background Art

A magnetic printing method in which a magnetic latent image formed on a magnetic medium is developed by a magnetic toner into an actualized visual image, the visual image is transferred onto a sheet of recording paper and fixed thereon to provide a hard copy is generally referred to magnetography.

Magnetagraph has various advantages such as described below.

(1) It allows multiple copying as the magnetic latent image is maintained on the magnetic medium.

(2) Different from electrophotography, it has superior stability against changes in the environment.

(3) It allows high speed copying operation.

A magnetic printer disclosed in Japanese Patent Laying-Open No. 62-65070 and a magnetic printer disclosed in Japanese Patent Laying-Open No. 3-154067 have been known as magnetic printers utilizing magnetography of this type.

Referring to FIG. 37, the magnetic printer 300 disclosed in Japanese Patent Laying-Open No. 62-65070 includes a thermal head apparatus 302, a magnetic drum 303 on which a magnetic medium is provided, a developer 304, a transfer roller 305, a heater 306 as heating means, a cleaner 307, and an erasure head 308 for uniformly magnetizing the magnetic medium formed on the surface of magnetic drum 303. Magnetic toner 309 is contained in developer 304.

The operation of magnetic printer 300 will be described. First, by heating the magnetic medium formed on the surface of magnetic drum 303 near to a Curie point of the magnetic material forming the magnetic medium by thermal head apparatus 302, a magnetic latent image is formed. That portion of the magnetic medium at which the magnetic medium is heated near to the Curie point has its coercive force reduced or lost. Therefore, on the magnetic medium, a magnetic latent image magnetized in the opposite direction is formed by that portion of the magnetic medium which is not heated, around the heated portion.

Then, magnetic toner 309 is applied on the magnetic medium with the latent image formed, by developer 304. In this step, the magnetic latent image is developed and actualized to be a visible image, by magnetic toner 309.

The visible image formed on the surface of magnetic drum 303 is transferred by transfer roller 305 onto the sheet of recording paper 310. The visible image transferred to the sheet of recording paper 310 is heated by heater 306. In this step, resin included in magnetic toner 309 is melt and the visible image is fixed on the sheet of recording paper 310.

Excessive magnetic toner 309 which is not transferred onto the sheet of recording paper 310 but left on the surface of magnetic drum 303 is removed by cleaner 307.

If multiple copies are to be taken by using the same magnetic latent image, the magnetic toner 309 is again applied by using developer 304 on the same magnetic latent image formed through the steps described above, the magnetic latent image is actualized to be a visible image, transferred onto the sheet of recording paper 310, and fixed by heating, and these steps are performed repeatedly.

When another magnetic latent image is to be formed, the magnetic medium is magnetized uniformly by erasure head 308 to erase the previous magnetic latent image, and thereafter, a new magnetic latent image is formed on the magnetic medium on the surface of magnetic drum 303 by thermal head apparatus 302, magnetic toner 309 is applied by using developer 304 on the new magnetic latent image, the magnetic latent image is developed, actualized, transferred onto the sheet of paper 310, and the image is fixed by heating.

FIGS. 38 to 40 schematically show an example of the structure of a conventional thermal head provided on thermal head apparatus 302 for heating the magnetic recording medium on the surface of magnetic drum 303. Referring to FIGS. 38 to 40, the thermal head includes a substrate 401, a heat insulating layer 402 formed on the surface of substrate 401, a heating resistor 404 formed at a prescribed region on the surface of heat insulating layer 402, a plurality of conductor portions 403 formed on the surface of heating resistor 404, and a protective film 405 provided to cover the surface of heat insulating layer 402, the surface of heating resistor 404 and the surfaces of the plurality of conductor portions 402. The plurality of conductor portions 403 are provided linearly in a direction orthogonal to the rotation axis of magnetic drum 303, parallel to and spaced apart from each other by a prescribed narrow distance $W_{403}$.

Although there have been various types of thermal heads conventionally, basically the thermal head of this type includes, at least, a substrate 401, a conductor portion 403 formed on the surface of substrate 401, and a heating resistor 404 provided in relation to conductor portion 403. As a material of substrate 401, a nonmagnetic ceramics such as alumina ($Al_2O_3$) is generally used. As a material of heat insulating layer 402, glass is generally used. As a material of conductor portion 403, gold (Au) is generally used. As a material of heating resistor 404, $Ta_2N$ is generally used. As a material of protective film 405, $Ta_2O_5$ is generally used. When current is applied to each of the plurality of conductor portions 403, heating resistor 404 is heated. The portion of thermal head 400 at which heating resistor 404 is heated is pressed on the magnetic medium formed on the surface of magnetic drum 303, and thus a magnetic latent image is formed on the magnetic medium.

However, in the magnetic printer disclosed in Japanese Patent Laying-Open No. 62-65070 shown in FIGS. 37 to 40, the magnetic medium is heated near to the Curie point of the magnetic material forming the magnetic medium to decrease the coercive force of the heated portion, and the magnetic latent image is formed by the opposite magnetic force of the magnetic medium which is not heated. As a result, the boundary of the magnetic latent image is blurred, and in addition, since the magnetic attractive force is small, a clear visible image cannot be obtained even when the magnetic latent image is developed.

FIG. 41 is a schematic diagram showing the operation of the magnetic printer disclosed in Japanese Patent Laying-Open No. 3-154067. Referring to FIG. 41, the magnetic printer 500 basically has the same structure as the magnetic printer 300 shown in FIG. 37 except that it additionally includes an electromagnet 511 as magnetic bias means. More specifically, in magnetic printer 500, thermal head apparatus 302 of magnetic printer 300 shown in FIG. 37 corresponds to thermal head apparatus 502, magnetic drum 303 corresponds to magnetic drum 503, developer 304 corresponds to developer 504, transfer roller 305 corresponds to transfer roller 505, heater 306 corresponds to heater 506, cleaner 307 corresponds to cleaner 507, erasure head 308 corresponds to erasure head 508, and magnetic toner 309 corresponds to magnetic toner 509, respectively.

The thermal head (not shown) provided on the side which is pressed on the magnetic medium formed on magnetic drum 503 of thermal head apparatus 502 is similar to thermal head 400 described above, and therefore, description is not repeated.

In magnetic printer 500, electromagnet 511 as magnetic bias means is positioned opposite to thermal head apparatus 502, with the magnetic drum 503 having the magnetic medium formed thereon interposed. By this structure, when a magnetic latent image is formed on the magnetic medium formed on the surface of magnetic drum 503, a bias magnetic field is applied to the magnetic medium by electromagnet 511 while the magnetic medium is heated to a desired temperature by thermal head apparatus 502, and the magnetic latent image is formed on the magnetic medium.

Therefore, in such a magnetic printer as the magnetic printer 500 disclosed in Japanese Patent Laying-Open No. 3-154067 shown in FIG. 41, since magnetic bias is applied by electromagnet 511 while the magnetic latent image is formed on the magnetic medium, it is possible to form a magnetic latent image having clear boundary at which magnetic polarity is inverted. Consequently, by using the magnetic printer 500, a clear visible image can be transferred and fixed on a sheet of recording paper 510.

However, in a magnetic printer such as magnetic printer 500 disclosed in Japanese Patent Laying-Open No. 3-154067, the structure of magnetic printer 500 itself becomes complicated, as thermal head apparatus 502 and electromagnet 511 as magnetic bias means are positioned opposite to each other, sandwiching magnetic drum 503.

Further, in this type of magnetic printer, the distance between electromagnet 511 and the magnetic medium formed on the surface of magnetic drum 503 is considerably long, resulting in increased power consumption of magnetic printer 500. More specifically, in such a magnetic printer as magnetic printer 500, bias magnetic field is applied to magnetic medium formed on the surface of magnetic drum across a non-magnetic medium, for example, aluminum, forming the magnetic drum.

Japanese Patent Laying-Open Nos. 58-74362 and 64-27961 disclose conventional magnetic heads for printers in which the magnetic head and the thermal head are integrated. Of this, a magnetic head 601 for the printer disclosed in Japanese Patent Laying-Open No. 58-74362 includes a heating resistor 604 fitted in a magnetic gap portion formed at a portion to which bias magnetic field is applied, of the magnetic head core 603 provided with a coil 2. A lead wire 605 is connected to heating resistor 604 through an electrode 607, and that surface of heating resistor 604 to which electrode 607 is connected is covered by an overcoat glass layer 606.

Referring to FIG. 43, the magnetic head for the printer disclosed in Japanese Patent Laying-Open No. 64-27961 includes a thermal head interposed in magnetic gap G of a yoke 701. The thermal head includes a substrate 703, a flexible print substrate 702 and a heater 704 with the tip end of yoke 701 and an end surface of substrate 703 are aligned approximately at the same position. FIG. 43 shows a state in which the tip end of heater 704 is in contact, through protective layer 705, with the surface of magnetic layer 706 formed on the outer periphery of a drum 708 with a heat insulating layer 707 interposed.

Though the magnetic heads for printers disclosed in Japanese Patent Laying-Open Nos. 58-74362 and 64-27961 having the above described structures respectively include integrated magnetic head and thermal head, these magnetic heads suffer from the following problems.

First, in the magnetic head for a printer disclosed in Japanese Patent Laying-Open No. 58-74362 shown in FIGS. 42A and 42B, since the heating resistor is provided at the gap portion of the bulk type magnetic head for applying external magnetic field, it is necessary to ensure a relatively large gap width to obtain sufficient heat, while it is difficult to reduce cross sectional area of the gap portion of the yoke as the heat resistor is provided there and it must have certain strength. Since the gap width cannot be made narrower, the area to which external magnetic field is applied cannot be reduced, and therefore, the applied magnetic field cannot be used but as the bias magnetic field for thermal input to the magnetic recording medium. Further, it is possible that the external magnetic field is applied to areas other than the area of thermal input, causing demagnetization of the magnetic recording medium and reduction of magnetic attractive force. Further, since the cross sectional area of the gap portion cannot be reduced, power consumption inevitably increases if larger magnetic field is to be generated.

In the magnetic head for a printer disclosed in Japanese Patent Laying-Open No. 64-27961 shown in FIG. 43, at the gap portion of a bulk type magnetic head for applying external magnetic field, a substrate of the thermal head is interposed and the heating resistor is positioned at the tip end thereof. Therefore, it is naturally difficult to make the gap width narrower and to reduce cross sectional area of the gap portion. Therefore, there are similar problems as the magnetic head for a printer disclosed in Japanese Patent Laying-Open No. 58-74362 described above.

SUMMARY OF THE INVENTION

An object of the present invention is to provide a recording head for a magnetic printer enabling formation of a magnetic latent image having clear boundary between opposite magnetic polarities on a magnetic recording medium by a simple structure with small power consumption.

The above described object is attained by a recording head for a magnetic printer in accordance with a first aspect of the present invention which includes a first thermal head member, a second thermal head member juxtaposed with the first thermal head member with a linearly extending prescribed space therebetween, and a magnetic head member having a magnetic gap positioned on the first and the second thermal head members, and at immediately above the space between the first and second thermal head members, extending linearly in the same direction as the space.

According to this structure, since the magnetic gap of the magnetic head member extends, immediately above the space between the first and second thermal head members, linearly in the same direction as the space, the space between the first and the second thermal head members can effectively serve as the magnetic gap, and through this gap, the bias magnetic field can be uniformly generated at the magnetic recording medium.

In a preferred embodiment of the recording head for a magnetic printer, the first and the second thermal head members and the magnetic head member are formed integrally, sharing some of the components.

By such a structure, near the magnetic recording medium formed on the surface of the magnetic drum, the magnetic head member applying magnetic force to the magnetic recording medium as well as the thermal head member for thermal input can be positioned. As a result, efficiency of magnetic force application and thermal input to the magnetic medium can be improved, the power consumption can be reduced, and the structure of the magnetic printer apparatus can be simplified.

Further, according to the recording head for a magnetic printer having the above described structure, the gap portion is formed in advance on the thermal head and the thermal head itself is used as a part of the magnetic circuit, and therefore the gap width can be significantly reduced as compared with the prior art. Consequently, the area to which the generated magnetic field is applied can be reduced, and the external magnetic field is not applied to the magnetic recording medium in the area which does not receive thermal input. Therefore, demagnetization of the magnetic recording medium can be prevented. Since the area to which the generated magnetic field is applied can be reduced, magnetic recording using the thermal input by the thermal head as thermal bias becomes possible. Further, since the cross sectional area of the gap portion is determined by the cross sectional shape of the magnetic thin film used for forming the thermal head, the cross sectional area can be significantly reduced as compared with the prior art. As a result, power consumption can be reduced and larger magnetic field can be generated.

In another preferred embodiment of the recording head for a magnetic printer, the first thermal head member has a first substrate formed of a magnetic material, a first conductor portion formed thereon and a first heating member which radiates heat when electric current is applied to the first conductor portion, while the second thermal head member has a second substrate formed of a magnetic material, a second conductor portion formed thereon, and a second heating member which radiates heat when electric current is applied to the second conductor portion. The magnetic head member has a structure including first and second substrates formed of magnetic material, with the space therebetween used as the magnetic gap. Such a structure realizes integration of the first and the second thermal head members and the magnetic head member.

First and second heating resistors bonded to the first and second conductor portions, respectively, for example are used as the first and the second heating members. This heating resistors may be formed to be bonded to the surfaces of the first and the second conductor portions and continuous at the space between the first and second conductor portions.

In a preferred embodiment, the first and the second heating resistors have a plurality of convex portions having generally semicircular cross section. As the first and second heating resistors have such a cross sectional shape, the convex portion of each heating resistor can be pressed onto the magnetic medium with larger pressure and high efficiency when the recording head for the magnetic printer is pressed on the magnetic medium, and as a result, a magnetic latent image having clear boundary of opposite magnetic polarities can be formed on the magnetic medium.

In order to obtain desired recording characteristics in the recording head for a magnetic printer described above, the thickness of the magnetic substrate should preferably be in the range of from 2 mm to 5.0 mm. The thickness of the heat insulating layer should preferably be in the range of from 20 μm to 200 μm. Further, the thickness of the first and second conductor portions should preferably be in the range of from 0.2 μm to 2.0 μm.

As the material of the magnetic substrate, a soft magnetic material selected from the group consisting of permalloy, Fe-Si alloy, Fe-Co alloy, Fe-Ni-Co alloy, Ni-Co alloy, Mn-Zn ferrite, Ni-Zn ferrite, Mg-Zn ferrite, Mg-Mn ferrite, sendust and amorphous magnetic body may be used. As the material of the heat insulating layer, a material having low thermal conductivity selected from the group consisting of glass, polyimide, aromatic polyimide and polybenzimidazole may be used. As the material of the conductor portion, a good electric conductor selected from Au, Pt, Cu, for example, is used. As the material of the first and second heating resistors, any of $Ru_2O$ resistance paste, Ta-Si alloy, Ta-$SiO_2$, Ta-Si-C, $Ta_2N$, Ni-Cr alloy, Cr-Si-O and ZnN is used.

According to another aspect of the present invention, a magnetic head for a magnetic printer includes a first substrate having a first main surface and a second, rear main surface; a first magnetic film formed on the first surface of the first substrate; a first conductor portion formed on the second surface of the first substrate; a second substrate juxtaposed with the first substrate with a space therebetween and having third and fourth main surfaces respectively corresponding to the first and second main surfaces of the first substrate; a second magnetic film formed on the third main surface of the second substrate; a second conductor portion formed on the fourth main surface of the second substrate; a first heating member which radiates heat when electric current is applied to the first conductor portions; and a second heating member which radiates heat when electric current is supplied to the second conductor portion. The aforementioned first substrate, the first conductor portion and the first heating member constitute the first thermal head member, while the aforementioned second substrate, the second conductor portion and the second heating member constitute the second thermal head member. The first and second magnetic films constitute the magnetic head member with the space.therebetween serving as the magnetic gap.

According to the recording head for the magnetic printer having such a structure, since the magnetic head member is constituted by the first and second magnetic films formed on the first main surfaces of the first and second substrate, sufficient mechanical strength can be ensured by the first and second substrates. Therefore, the first and second magnetic films constituting the magnetic head member can be made thin, as a result, the magnetic field which leaks from the magnetic gap portion of the magnetic head member can be enhanced, and the boundary between opposite magnetic polarities on the magnetic recording surface can be made more clear.

As the material of the first and second substrates, a non-magnetic ceramics, for example, may be used. Preferably, the first and second substrates have the thickness in the range of 0.2 mm to 5.0 mm.

A recording head for a magnetic printer in accordance with a third aspect of the present invention includes a substrate having a first main surface and a second rear main surface; a first magnetic film formed on the first main surface; a second magnetic film formed on the first main surface juxtaposed with the first magnetic film with a space therebetween; a first conductor portion formed corresponding to the first magnetic film on the second main surface; a second conductor portion formed corresponding to the second magnetic film on the second main surface, spaced from the first conductor portion; a first heating member which radiates heat when electric current is applied to the first conductor portion; and a second heating member which radiates heat when electric current is applied to the second conductor portion. The aforementioned substrate, the first conductor portion and the first heating member constitute the first thermal head member, while the aforementioned substrate, the second conductor portion and the second heating member constitute the second thermal head member. The first and second magnetic films constitute the magnetic head member, with the space therebetween serving as the magnetic gap. The space between the first and second magnetic film is arranged extending, immediately above the space between the first and second conductor portions, in the same direction as the space.

In the recording head for the magnetic printer having this structure, since the first and second magnetic films and first and second conductor portions are formed on the front and rear main surfaces of one substrate, the mechanical strength at the space between the first and second thermal head members can be further improved than the recording head for the magnetic printer in accordance with the second aspect described above. Since the first and second thermal head members and the magnetic head member are formed by performing thin film forming process on the front and rear main surfaces of one substrate, higher precision in dimension can be readily obtained as compared with the recording head for a magnetic printer in accordance with the first and second aspects above in which a pair of members formed in a line are bonded together.

As for the material of the substrate of the recording head for a magnetic printer in accordance with this aspect, similar materials as for the first and second substrates in the recording heads for a magnetic printer in accordance with the second aspect above may be employed. Other structures are similar to the corresponding ones of the recording head for a magnetic printer in accordance with the first or second aspect.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

A first embodiment of the present invention will be described with reference to FIGS. 1 to 9.

Figure 1:
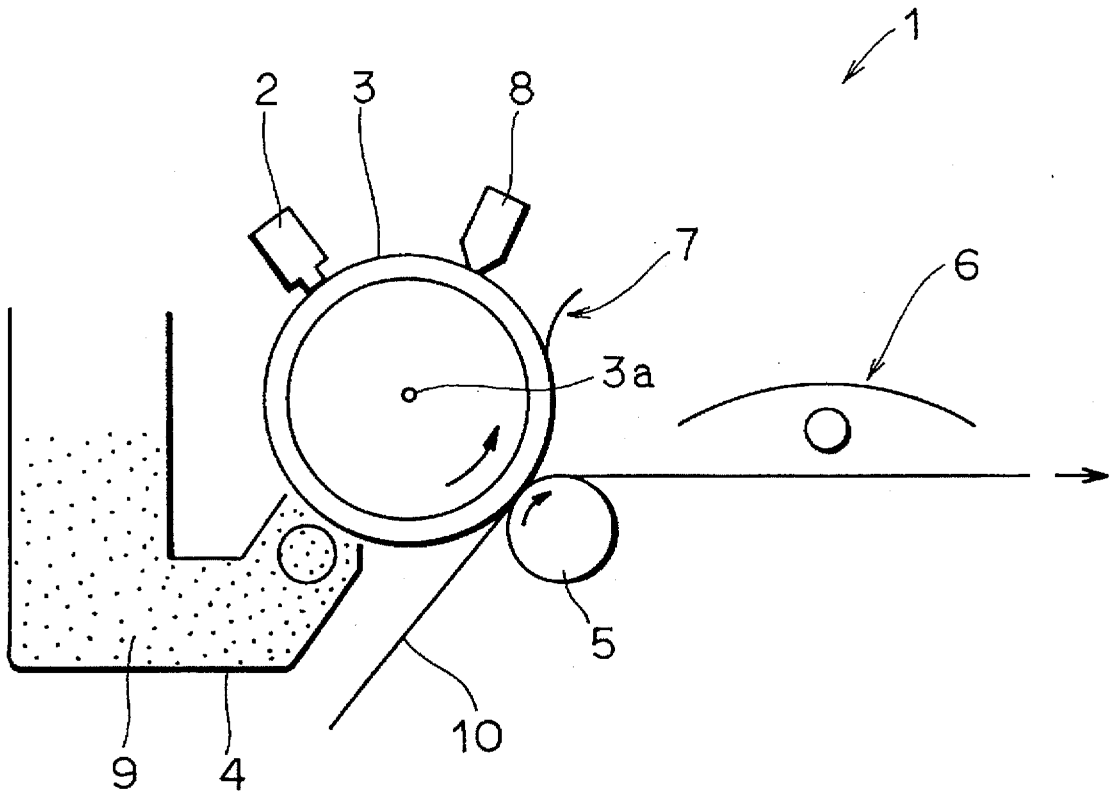
FIG. 1 is a schematic diagram showing the operation of a magnetic printer employing a recording head for a magnetic printer in accordance with the present invention.

Referring to FIG. 1, a magnetic printer 1 of the present embodiment includes a magnetic recording head apparatus 2 having a recording head (not shown) for magnetic printer in accordance with the present invention; a magnetic drum 3 having a magnetic medium as magnetic recording medium formed on its surface; a developer 4; a transfer roller 5; a heater 6 as heating means; a cleaning blade 7 as means for removing magnetic toner left on the magnetic medium formed on the surface of magnetic drum 3; and an erasure head 8 for uniformly magnetizing the magnetic medium formed on the surface of magnetic drum 3. Developer 4 contains magnetic toner 9.

The operation of magnetic printer 1 will be described.

First, by magnetic recording head apparatus 2, a magnetic latent image is formed on the magnetic medium formed on the surface of magnetic drum 3. In this step, the magnetic latent image is formed by the first and/or second thermal head member and the magnetic head member, constituting the recording head for a magnetic printer in accordance with the present invention of the magnetic recording head apparatus 2, as will be described later.

Thereafter, magnetic toner 9 is applied by developer 4 to the surface of magnetic drum 3 provided with the magnetic medium, on which the magnetic latent image has been formed. In this step, the magnetic latent image is developed by the magnetic toner and actualized to be a visible image.

Thereafter, the visible image formed on the surface of magnetic drum 3 is transferred, by transfer roller 5, to a sheet of recording paper 10. The visible image which has been transferred onto the sheet of paper 10 is heated by heater 6. In this step, resin included in magnetic toner 9 melts, and the visible image is fixed on the sheet of recording paper 10. Excessive magnetic toner 9 which has not been transferred onto the sheet of recording paper 10 but left on the surface of magnetic drum 3 is removed by cleaning blade 7.

When a so called multiple copies are to be taken by using the same magnetic latent image, magnetic toner 9 is again applied by developer 4 to the same magnetic latent image formed through the above described steps, the magnetic latent image is developed, actualized, transferred onto the sheet of recording paper 10, heated and fixed, and these steps are repeated. When another magnetic latent image is to be formed, the magnetic medium is uniformly magnetized by erasure head 8 to erase the previous magnetic latent image, a new magnetic latent image is formed on the magnetic medium of magnetic drum 3 by magnetic recording head apparatus 2, thereafter, magnetic toner 9 is applied by developer 4 to the new magnetic latent image, the magnetic latent image is developed, actualized, transferred onto the sheet of recording paper 10, and heated to be fixed.

Figure 2:
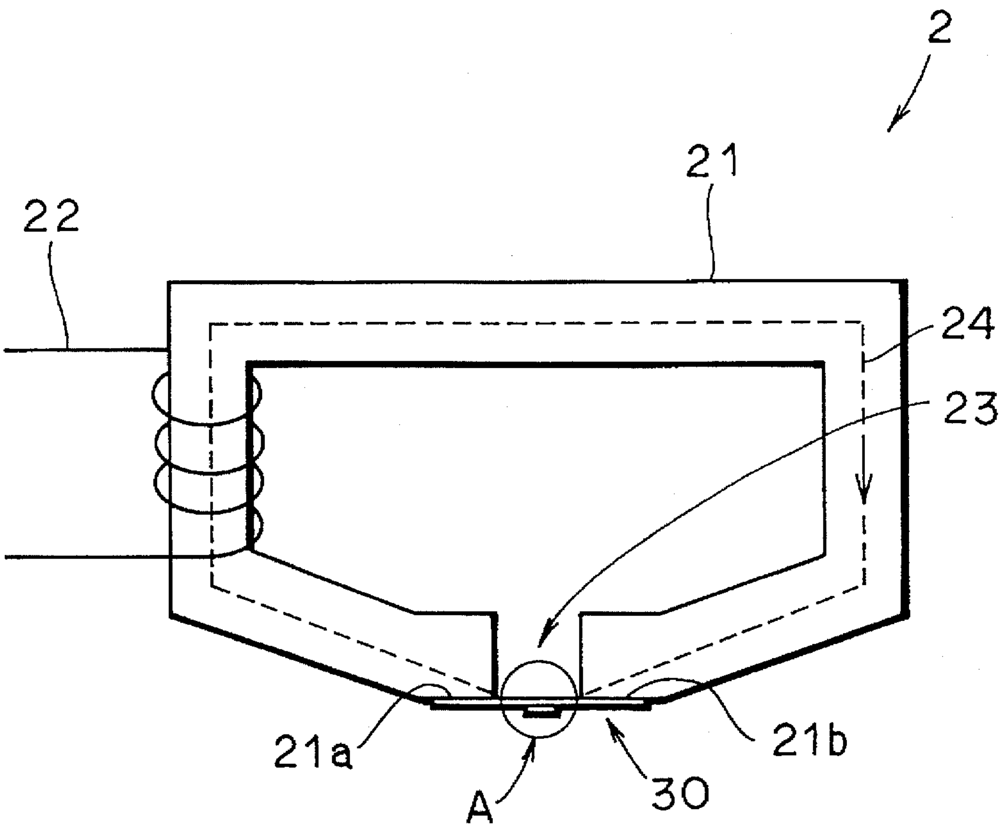
FIG. 2 is a cross section showing in enlargement, a cross section taken along the direction orthogonal to the rotation axis 3a of a magnetic drum 3 of the magnetic recording head apparatus 2 of FIG. 1.

Referring to FIG. 2, magnetic recording head apparatus 2 includes a core portion 21, a coil 22 and a recording head 30 for a magnetic printer. Coil 22 is wound around a prescribed position of core portion 21. Core portion 21 has an air gap portion 23 at a prescribed position. Recording head 30 for magnetic printer is provided at a surface on a side which is pressed onto the surface of the magnetic medium formed on the surface of magnetic drum 3, at the region of air gap portion 23 of core portion 21. As the material of core portion 21, magnetic material such as permalloy, Fe-Si alloy, Fe-Co alloy, Fe-Ni-Co alloy, Ni-Co alloy, Mn-Zn ferrite, Ni-Zn ferrite, Mg-Zn ferrite, Mg-Mn ferrite, sendust, amorphous magnetic body may be used.

When a current is applied to coil 22, there is generated a magnetic flux 24 in core portion 21. Magnetic flux 24 also flows in recording head 30 for magnetic printer and, as will be described later, leaks from the magnetic gap portion of recording head 30 for the magnetic printer.

Figure 3:
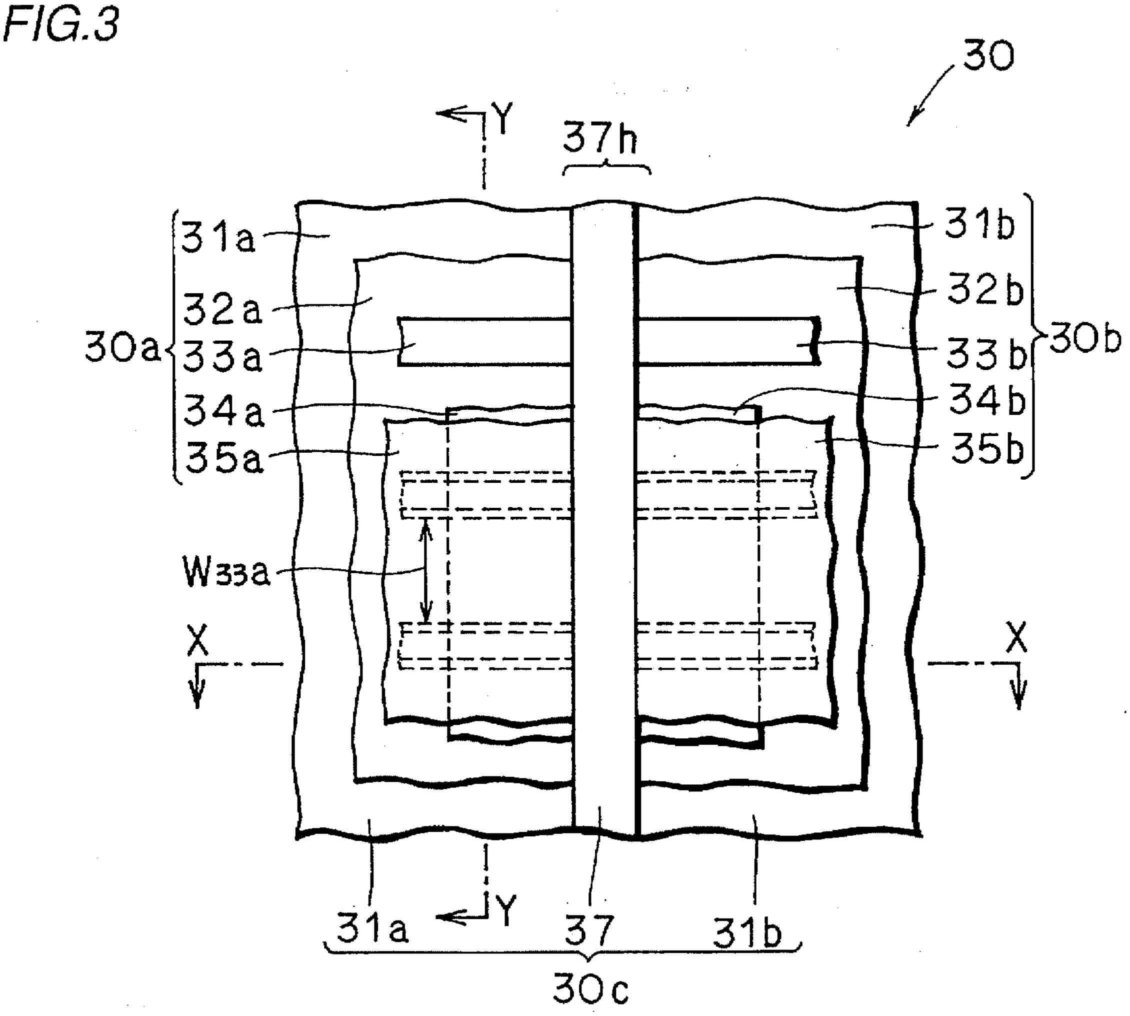
FIG. 3 is a plan view showing schematically the surface which is pressed onto the surface of the magnetic drum, viewed from the direction orthogonal to the rotation axis of the magnetic drum, of the recording head for a magnetic printer in accordance with the first embodiment of the present invention.
Figure 4:
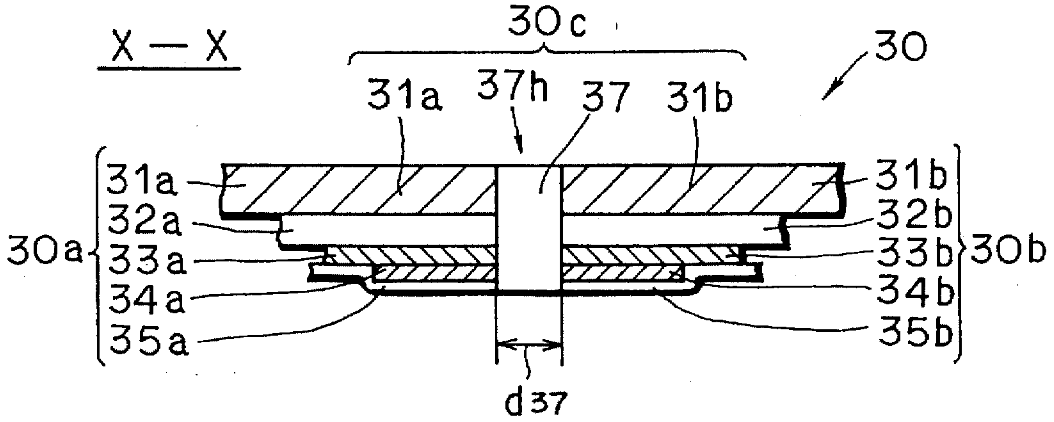
FIG. 4 schematically shows a cross section taken along the line X—X of the recording head for a magnetic printer shown in FIG. 3.
Figure 5:
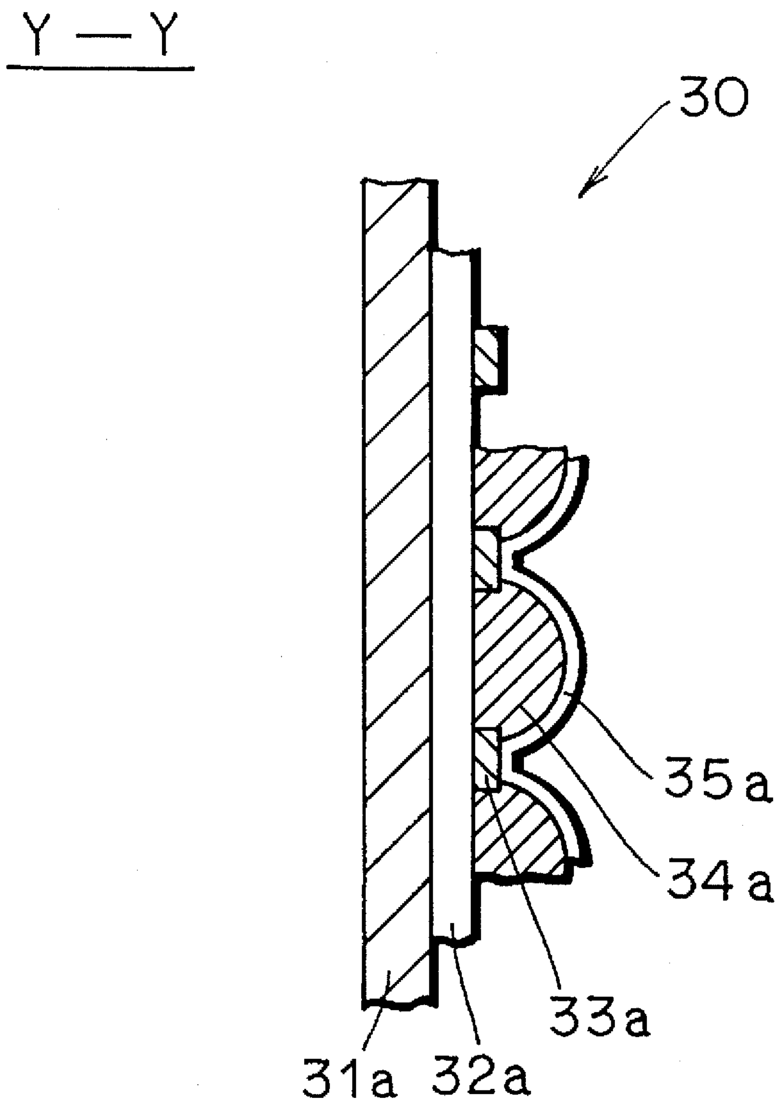
FIG. 5 schematically shows a cross section .taken along the line Y—Y of the recording head for a magnetic printer shown in FIG. 3.

The structure of the recording head 30 for a magnetic printer will be described. FIGS. 3 to 5 schematically show in enlargement with some portions omitted, the portion A of recording head 30 for the magnetic printer shown in FIG. 2.

Referring to FIGS. 3 to 5, recording head 30 for magnetic printer includes a first thermal head members 30*a*, a second thermal head member 30*b*, and a magnetic head member 30*c*. The first and second thermal head members 30*a* and 30*b* have the structure of a generally called thick film type thermal head. The second thermal head members 30*b* is juxtaposed with and spaced from the first thermal head member 30*a* by a prescribed space 37*h*. In space 37*h*, a non-magnetic layer 37 is provided.

The first thermal head member 30*a* includes a magnetic substrate 31*a*, a heat insulating layer 32*a* formed on the surface of magnetic substrate 31*a*, a plurality of conductor portions 33*a* formed on the surface of heat insulating layer 32*a*, a heating resistor 34*a* formed at a prescribed region to cover the surface of heat insulating layer 32*a* and the surfaces of the plurality of conductor portions 33*a*, and a protective layer 35*a* for covering the surface of heat insulating layer 32*a*, the surfaces of the plurality of conductor portions 33*a* and the surface of the heating resistor 34*a*.

The plurality of conductor portions 33*a* are formed in a line in the direction orthogonal to the rotation axis 3*a* of magnetic drum 3, that is, in the direction of the tracks on the surface of magnetic drum 3, parallel to and space by a prescribed narrow space $W_{33a}$ from each other.

The second thermal head member 30*b* has similar structure as the first thermal head member 30*a*. More specifically, in the second thermal head member 30*b*, magnetic substrate 31*a* of the first thermal head member 30*a* corresponds to magnetic substrate 31*b*; heat insulating layer 32*a* corresponds to a heat insulating layer 32*b*; a plurality of conductor portion 33*a* correspond to a plurality of conductor portion 33*b*; heating resistor 34*a* corresponds to a heating resistor 34*b*; and protective film 35*a* corresponds to a protective film 35*b*, respectively. The plurality of conductor portions 33*a* provided on the side of magnetic substrate 31*a* and the plurality of conductor portions 33*b* provided on the side of magnetic substrate 31*b* are arranged such that corresponding pair of conductor portions are arranged spaced apart by a prescribed space 37*h* extending in a direction parallel to the rotation axis of rotation drum 3, in a line in a direction approximately orthogonal to the non-magnetic layer 37.

In recording head 30 for a magnetic printer, the heating member provided in relation to the plurality of conductor portions 33*a* and the plurality of conductor portions 33*b* includes a heating resistor 34*a* provided on the side of magnetic substrate 31*a* in relation to the plurality of conductor portions 33*a*, and a heating resistor 34*b* provided on the side of magnetic substrate 31*b* in relation to the plurality of conductor portions 33*b*. Further, by at least the magnetic substrates 31*a* and 31*b*, magnetic head member 30*c* is formed. The space 37*h* between magnetic substrates 31*a* and 31*b* serves as the magnetic gap of magnetic head member 30*c*.

As is apparent from FIGS. 3 to 5, the space 37*h* as the magnetic gap portion of magnetic head member 30*c* extends, immediately above the space 37*h* between the plurality of conductor portions 33*a* of the first thermal head member 30*a* and the plurality of conductor portions 33*b* of the second thermal head member 30*b*, linearly and parallel to the space. Therefore, the space between the plurality of conductor portions 33*a* and the plurality of conductor portions 33*b* serving as the magnetic gap as part of the magnetic circuit is kept constant, so that it can effectively serve as the magnetic gap, and generates uniform bias magnetic field.

In recording head 30 for a magnetic printer, in the space 37*h* between the first and second thermal head numbers 30*a* and 30*b*, the non-magnetic layer 37 is provided, and by this non-magnetic layer 37, the first and the second thermal head members 30*a* and 30*b* are bonded together. As a result, the first thermal head member 30*a*, the second thermal head member 30*b* and the magnetic head member 30*c* are integrated.

As the material of magnetic substrates 31*a* and 31*b*, soft magnetic material such as permalloy, Fe-Si alloy, Fe-Co alloy, Fe-Ni-Co alloy, Ni-Co alloy, Mn-Zn ferrite, Ni-Zn ferrite, Mg-Zn ferrite, Mg-Mn ferrite, sendust, amorphous magnetic body may be used. Preferably, the thickness should be in the range of from about 0.2 mm to about 5.0 mm.

As the material of heat insulating layers 32*a* and 32*b*, materials having low thermal conductivity such as glass, polyimide, aromatic polyimide, polybenzimidazole may be used, and the thickness thereof should preferably be in the range of about 20 μm to about 200 μm.

As the material of conductor portions 33*a* and 33*b*, good electric conductor such as Au, Pt, Cu may be used, and the thickness thereof should preferably be in the range of from about 0.2 μm to about 2.0 μm.

As the material of heating resistors 34*a* and 34*b*, an $Ru_2O$ resistance paste may be used, for example, and the thickness should preferably be in the range of from 1.0 μm to about 10.0 μm.

As the material of protective films 35*a* and 35*b*, $Ta_2$, $O_5$, $Si_3N_4$, SiC, $SiC_2$, BN or the like, for example, may be used. An insulating glass material such as $SiO_2$ may be used as the material of non-magnetic layer 37.

As is apparent from FIGS. 3 to 5, in recording head 30 for a magnetic printer, a plurality of conductor portions 33*a* and 33*b* are provided respectively in contact with the non-magnetic layer 37, and non-magnetic layer 37 prevents short-circuit of each of the plurality of conductor portions 33*a* and 33*b*.

The width (gap length) $d_{37}$ of the space 37*h* between the first and the second thermal head members 30*a* and 30*b* should preferably be about 0.1 μm to about 3.0 μm.

When current is applied to each of the plurality of conductor portions 33*a* and 33*b*, heating resistor 34*a* provided on the side of magnetic substrate 31*a* in relation to the plurality of conductor portions 33*a* and heating resistor 34*b* provided on the side of magnetic substrate 31*b* in relation to the plurality of conductor portions 33*b* are heated, respectively. Heated portions of heating resistors 34*a* and 34*b* of recording head 30 for the magnetic printer are pressed onto the magnetic medium formed on the surface of magnetic drum 3 with protective films 35*a* and 35*b* interposed, and thus a magnetic latent image is formed on the magnetic medium.

In recording head 30 for the magnetic printer, when a magnetic latent image is formed on the magnetic medium formed on the surface of magnetic drum 3, bias magnetic field can be applied to the magnetic medium by magnetic head member 30*c*. When a magnetic latent image is formed by using magnetic head member 30*c* on the magnetic medium formed on the surface of magnetic drum 3, thermal bias by the first thermal head member 30*a* and/or the second thermal head member 30*b* can be applied. Therefore, recording head 30 for the magnetic printer can form a magnetic latent image having clear boundary between opposite magnetic polarities, on the magnetic medium.

In recording head 30 for a magnetic printer, magnetic substrate 31*a* is shared as a component of the first thermal head member 30*a* and magnetic head member 30*c*, while the magnetic substrate 31*b* is shared as a component of the second thermal head 30*b* and magnetic head member 30*c*. More specifically, in recording head 30 for the magnetic printer, the first and the second thermal head members 30*a* and 30*b* are parts of the magnetic circuit of magnetic head member 30*c*. Therefore, the recording head 30 for the magnetic printer has a simple structure.

Again referring to FIG. 5, in recording head 30 for the magnetic printer, on the surface of magnetic substrate 31*a*, heating resistor 34*a* provided in relation to the plurality of conductor portions 33*a* has a plurality of convex portions each having approximately semicircular cross section, in the direction along the line Y—Y.

Since the structure of heating resistor 34*b* provided in relation to the plurality of conductor portions 33*b* on the surface of magnetic substrate 31*b* of recording head 30 for the magnetic printer is the same as that of heating resistor 34*a*, description thereof is not repeated.

In recording head 30 for the magnetic printer, since heating resistors 34*a* and 34*b* have a structure including a plurality of convex portions each having approximately semicircular cross section in the direction along the line Y—Y, it is possible to press the surface of recording head 30 for the magnetic printer strongly and/or efficiently onto the magnetic medium, enabling formation of a magnetic latent image having clear boundary between opposite magnetic polarities on the magnetic medium.

The steps for forming a magnetic latent image on the magnetic medium formed on the surface of magnetic drum 3 by using the magnetic head apparatus 2 shown in FIG. 1 will be described with reference to FIG. 6.

Magnetic drum 3 has on its surface a magnetic medium 12, and to the surface of magnetic medium 12, recording head 30 for a magnetic printer is pressed. A pair of lead wires are provided to be connected to the plurality of conductor portions 33*a* and the plurality of conductor portions 33*b* of recording head 30 for the magnetic printer, respectively.

Of the pair of lead wires provided connected to each of the plurality of conductor portions 33*a*, only one lead line 23*a* is shown, and the other lead wire is not shown. Similarly, of the pair of lead wires connected to each of the plurality of conductor portions 33*b*, only one lead wire 23*b* is shown and the other lead wire is not shown.

Figure 6:
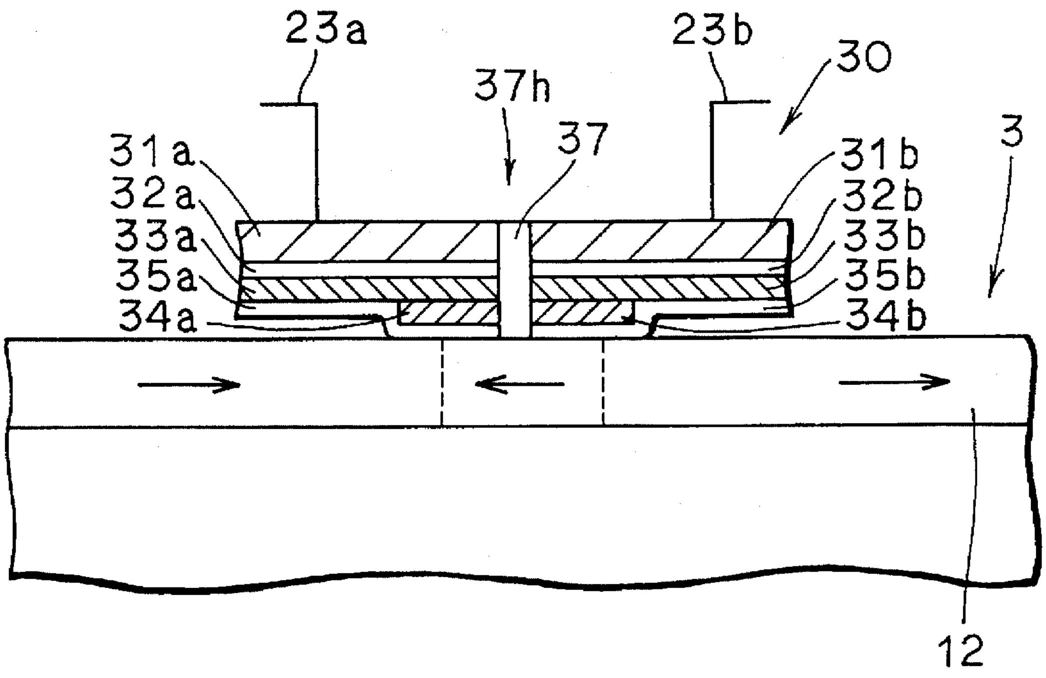
FIG. 6 is a cross section schematically showing in enlargement, the step of forming a magnetic latent image on a magnetic medium formed on the surface of the magnetic drum, by using the magnetic recording head apparatus 2 shown in FIG. 1.

Magnetic substrates 31*a* and 31*b* of recording head 30 for the magnetic printer shown in FIG. 6 are provided to be connected to core portion 21, as shown in FIG. 2. A hard magnetic material such as $\gamma Fe_2O_3$, $Fe_3O_4$, Fe-Co alloy, Gd-Co alloy, Gd-Fe alloy, $CrO_2$, Co-Ni alloy, Co-Ni-P alloy or the like may be used as the material of magnetic medium 12.

Referring to FIGS. 2 to 6, the operation of the recording head 30 for the magnetic printer is as follows.

First, current is applied to respective ones of the plurality of conductor portions 33*a* and 33*b* through pairs of lead wires connected to the conductor portions respectively. As current is applied to the plurality of conductor portions 33*a* and 33*b*, heating resistors 34*a* and 34*b* are heated. The temperature of the heated portion of the heating member (which heating member includes heating resistors 34*a* and 34*b*) provided in relation to the plurality of conductor portions 33*a* and 33*b* is adjusted and set to be accordant with the Curie temperature of the magnetic material forming the magnetic medium 12. For example, when $CrO_2$ is used as the material of magnetic medium 12, the temperature should be set to about 120°, which is the Curie temperature of $CrO_2$.

In this manner, first, a magnetic latent image is formed on magnetic medium 12 by the first and the second thermal head members 30*a* and 30*b* of recording head 30 for the magnetic printer. Referring to FIGS. 2 and 6, when a current is applied to coil 22 simultaneously with this step, a magnetic flux 24 is generated in core portion 21. The magnetic flux 24 flows through magnetic substrates 31*a* and 31*b*, leaks from the space (magnetic gap) 37*h* between magnetic substrates 31*a* and 31*b*, and a bias magnetic field is applied to magnetic medium 12.

An example in which a magnetic latent image is formed on magnetic medium 12 by using the first and the second thermal head members 30*a* and 30*b* of recording head 30 for the magnetic printer and simultaneously a bias magnetic field is applied by magnetic head member 30*c* has been described above. However, the method of forming a magnetic latent image on magnetic medium 12 is not limited to the example above. For example, a magnetic latent image may be formed on the magnetic medium 12 by magnetic head member 30*c* constituted, at least, by magnetic substrates 31*a* and 31*b* of recording head 30 for the magnetic printer and at the same time, a magnetic latent image may be formed by applying thermal bias to the magnetic medium 12 by the first and the second thermal head members 30*a* and 30*b*.

A method of manufacturing recording head 30 for the magnetic printer will be described with reference to FIGS. 7A to 7C.

Figure 7A:
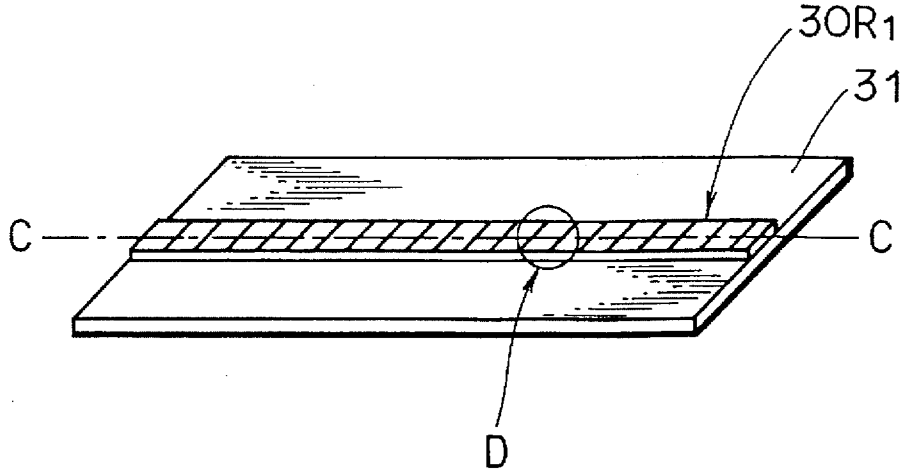
FIGS. 7A, 7B and 7C are perspective views schematically showing the steps of manufacturing the recording head for a magnetic printer in accordance with the present invention.

First, in the step shown in FIG. 7A, a magnetic substrate 31 is prepared, and an aggregate $\mathbf{30R_1}$, of thermal head units in which a number of thermal head units are aggregated and formed integrally is provided on the surface of magnetic substrate 31.

Figure 8:
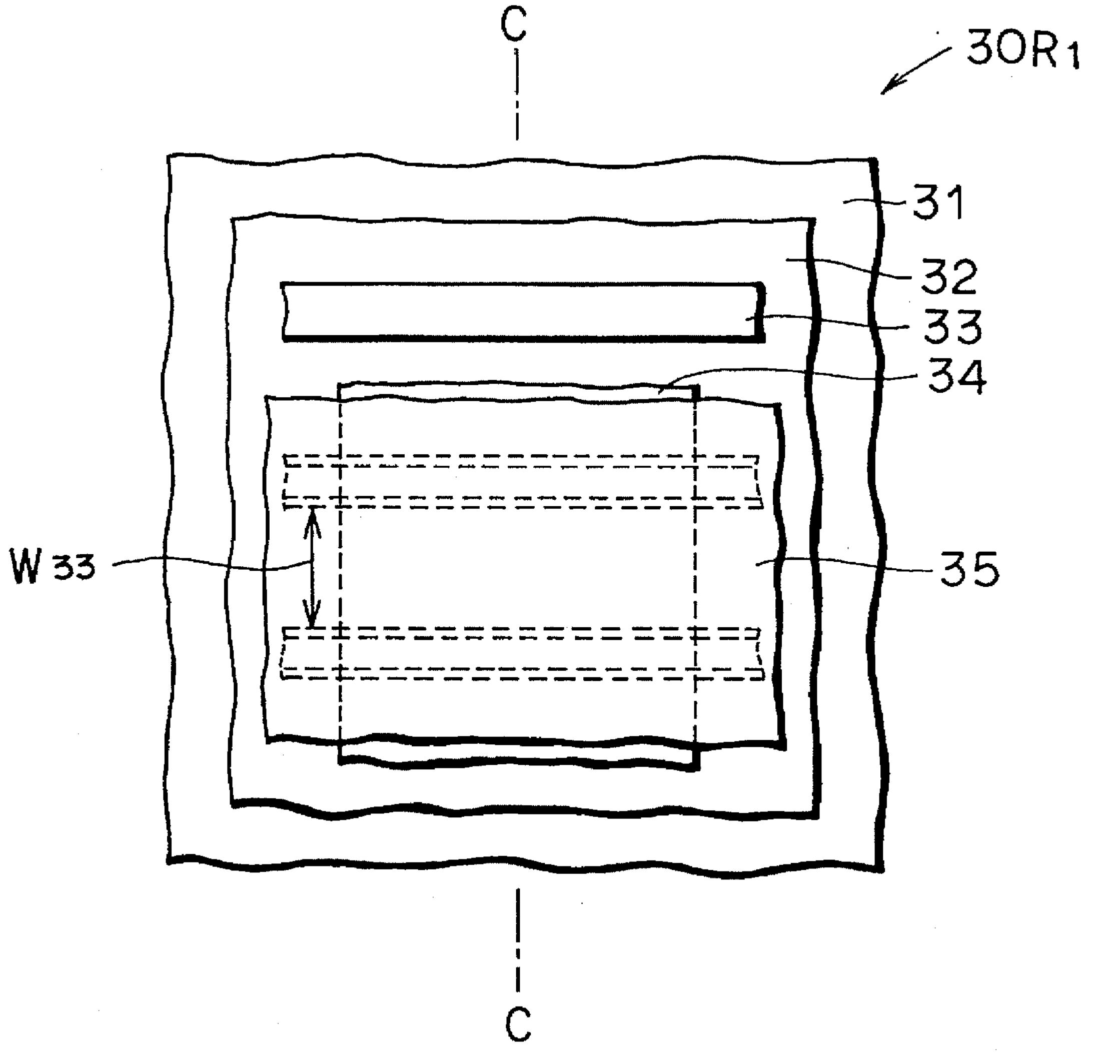
FIG. 8 is a plan view schematically showing, in enlargement, a portion of an aggregate of thermal head units manufactured in the step of FIG. 7A.

Referring to FIG. 8, the aggregate $\mathbf{30R_1}$ of thermal head units includes a magnetic substrate 31, a heat insulating.layer 32 formed on the surface of magnetic substrate 31, a plurality of conductor portions 33 formed on the surface of heat insulating layer 32, a heating resistor 34 formed at a prescribed region to cover the surface of heat insulating layer 32 and the surfaces of the plurality of conductor portions 33, and a protective film 35 provided to cover the surface of heating insulating layer 32, the surfaces of the plurality of conductor portions 33 and the surface of heating resistor 34. The plurality of conductor portions 33 are provided linearly, parallel to each other and space by a prescribed narrow space $W_{33}$ from each other, in a direction orthogonal to the central line (the line C—C shown in FIG. 7A).

In the step shown in FIG. 7A, the aggregate 30$R_1$ of thermal head units is formed with the center line (the line C—C of FIG. 7A) of magnetic substrate 31 used as the center, for convenience of assembly of the magnetic recording head apparatus 2 such as shown in FIG. 2.

In the step shown in FIG. 7A, except that the magnetic substrate 31 is used as the substrate, the aggregate 30$R_1$ of thermal head units can be formed through the conventional method of manufacturing a thermal head. More specifically, the aggregate 30$R_1$ of the thermal head units can be formed by the method of forming microstructures applying patterning technique of semiconductor processing, that is, combination of steps of lithography, etching, deposition of thin film and so on. After the magnetic substrate 31 is prepared, the aggregate 30$R_1$ of thermal head units is formed such that heat insulating layer 32, the plurality of conductor portions 33, heating resistor 34 and protective film 35 are laminated in this order on the surface of magnetic substrate 31.

Figure 7B:
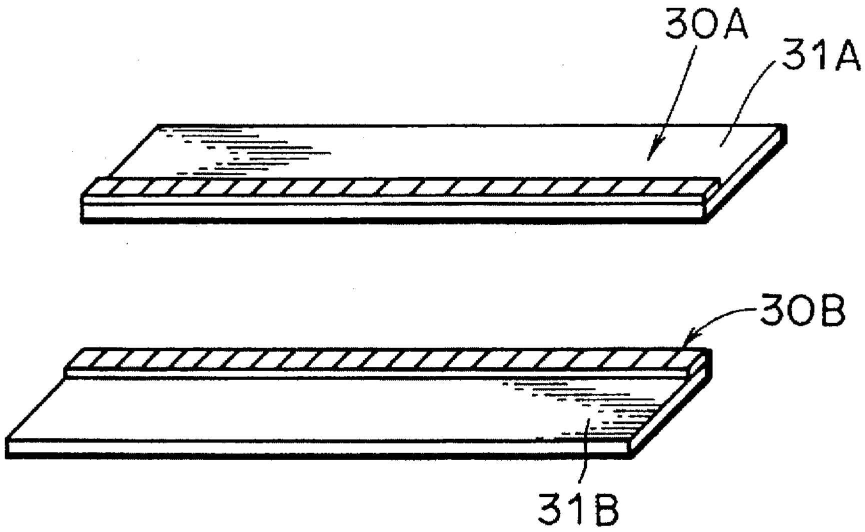

Then, in the step shown in FIG. 7B, magnetic substrate 31 on which aggregate 30$R_1$ of thermal head units are formed is cut along the center line (the line C—C of FIG. 7A). The substrate may be cut by various methods. For example, it may be cut by using a slicing cutter, or by laser processing. In this step, on the side of magnetic substrate 31A, an aggregate 30A of units of the first thermal head member is formed, in which a number of units of the first thermal head member 31*a* shown in FIGS. 3 to 5 are aggregated and integrated. Meanwhile, on the side of magnetic substrate 31B, an aggregate 30B of units of the second thermal head member is formed in which a number of units of the second thermal head member 31*b* shown in FIGS. 3 to 5 are aggregated and integrated.

Figure 7C:
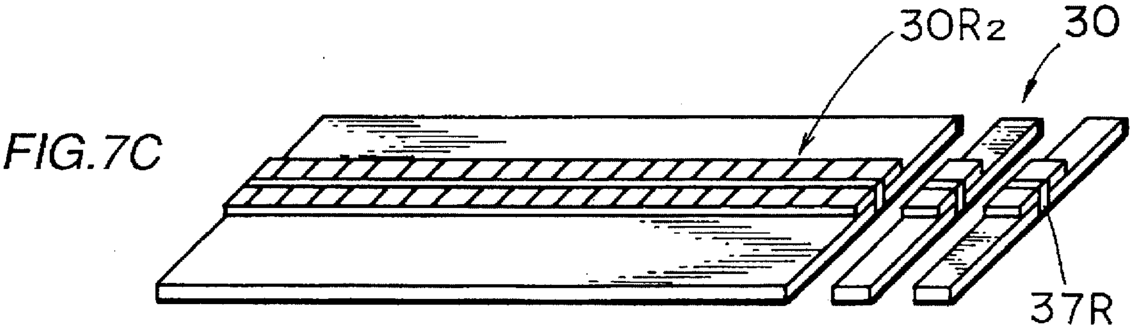

Next, in the step shown in FIG. 7C, on the cut surface of at least one of aggregate 30A of the units of the first thermal member and aggregate 30B of the units of the second thermal head member, a non-magnetic layer 37R is formed by coating, sputtering, deposition or the like and, thereafter, by using non-magnetic layer 37R, the cut surface of aggregate 30A of the units of the first thermal head member and aggregate 30B of the units of the second thermal head member are bonded to each other. In this step, an aggregate 30$R_2$ of the units of recording heads for the magnetic printer in which a number of units of the recording heads 30 for the magnetic printer shown in FIGS. 3 to 5 are aggregated and integrated, is formed. Then, by cutting the aggregate 30$R_2$ of the units of the recording heads for the magnetic printer in a prescribed size, a recording head 30 for a magnetic printer is provided.

According to the method of manufacturing a recording head for a magnetic printer described above, the recording head for the magnetic printer in accordance with the present invention can be manufactured in a simple and easy manner, by utilizing the conventional known method of manufacturing a thermal head. Namely, according to the method of manufacturing the recording head for a magnetic printer described above, one thermal head is manufactured, this one thermal head is cut along the center line of this one thermal head in a direction orthogonal to the conductor portion included in this one thermal head to provide a pair of thermal head members, cut surfaces of the pair of thermal head members are bonded by a nonmagnetic layer, and the recording head for a magnetic printer in accordance with the present invention can be manufactured by using the common method of manufacturing a thermal head except that a magnetic substrate is used as the substrate.

In the recording head for a magnetic printer manufactured in accordance with the method of manufacturing the recording head described above, the magnetic gap of the magnetic head member is formed at the portion of non-magnetic layer, and the magnetic gap of the magnetic head member is aligned with the space between a pair of thermal head members, that is, aligned with the portion of the non-magnetic layer. More specifically, the magnetic gap of the magnetic head member and the space between the conductor portions included in the first and second thermal head members are both formed at the nonmagnetic layer portion.

Therefore, according to the method of manufacturing a recording head for a magnetic printer described above, a small magnetic gap of the magnetic head member can be formed with high precision in the space between the first and the second thermal head members, more specifically, corresponding to the space between the conductor portions included in first thermal head member and the conductor portions included in the second thermal head member. Therefore, it is not necessary to process with high precision the small magnetic gap of the magnetic head member corresponding to the space between the conductor portions included in the first thermal head member and the conductor portions included in the second thermal head member. Therefore, according to the method of manufacturing the recording head for a magnetic printer described above, the recording head for a magnetic printer in accordance with the present invention can be easily manufactured, and it is suitable for mass production. Therefore, it can be advantageously used in the industry.

Further, according to the method of manufacturing a recording head for a magnetic printer described above, the size of the magnetic gap of the magnetic head portion can be arbitrarily controlled in accordance with the size of the non-magnetic layer. Therefore, the size of the magnetic gap of the magnetic head member can be easily controlled at a desired size.

Since the size (mainly, gap length) of the magnetic gap of the magnetic head portion can be controlled easily in accordance with the method of manufacturing a recording head for a magnetic printer described above, a recording head for a magnetic printer having a magnetic head member generating a desired magnetic force can be easily manufactured.

Referring to FIG. 4, according to the method of manufacturing a recording head for a magnetic printer described above, the non-magnetic layer 37 is formed to extend through magnetic substrates 31*a*, 31*b*, heat insulating layers 32*a*, 32*b*, a plurality of conductor portions 33*a*, 33*b*, heat resistors 34*a*, 34*b* and protective films 35*a* and 35*b*.

According to the method of manufacturing a recording head for a magnetic printer described above, referring to FIG. 4, a heating resistor 34*a* provided on the side of magnetic substrate 31*a* in relation to the plurality of conductor portions 33*a* and heating resistor 34*b* provided on the side of magnetic substrate 31*b* in relation to the plurality of conductor portions 33*b* are provided with the non-magnetic layer 37 interposed between the heating resistors 34*a* and 34*b*.

The method of manufacturing a recording head for a magnetic printer described above is simply a preferred embodiment of the method of manufacturing a recording head for a magnetic printer of the present invention. The recording head for a magnetic printer in accordance with the present invention can be manufactured by methods other than the method described above.

Figure 9A:
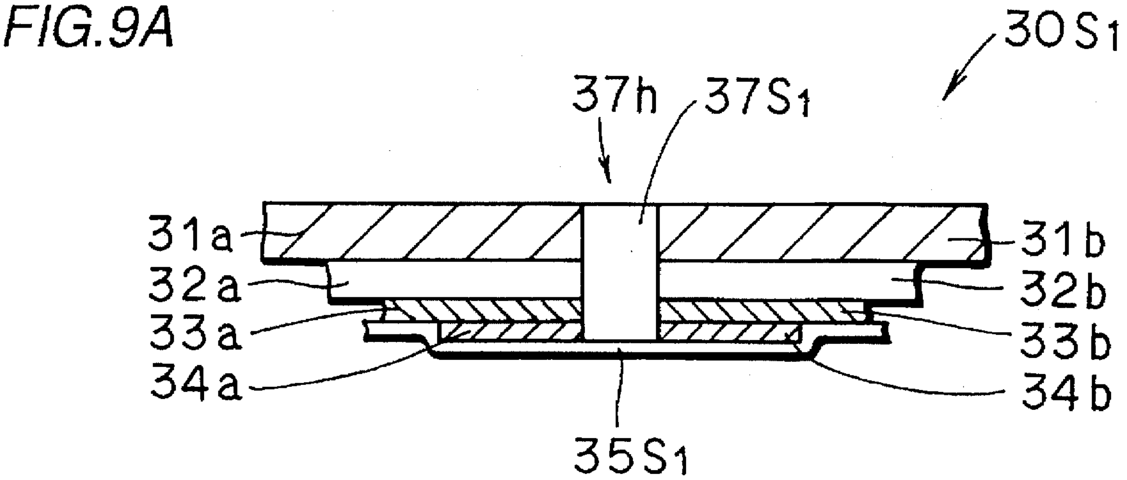
FIGS. 9A and 9B are cross sections schematically showing two modifications of a recording head 30 for a magnetic printer.
Figure 9B:
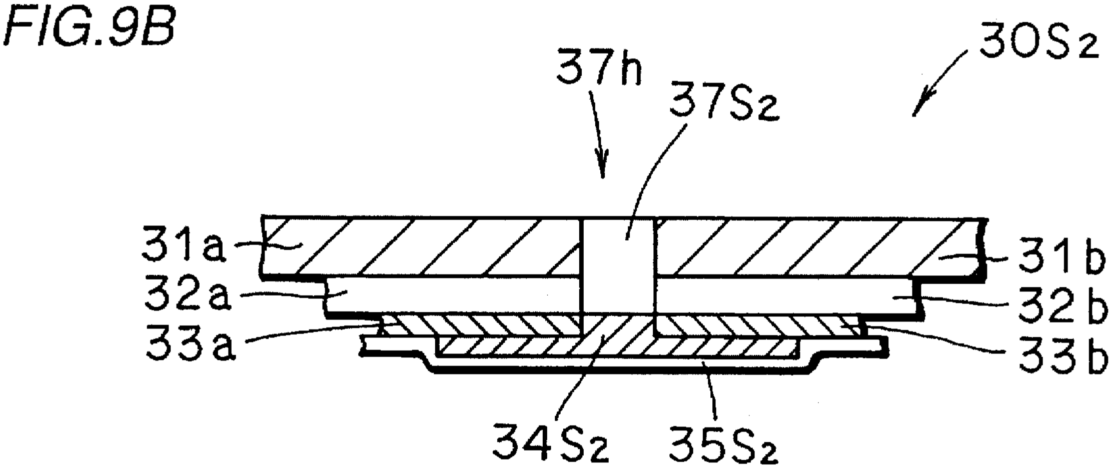

FIGS. 9A and 9B show two modifications of the recording head 30 for a magnetic printer. Recording head 30$S_1$ for a magnetic printer shown in FIG. 9A has similar structure as recording head 30 for a magnetic printer except the following point, and therefore corresponding members are denoted by the corresponding reference characters and description thereof is not repeated.

Recording head 30$S_1$ for a magnetic printer differs from recording head 30 for a magnetic printer in that protective film 35$S_1$ is formed continuously including the region immediately below the non-magnetic layer 37$S_1$. More specifically, in recording head 30$S_1$ for a magnetic printer, protective film 35$S_1$ is provided integrally to cover the surfaces of heat insulating layers 32A, 32B, the surfaces of the plurality of conductor portions 33*a* and 33*b*, the surfaces of heating resistors 34*a* and 34*b* and the surface of the non-magnetic layer 37$S_1$.

As to the manufacturing of recording head 30$S_1$ for a magnetic printer, in the step shown in FIG. 7A, in forming an aggregate of the thermal head units, magnetic substrate 31 is prepared, on the surface of magnetic substrate 31, heat insulating layer 32, a plurality of conductor portion 33 and heating resistor 34 are formed, and thereafter, a pair of thermal head members are formed through the same steps as shown in FIGS. 7B and 7C without forming the protective film 35. Thereafter, the protective film 35$S_1$ is formed to cover the surfaces of heat insulating layers 32*a* and 32*b*, the surfaces of the plurality of conductor portions 33*a* and 33*b*, the surfaces of heating resistors 34*a* and 34*b* and the surface of non-magnetic layer 37$S_1$.

Recording head 30$S_2$ for a magnetic printer shown in FIG. 9B has the same structure as the recording head 30 for a magnetic printer except the following point, and therefore corresponding portions are denoted by the corresponding reference characters and description thereof is not repeated.

Recording head 30$S_2$ for a magnetic printer differs from recording head 30 for a magnetic printer in that heating resistor 34$S_2$ and protective film 35$S_2$ are formed continuously including the region immediately below the non-magnetic layer 37$S_2$. More specifically, recording head 30$S_2$ for a magnetic printer includes a heating resistor 34$S_2$ provided at the space 37*h* between the plurality of conductor portions 33*a* and the plurality of conductor portions 33*b*. Recording head 30$S_2$ for a magnetic printer includes a protective film 35$S_2$ provided integrally to cover the surfaces of heat insulating layers 32*a* and 32*b*, surfaces of the plurality of conductor portions 33*a* and 33*b* and the surface of heating resistor 34$S_2$. Non-magnetic layer 37$S_2$ has its tip end positioned at the surface of heat insulating layers 32*a* and 32*b*.

Recording head 30$S_2$ for a magnetic printer is manufactured in the following steps. Namely, in the step shown in FIG. 7A, in forming an aggregate of thermal head units, magnetic substrate 31 is prepared, on the surface of magnetic substrate 31, heat insulating layer 32 and a plurality of conductor portions 33 are formed, and without forming heating resistor 34 and protective film 35, the same steps as the step shown in FIGS. 7B and 7C are carried out. Thereafter, heating resistor 34$S_2$ is formed at a prescribed region to cover at least the space 37*h* between the plurality of conductor portion 33*a* and the plurality of conductor portions 33*b* and to cover the surfaces of heat insulating layers 32*a* and 32*b* and the surfaces of the plurality of conductor portions 33*a* and 33*b*, and further, protective film 35$S_2$ is formed to cover the surfaces of heat insulating layers 32*a* and 32*b*, surfaces of the plurality of conductor portions 33*a* and 33*b*, and the surface of heating resistor 34$S_2$.

Though an example in which non-magnetic layer 37 is provided in the magnetic gap of the magnetic head member, i.e., the space between the first magnetic substrate and the second magnetic substrate has been described in the present embodiment, the non-magnetic layer 37 is not an essential component, and the space 37*h* may be an air gap portion.

Referring to FIGS. 2 and 3, the recording head for a magnetic printer in accordance with the present invention is attached to core portion 21 by connecting one tip end portion 21*a* of core portion 21 to magnetic substrate 31*a* and connecting the other tip end portion 21*b* to magnetic substrate 31*b*.

Though not limited thereto, the recording head for a magnetic printer in accordance with the present invention may be attached to core portion 21 by welding, diffusion bonding, by screws or the like.

A recording head 40 for a magnetic printer in accordance with a second embodiment of the present invention will be described with reference to FIGS. 10 to 12.

Figure 10:
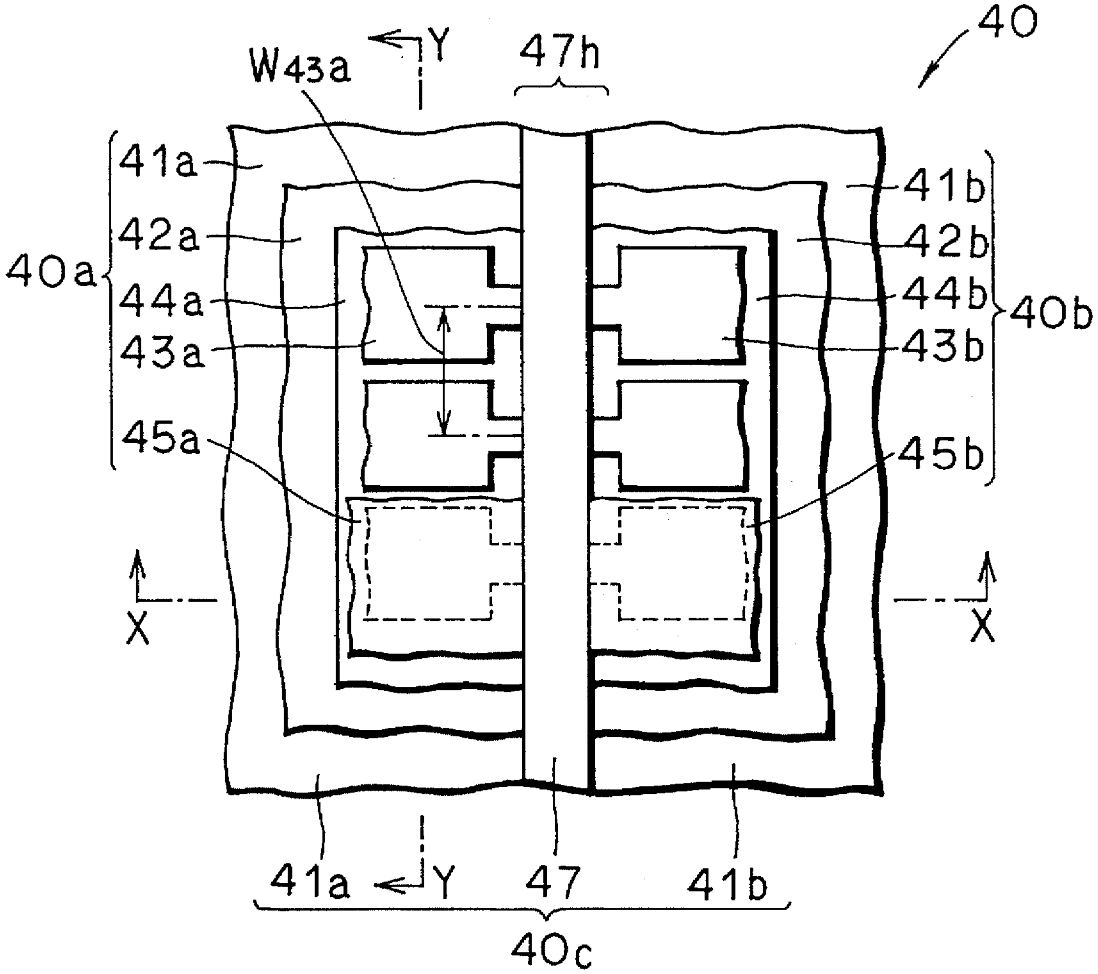
FIG. 10 is a plan view schematically showing a portion of a surface which is pressed to a surface of the magnetic drum, viewed from a direction orthogonal to the rotation axis of the magnetic drum, of the recording head for a magnetic printer in accordance with a second embodiment of the present invention.
Figure 11:
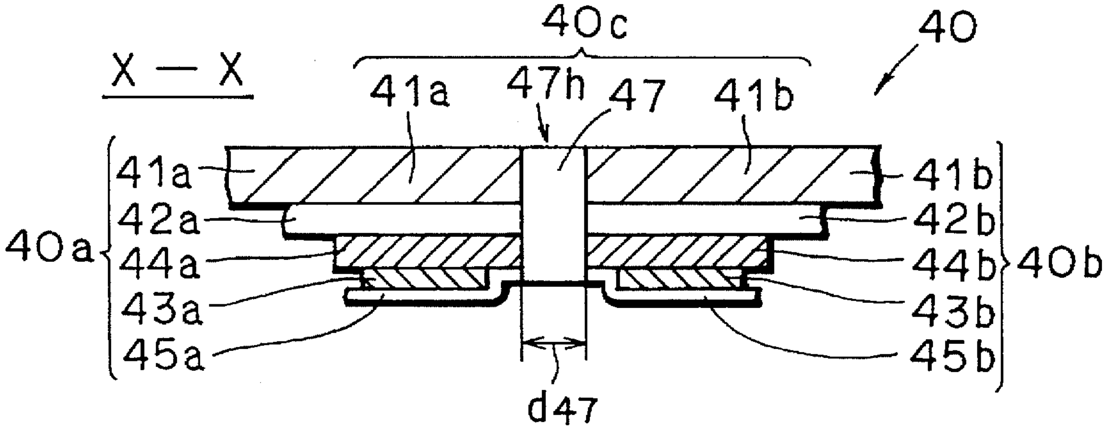
FIG. 11 schematically shows a cross section taken along the line X—X of the recording head for a magnetic printer shown in FIG. 10.
Figure 12:
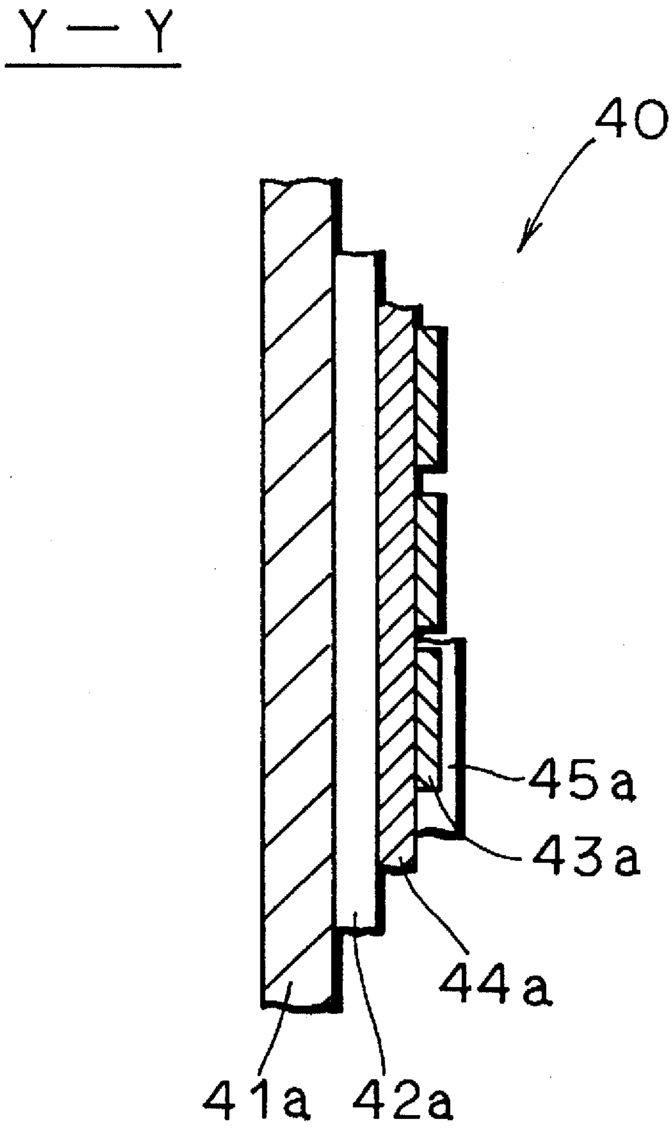
FIG. 12 schematically shows a cross section taken along the line Y—Y of the recording head for a magnetic printer shown in FIG. 10.

Referring to FIGS. 10 to 12, recording head 40 for a magnetic printer includes a first thermal head member 40*a*, a second thermal head member 40*b* and a magnetic head member 40*c*.

The first and the second thermal head members 40*a* and 40*b* have the structure of a thermal head generally called a thin film type thermal head. Recording head 40 for a magnetic printer of the second embodiment is an example in which two thin film type thermal heads are used.

In recording head 40 for a magnetic printer, the second thermal head member 40*b* is juxtaposed with the first thermal head member 40*a* with a prescribed space 47*h* therebetween. In the space 47*h*, a non-magnetic layer 47 is provided.

First thermal head member 40*a* includes a magnetic substrate 41*a*, a heat insulating layer 42*a* formed on the surface of magnetic substrate 41*a*, a heating resistor 44*a* formed at a prescribed region on the surface of heat insulating layer 42*a*, a plurality of conductor portions 43*a* formed on the surface of heating resistor 44*a*, and a protective film 45*a* provided to cover the surface of heat insulating layer 42*a*, the surface of heating resistor 44*a* and the surfaces of the plurality of conductor portions 43*a*. More specifically, different from the first embodiment in which the conductor portions 33*d* are formed on the surface of heat insulating layer 32*a* and heating resistor 34*a* is formed further on the surface thereof, in the present embodiment, positional relation between the conductor portions 43*a* and heating resistor 44*d* is reversed.

The plurality of conductor portions 43*a* are provided parallel to and spaced from each other with a prescribed narrow space $W_{43a}$ therebetween extending linearly in a direction orthogonal to the rotation axis of the magnetic drum. Each of the plurality of conductor portions 43*a* is made abruptly narrow near the non-magnetic layer 47, so that the value of resistance of the portion of heating resistor 44*a* to be heated becomes high.

Second thermal head member 40*b* has similar structure as first thermal head member 40*a*. More specifically, in the second thermal head member 40*b*, magnetic substrate 41*a* of the first thermal head member 40*a* corresponds to a magnetic substrate 41*b*, heat insulating layer 42*a* corresponds to a heat insulating layer 42*b*, heating resistor 44*a* corresponds to a heating resistor 44*b*, the plurality of conductor portions 43*a* correspond to a plurality of conductor portion 43*b*, and the protective film 45*a* corresponds to a protective film 45*b*. Respective ones of the plurality of conductor portion 43*ia* provided on the side of magnetic substrate 41*a* and respective ones of the plurality of conductor portion 43*b* provided on the side of magnetic substrate 41*b* are arranged such that a pair of corresponding conductor portions are approximately aligned in a line, with a prescribed space 47*h* therebetween.

In recording head 40 for a magnetic printer, the heating member provided in relation to the plurality of conductor portions 43*a* and the plurality of conductor portions 43*b* includes a heating resistor 44a provided on the side of magnetic substrate 41*a* in relation to the plurality of conductor portions 43*a*, and a heating resistor 44*b* provided on the side of magnetic substrate 41*b* in relation to the plurality of conductor portions 43*b*. At least by magnetic substrate 41*a* and magnetic substrate 41*b*, the magnetic head member 40*c* is constituted. The space 47*h* between magnetic substrates 41*a* and 41*b* serves as a magnetic gap of the magnetic head member 40*c*.

As is apparent from FIGS. 10 to 12, each space 47*h* as the magnetic gap of magnetic head member 40*c* is arranged to extend immediately above and parallel to the space 47*h* between the first and the second thermal head members 47*a* and 47*b*. A non-magnetic layer 47 is provided in space 47*h* between the first and the second thermal head members 47*a* and 47*b*, and the first and the second thermal head members 40*a* and 40*b* are bonded to each other by the non-magnetic layer 47. As a result, the first and the second thermal head members 40*a* and 40*b* and the magnetic head member 40*c* are integrated.

The materials and thicknesses of magnetic substrates 41*a*, 41*b*, heat insulating layers 42*a*, 42*b* and conductor portions 43*a* and 43*b* are similar to the materials and thicknesses of the corresponding members in the first embodiment described above.

Ta-Si alloy, Ta-$SiO_2$, Ta-Si-C, $Ta_2N$, Ni-Cr alloy, Cr-Si-O, ZnN or the like may be used as the material for the heating resistors 44*a* and 44*b*, and, the thickness can be reduced to 20 nm–400 nm, as compared with the first embodiment.

The width (gap length) $d_{47}$ of the space 47*h* between the first and the second thermal head members 40*a* and 40*b* should preferably be about 0.1 μm to about 3.0 μm, as the gap length $d_{37}$ of the first embodiment.

In recording head 40 for a magnetic printer, since the thickness of heating resistors 44*a* and 44*b* can be made thinner than the first embodiment, recording head 40 for a magnetic printer can be further reduced in size, as compared with the recording head for a magnetic printer shown in the first embodiment.

Other structures and the operation of the present embodiment are the same as those described in the first embodiment.

A method of manufacturing recording head 40 for a magnetic printer will be described in the following. The steps for manufacturing recording head 40 for a magnetic printer are the same as the steps for manufacturing recording head 30 for a magnetic printer except that in the step shown in FIG. 7A, the step for manufacturing an aggregate of thermal head units is different from the step of manufacturing recording head 30 for a magnetic printer. More specifically, in manufacturing recording head 40 for a magnetic printer, when the aggregate of thermal head units which correspond to the aggregate 30$R_1$ of the thermal head unit shown in FIG. 7A is formed, first, a magnetic substrate is prepared, and the aggregate of the thermal head units for manufacturing a recording head 40 for a magnetic printer is formed by providing a heat insulating layer a heating resistor, a plurality of conductor portions, and a protective film on the surface of the magnetic substrate, in this order.

Figure 13:
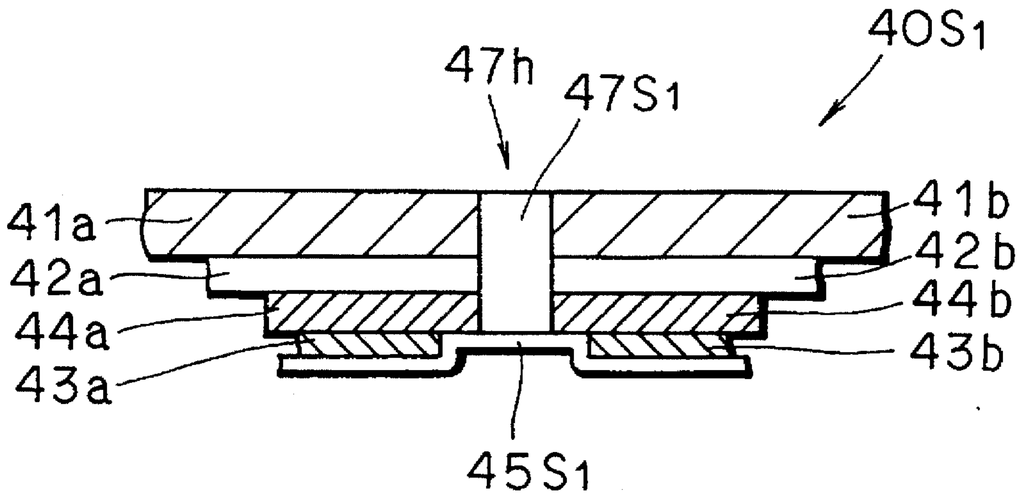
FIG. 13 is a cross section schematically showing an example of a recording head for a magnetic printer in accordance with the present invention, having a similar structure as a recording head 40 for a magnetic printer.

FIG. 13 shows an example of a recording head for a magnetic printer in accordance with the present invention which has similar structure as recording head 40 for the magnetic printer. For simplicity of description, only a schematic cross section corresponding to FIG. 11 of such a recording head for a magnetic printer is shown in FIG. 13.

Referring to FIG. 13, recording head 40$S_1$ for a magnetic printer has similar structure as recording head 40 for a magnetic printer except the following point, and therefore corresponding members are denoted by the corresponding reference characters and description thereof is not repeated.

In recording head 40$S_1$ for a magnetic printer, protective film 45$S_1$ is provided differently from recording head 40 for a magnetic printer. More specifically, in recording head 40$S_1$ for a magnetic printer, protecting film 45$S_1$ is provided integrally to cover the surfaces of heat insulating layers 42*a* and 42*b* the surfaces of heating resistors 44*a* and 44*b*, the surfaces of the plurality of conductor portions 43*a* and 43*b*, and the surface of the non-magnetic layer 47$S_1$.

In manufacturing recording head 40$S_1$ for a magnetic printer, the same step as the step shown in FIG. 7C for manufacturing recording head 30$S_1$ for a magnetic printer is carried out without forming the protective film 45$S_1$, and then, the protective film 45$S_1$ is formed to cover all the surfaces of heat insulating layers 42*a*, 42*b*, heating resistors 44*a* and 44*b*, the plurality of conductor portions 43*a*, 43*b* and non-magnetic layer 47$S_1$.

A recording head 50 for a magnetic printer in accordance with a third embodiment of the present invention will be described.

Figure 14:
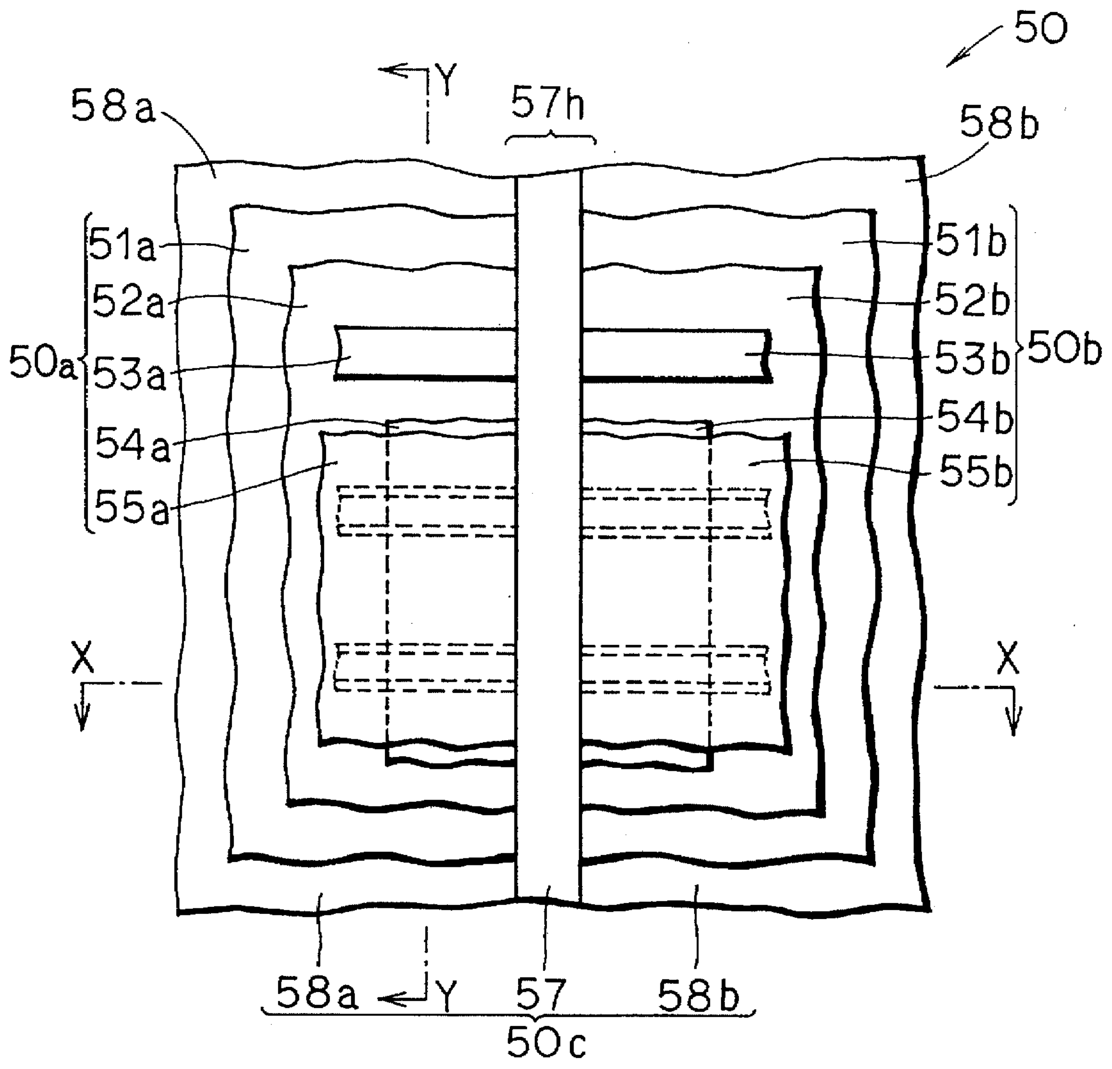
FIG. 14 is a plan view schematically showing a portion of a surface which is pressed onto a surface of the magnetic drum, viewed from a direction orthogonal to the rotation axis of the magnetic drum, of a recording head for a magnetic printer in accordance with a third embodiment of the present invention.
Figure 15:
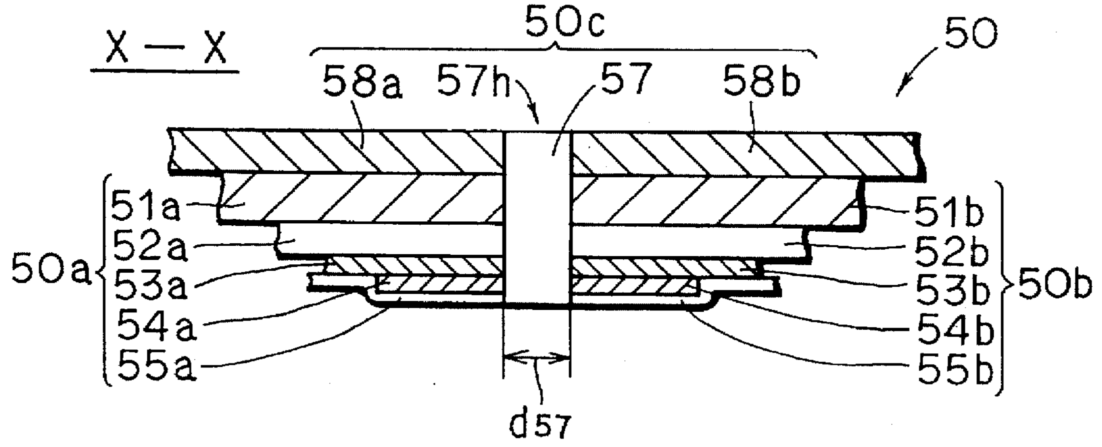
FIG. 15 schematically shows a cross section taken along the line X—X of the recording head for a magnetic printer shown in FIG. 14.
Figure 16:
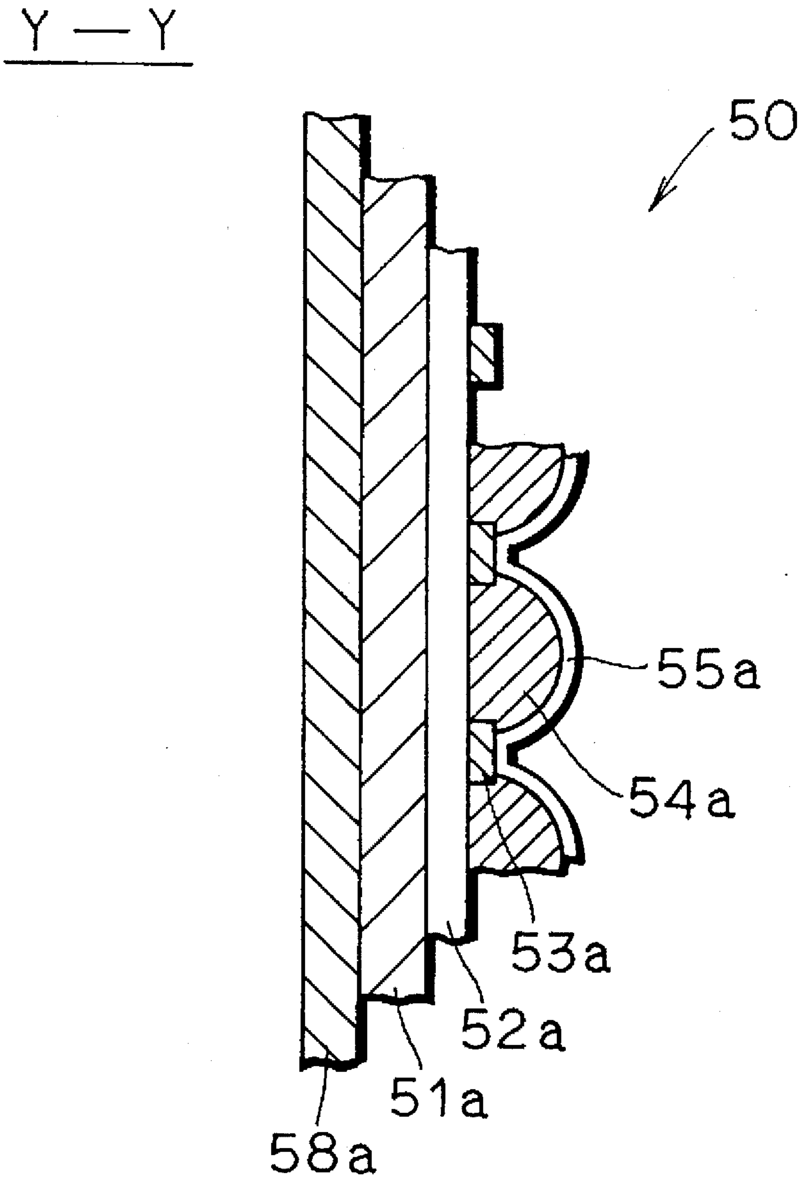
FIG. 16 schematically shows a cross section taken along the line Y—Y of the recording head for a magnetic printer shown in FIG. 14.

Referring to FIGS. 14 to 16, recording head 50 for a magnetic printer of this embodiment includes a first thermal head member 50*a*, a second thermal head member 50*b* and a magnetic head member 50*c*. The first thermal head member 50*a* and the second thermal head member 50*b* each have the structure of a so called thick film type thermal head.

In recording head 50 for a magnetic printer, second thermal head member 50*b* is juxtaposed with the first thermal head member 50*a* with a prescribed space 57*h* therebetween. Magnetic head member 50*c* is arranged on the first and the second thermal head members 50*a* and 50*b*. In the space 57*h*, a non-magnetic layer 57 is provided.

The first thermal head member 50*a* includes a substrate 51*a*, a heat insulating layer 52*a* formed on the surface of substrate 51*a*, a plurality of conductor portions 53*a* formed on the surface of heat insulating layer 52*a*, a heating resistor 54*a* formed at a prescribed region to cover the surface of heat insulating layer 52*a* and the surfaces of the plurality of conductor portions 53*a*, and a protective film 55*a* provided to cover the surface of heat insulating layer 52*a*, the surfaces of the plurality of conductor portions 53*a* and the surface of heating resistor 54*a*.

The first thermal head member 50*a* has similar structure as recording head 30 for a magnetic printer described in the first embodiment except that a material other than the non-magnetic ceramics such as a common alumina is used as the material of the substrate 51*a*. More specifically, in recording head 50 for a magnetic printer, magnetic substrate 31*a* of recording head 30 for a magnetic printer corresponds to substrate 51*a*, heat insulating layer 32*a* corresponds to heat insulating layer 52*a*, the plurality of conductor portions 33*a* correspond to the plurality of conductor portions 53*a*, heating resistor 34*a* corresponds to heating resistor 54*a*, and protective film 35*a* corresponds to protective film 55*a*, respectively.

The second thermal head member 50*b* has similar structure as the first thermal head member 50*a*. More specifically, in the second thermal head member 50*b*, substrate 51*a* of the first thermal head member 50*a* corresponds to a substrate 51*b*, heat insulating layer 52*a* corresponds to a heat insulating layer 52*b*, the plurality of conductor portions 53*a* corresponds to a plurality of conductor portions 53*b*, heating resistor 54*a* corresponds to a heating resistor 54*b*, and protective film 55*a* corresponds to a protective film 55*b*, respectively.

As in recording head 30 for a magnetic printer of the first embodiment, respective ones of the plurality of conductor portions 53*a* provided on the side of substrate 51*a* and respective ones of the plurality of conductor portions 53*b* provided on the side of substrate 51*b* are arranged such that a pair of corresponding conductor portions are approximately aligned on a line, spaced by the prescribed space 57*h*.

In recording head 50 for a magnetic printer, the heating member provided in relation to the plurality of conductor portions 43*a* and 43*b* includes a heating resistor 54*a* provided on the side of substrate 51*a* in relation to the plurality of conductor portions 53*a*, and a heating resistor 54*b* provided on the side of substrate 51*b* in relation to the plurality of conductor portions 53*b*.

Further, recording head 50 for a magnetic printer includes a magnetic film 58*a* formed on that surface of substrate 51*a* which is opposite to the surface on which heat insulating layer 52*a* is provided, and a magnetic film 58*b* provided on that surface of substrate 51*b* which is opposite to the surface on which heat insulating layer 52*b* is provided. In this recording head 50 for a magnetic printer, at least by magnetic films 58*a* and 58*b*, the magnetic head member 50*c* is formed.

A non-magnetic ceramics such as alumina may be used as the material of the substrates 51*a* and 51*b* as mentioned above, and preferably, the thickness should be in the range of about 0.2 mm to about 5.0 mm.

Preferably, the width (gap length) $d_{57}$ of the space 57*h* between the first and the second thermal head members 50*a* and 50*b* should be about 0.1 μm to about 3.0 μm.

A soft magnetic material such as permalloy, Fe-Si alloy, Fe-Co alloy, Fe-Ni-Co alloy, Ni-Co alloy, Mn-Zn ferrite, Ni-Zn ferrite, Mg-Zn ferrite, Mg-Mn ferrite, sendust, amorphous magnetic body or the like may be used as the material of the magnetic film layers 58*a* and 58*b*. In recording head 50 for a magnetic printer, the mechanical strength required of a recording head for a magnetic printer is ensured by substrates 51*a* and 51*b*. Therefore, in recording head 50 for a magnetic printer, magnetic films 58*a* and 58*b* need not have specific mechanical strength. Therefore, magnetic films 58*a* and 58*b* can be made thin. Since the magnetic films 58*a* and 58*b* can be made thin, the magnetic field which leaks from the space 57*h* as the magnetic gap of magnetic head member 50*c* can be mad stronger. The thickness of each of magnetic films 58*a* and 58*b* can be made about 1 μm to about 100 μm.

Other structures and operation of the present embodiment are similar to the corresponding portions of the first embodiment described above, and therefore the details are not repeated.

A method of manufacturing recording head 50 for a magnetic printer will be described in the following. The steps for manufacturing recording head 50 for a magnetic printer are the same as the steps for manufacturing recording head 30 for a magnetic printer except that in the step shown in FIG. 7A, the step of forming an aggregate of thermal head units is different from the step of manufacturing recording head 30 for a magnetic printer.

More specifically, in manufacturing recording head 50 for a magnetic printer, when the aggregate of thermal head units corresponding to the aggregate 30$R_1$ of the thermal head unit shown in FIG. 7A is prepared, at first a substrate is prepared, and then an aggregate of the thermal head units for manufacturing recording head 50 for the magnetic printer is formed by providing a heat insulating layer, a plurality of conductor portions, a heating resistor and a protective film in this order on the surface of the substrate. Then, a magnetic film is formed on that surface of the substrate which is opposite to the surface on which heating resistor is provided. The magnetic film may be formed, for example, by coating, sputtering, vapor deposition or the like.

Then, by carrying out similar steps as the step shown in FIGS. 7B and 7C, recording head 50 for a magnetic printer is completed.

Meanwhile, in preparing the aggregate of thermal head units for manufacturing a recording head for a magnetic printer, the aggregate of the thermal head units for manufacturing recording head 50 for a magnetic printer may be provided by at first forming a magnetic film on one surface of a substrate, and then by providing, on the surface opposite to the surface on which the magnetic thin film has been formed, a heat insulating layer, a plurality of conductor portions, a heating resistor and a protective film in this order.

Figure 17A:
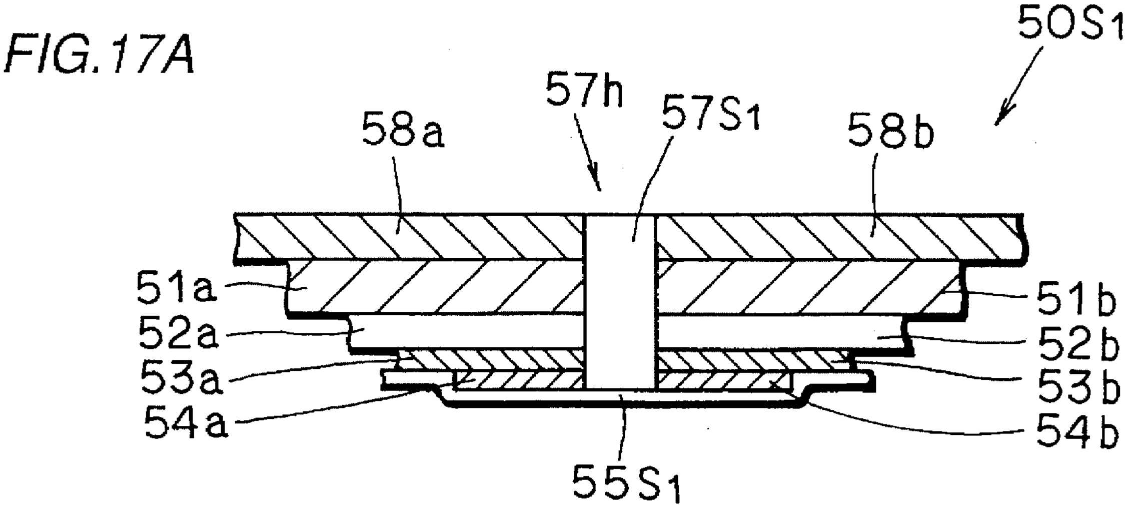
FIGS. 17A and 17B are cross sections schematically showing two modifications of a recording head 50 for a magnetic printer.
Figure 17B:
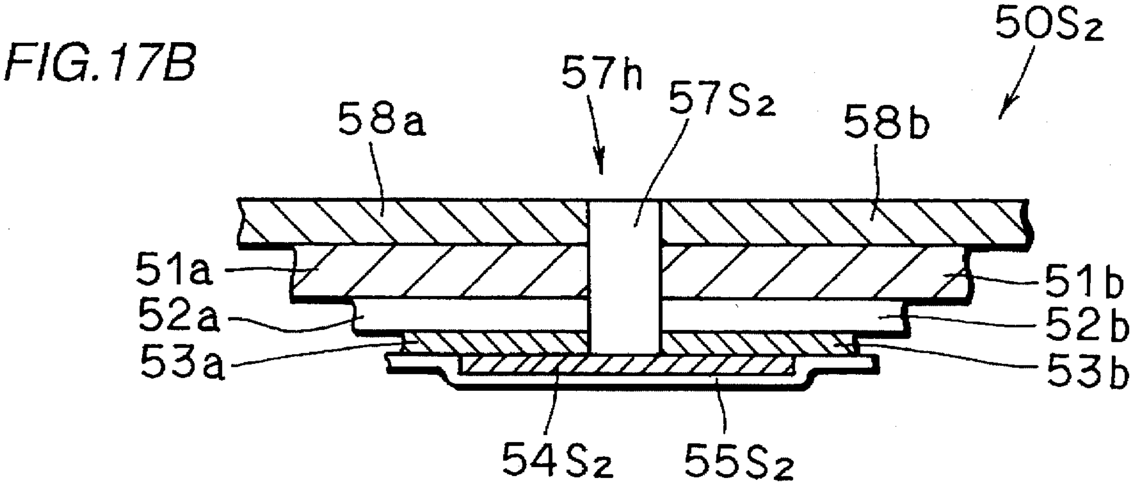

FIGS. 17A and 17B show two modifications of this embodiment. For simplicity of description, only schematic cross sections corresponding to FIG. 15 of such a recording head for a magnetic printer are shown in FIGS. 17A and 17B.

Recording head 50$S_1$ for a magnetic printer shown in FIG. 17A has similar structure as recording head 50 for a magnetic printer except the following point, and therefore corresponding members are denoted by the corresponding reference characters and description thereof is not repeated.

In recording head 50$S_1$ for a magnetic printer, protective film 55$S_1$ is provided differently from recording head 50 for a magnetic printer. More specifically, in recording head 50$S_1$ for a magnetic printer, protective film 55$S_1$ is provided integrally to cover the surfaces of heat insulating layers 52*a* and 52*b*, the surfaces of the plurality of conductor portions 53*a* and 53*b*, the surfaces of heating resistors 54*a* and 54*b*, and the surface of nonmagnetic layer 57$S_1$.

In manufacturing recording head 50$S_1$ for a magnetic printer, in the step shown in FIG. 7A, in preparing the aggregate of thermal head units, at first a substrate is prepared, a heat insulating layer, a plurality of conductor portions and a heating resistor are formed on the surface of the substrate, and then, without forming a protective film, a magnetic film is formed on that surface of the substrate which is opposite to the surface on which the heating resistor is provided, and after that, the steps similar to the step shown in FIGS. 7B and 7C are carried out. Thereafter, protective film 55$S_1$ is formed to cover the surfaces of gate insulating layers 52*a* and 52*b*, the surfaces of the plurality of conductor portions 53*a* and 53*b*, the surfaces of heating resistors 54*a* and 54*b*, and the surface of non-magnetic layer 57$S_1$.

Recording head 50$S_2$ for a magnetic printer shown in FIG. 17B has a similar structure as recording head 50 for a magnetic printer except the following point, and therefore corresponding members are denoted by corresponding reference characters and description thereof is not repeated.

In recording head 50$S_2$ for a magnetic printer, heating resistor 54$S_2$ and protective film 55$S_2$ are provided differently from recording head 50 for a magnetic printer. More specifically, recording head 50$S_2$ for a magnetic printer includes a heating resistor 54$S_2$ provided in the space **57*h* between the plurality of connector portions 53*a* and 53*b***.

Further, in recording head 50$S_2$ for a magnetic printer, protective film 55$S_2$ is provided integrally to cover the surfaces of heat insulating layers **52*a* and 52*b*, the surfaces of the plurality of conductor portions 53*a* and 53*b*, and the surface of heating resistor 54$S_2$. Nonmagnetic layer 57$S_2$ has its tip end portion aligned with the surfaces of heat insulating layers 52*a* and 52*b***.

In manufacturing recording head 50$S_2$ for a magnetic printer, in preparing the aggregation of thermal head units in the step of FIG. 7A, a substrate is prepared, a heat insulating layer and a plurality of conductor portions are formed on a surface of the substrate, and then, without forming the heating resistor and the protective film, a magnetic film is formed on that surface of the substrate which is opposite to the surface on which the heat insulating layer has been provided, the steps similar to the steps of FIGS. 7B and 7C are carried out. Then a heating resistor 54$S_2$ is formed at a prescribed region to cover at least the space **57*h* between the plurality of conductor portions 53*a* and 53*b*, and to cover the surfaces of heat insulating layers 52*a*, 52*b* and the surfaces of the plurality of conductor portions 53*a* and 53*b*, and further, protective film 55$S_2$ is formed to cover the surfaces of heat insulating layers 52A and 52B, the surfaces of the plurality of conductor portions 53*a* and 53*b* and the surface of heating resistor 54**$S_2$.

Figure 18:
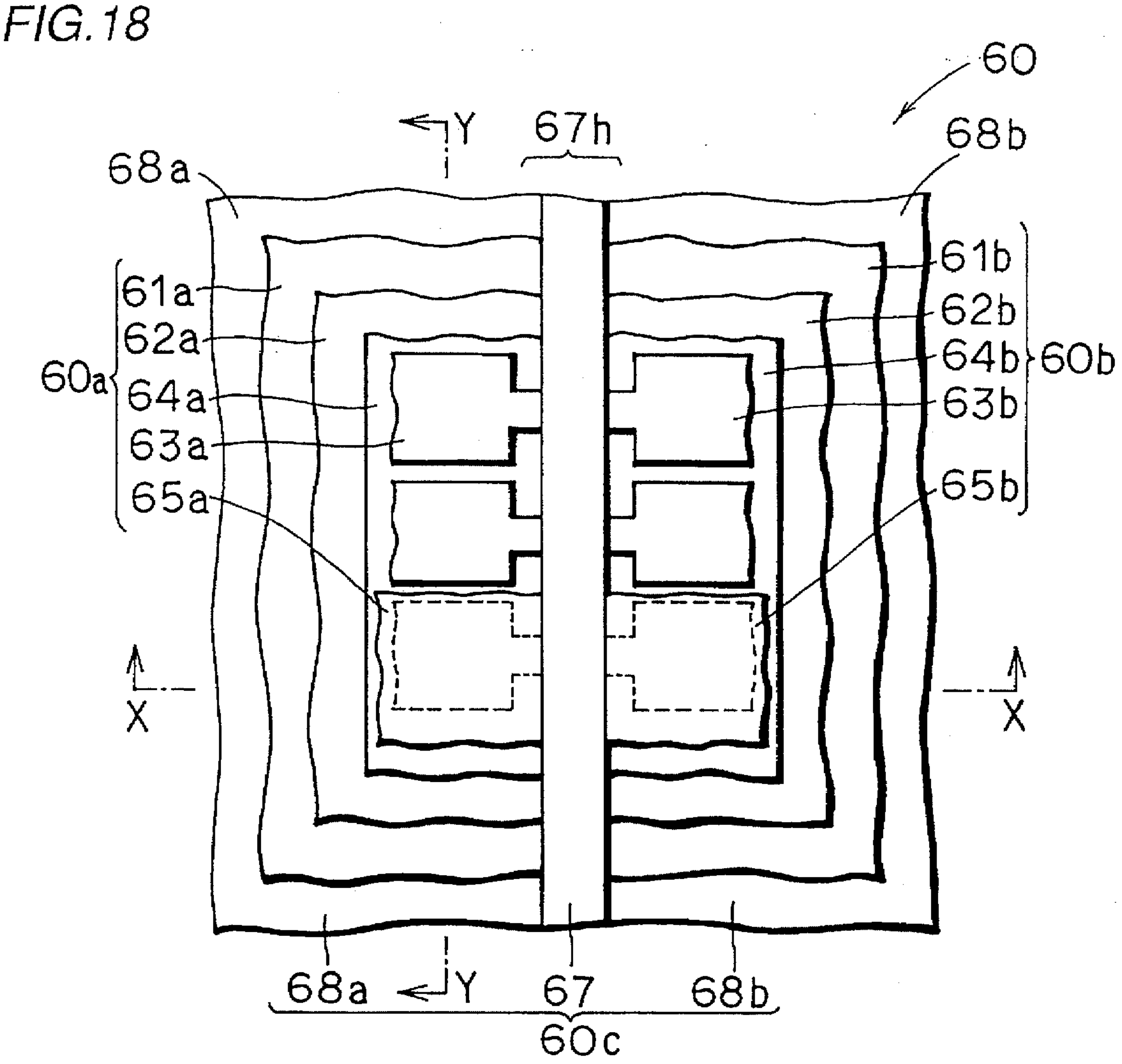
FIG. 18 is a plan view schematically showing a portion of a surface which is pressed onto a surface of a magnetic drum, viewed from a direction orthogonal to the rotation axis of the magnetic drum, of a recording head for a magnetic printer in accordance with a fourth embodiment of the present invention.
Figure 19:
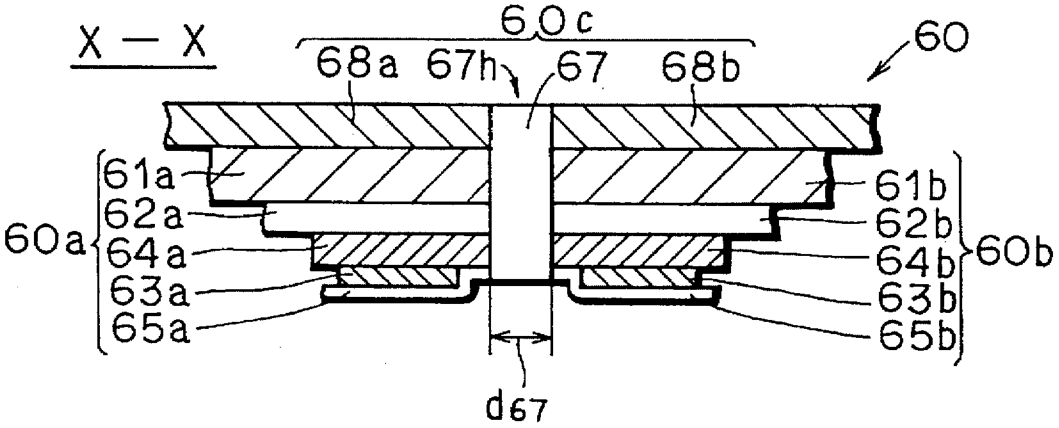
FIG. 19 schematically shows a cross section taken along the line X—X of the recording head for a magnetic printer shown in FIG. 18.
Figure 20:
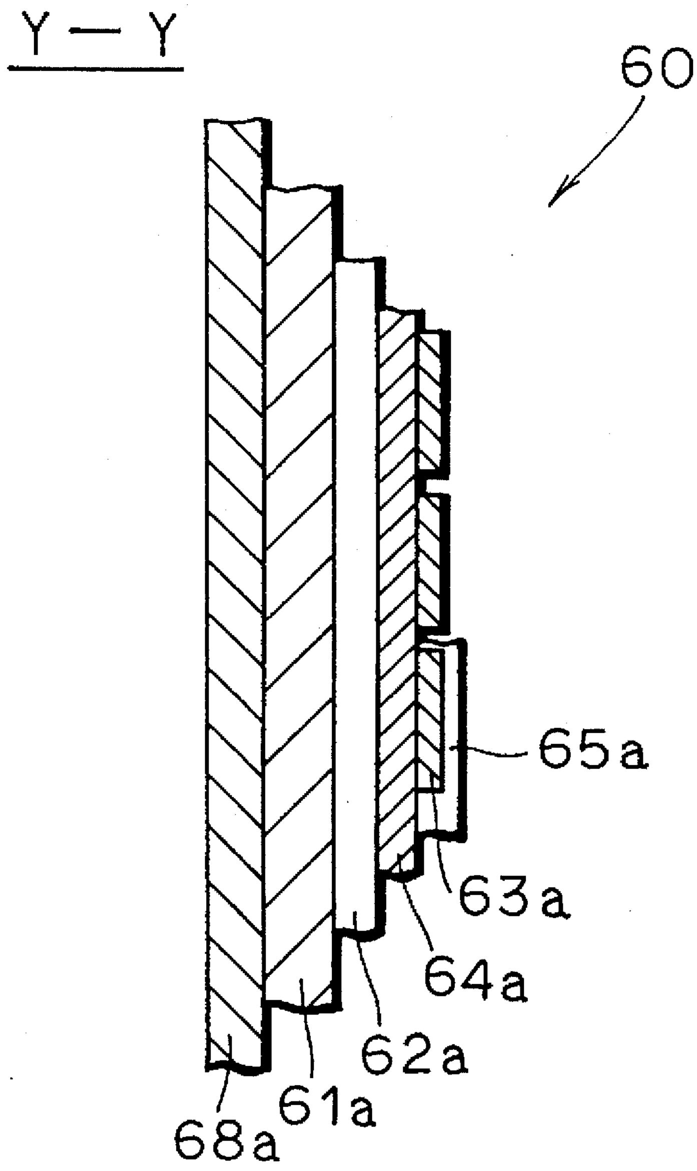
FIG. 20 schematically shows a cross section taken along the line Y—Y of the recording head for a magnetic printer shown in FIG. 18.

A recording head for a magnetic printer in accordance with a fourth embodiment of the present invention will be described with reference to FIGS. 18 to 20.

The present embodiment corresponds to a combination of the third and the second embodiments described above. More specifically, magnetic films **68*a* and 68*b*, substrates 61*a* and 61*b* and heat insulating layers 62*a* and 62*b* have similar structures as corresponding portions of the recording head for a magnetic printer in accordance with the third embodiment, respectively, while heating resistors 64*a*, 64*b*, conductor portions 63*a* and 63*b*, and protective films 65*a* and 65*b* have similar structures as the corresponding portions of the recording head for a magnetic printer in accordance with the second embodiment. Portions having similar structures as the second or third embodiments perform similar operation as the second or third embodiments, and these portions may be formed of similar materials. In this embodiment, a space 67*h* extends from the top surface of magnetic films 68*a*, 68*b* to the lower surface of protective films 65*a*, 65*b*, and nonmagnetic layer 67 is embedded in the space. Similar materials as in the first embodiment may be used as the material of the non-magnetic layer 67**.

In this embodiment, substrate **61*a*, heat insulating layer 62*a*, heating resistor 64*a* and conductor portion 63*a* constitute a first thermal head member 60*a*, while substrate 61*b*, heat insulating layer 62*b*, heating resistor 64*b* and conductor portion 63*b* constitute a second thermal head member 60*b*. Magnetic films 68*a* and 68*b* constitute magnetic head member 60*c*, with the space 67*h* serving as the magnetic gap. The dimension $d_{67}$ of the space 67*h*** in this embodiment may be the same as that of the corresponding portion in the first embodiment described above.

Figure 21:
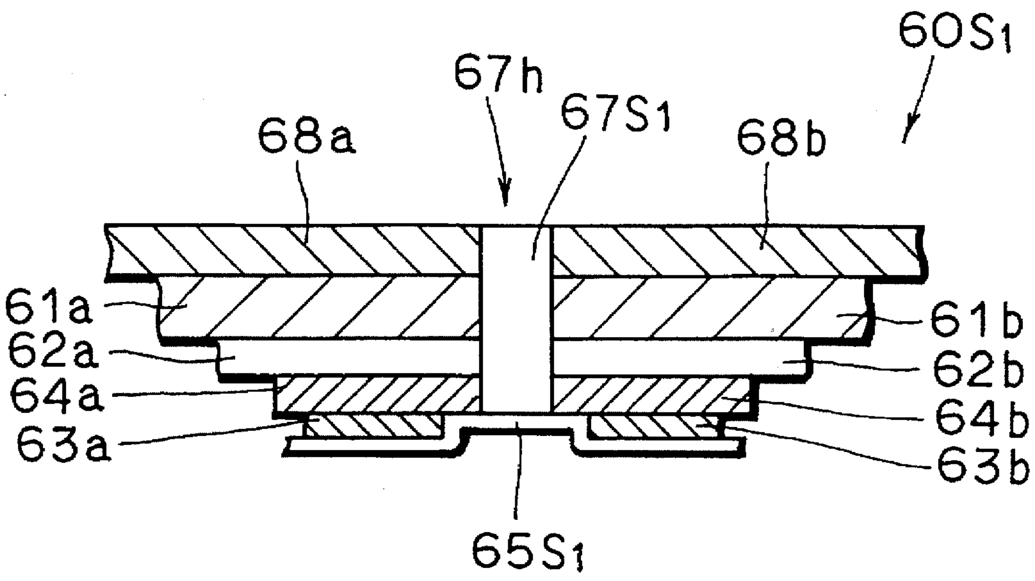
FIG. 21 is a cross section schematically showing one modification of a recording head 60 for a magnetic printer.

FIG. 21 shows a modification of recording head 60 for a magnetic printer of the present embodiment. Recording head 60$S_1$ for a magnetic printer shown in FIG. 21 differs from recording head 60 for a magnetic printer only in that protective film 65$S_1$ is formed not only over the conductor portions **63*a* and 63*b* but also over space 67*h* continuously. More specifically, in recording head 60$S_1$ for a magnetic printer, protective film 65$S_1$ is formed continuously to cover the surfaces of heating resistors 64*a*, 64*b*, the surfaces of conductor portions 63*a*, 63*b* and the surface of non-magnetic layer 67**$S_1$.

Figure 22:
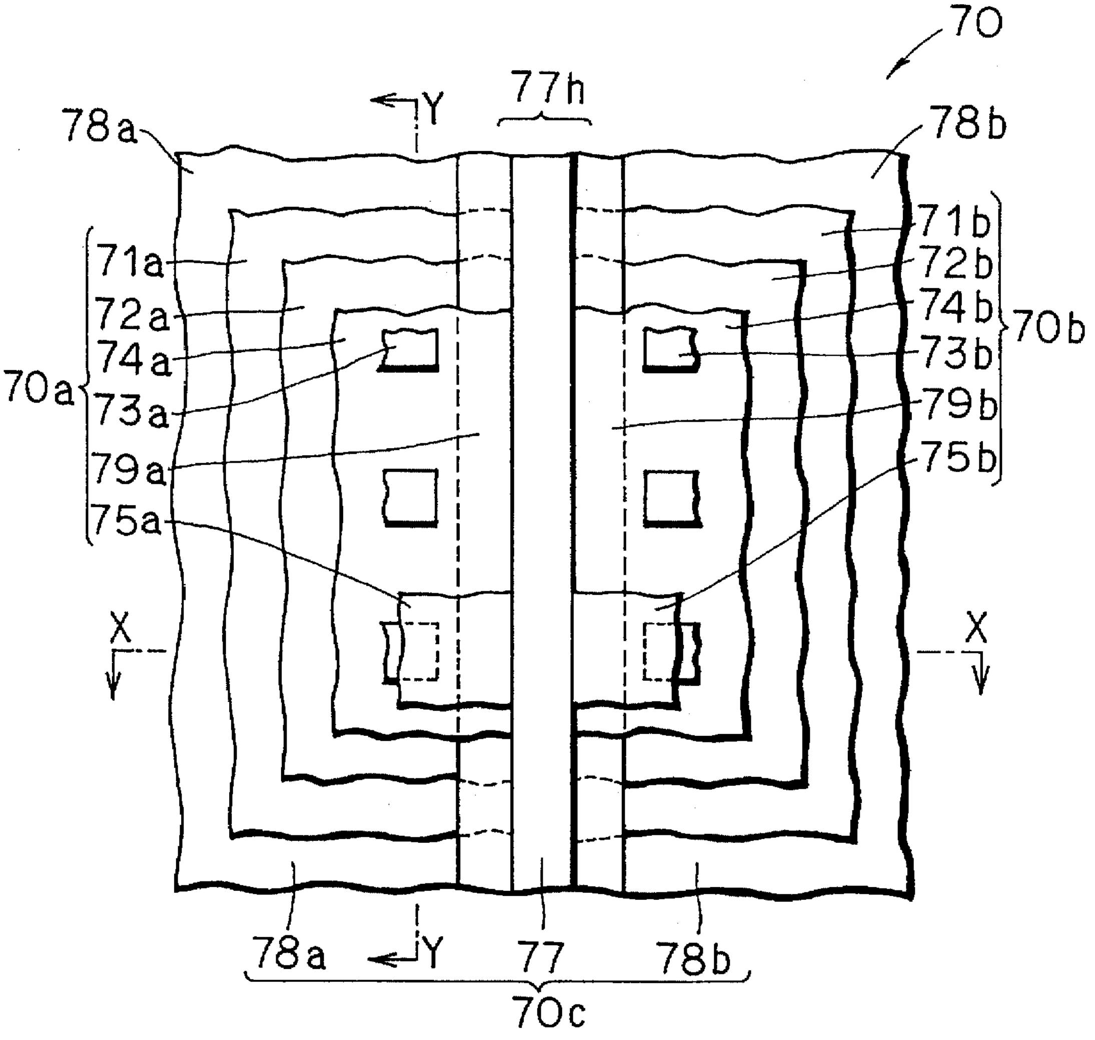
FIG. 22 is a plan view schematically showing a portion of a surface which is pressed onto a surface of a magnetic drum, viewed from a direction orthogonal to the rotation axis of the magnetic drum, of a recording head for a magnetic printer in accordance with a fifth embodiment of the present invention.
Figure 23:
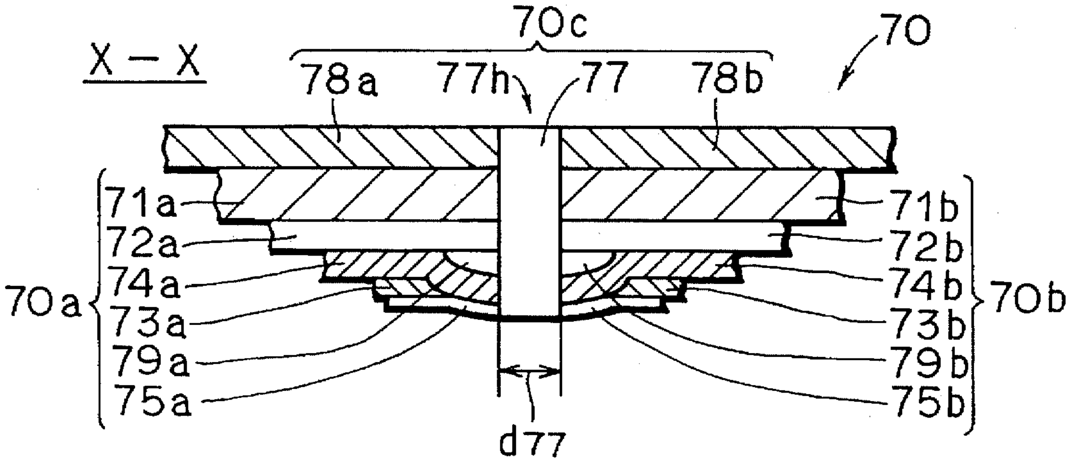
FIG. 23 schematically shows a cross section taken along the line X—X of the recording head for a magnetic printer shown in FIG. 22.
Figure 24:
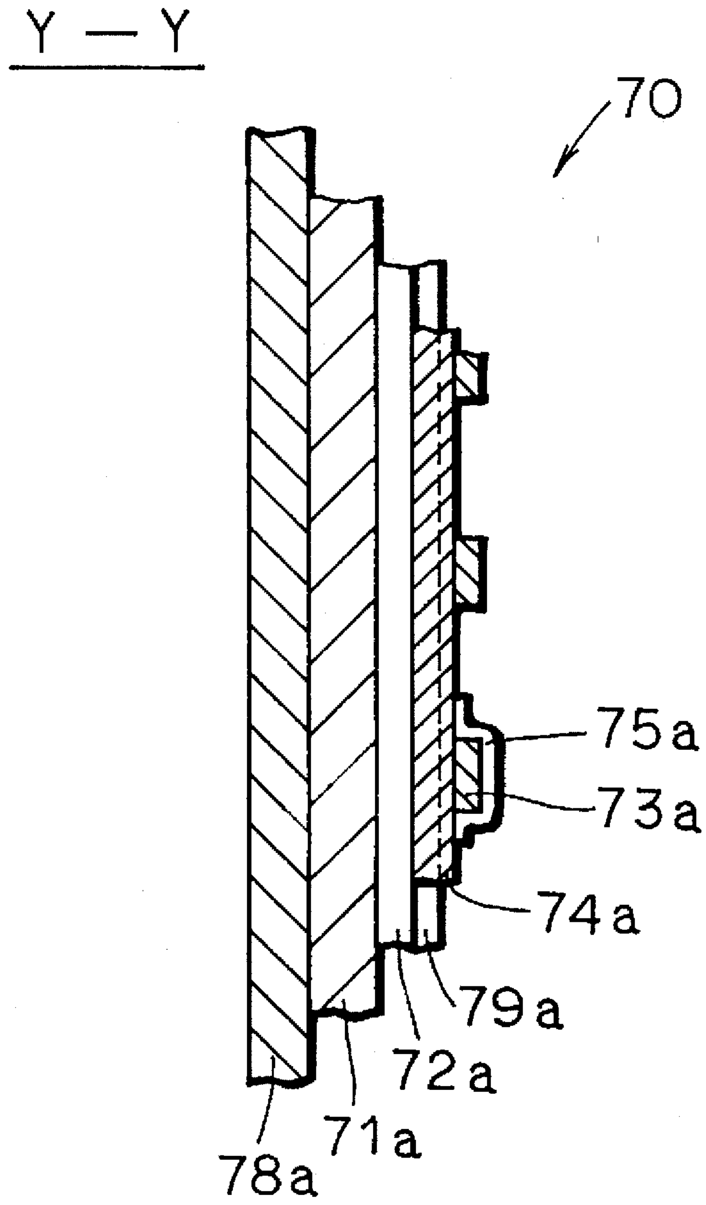
FIG. 24 schematically shows a cross section taken along the line Y—Y of the recording head for a magnetic printer shown in FIG. 22.

A fifth embodiment of the present invention will be described with reference to FIGS. 22 to 24. A recording head 70 for a magnetic printer of the present embodiment includes, referring to FIGS. 22 to 24, a first thermal head member **70*a*, a second thermal head 70*b*, and a magnetic head member 70*c***.

In recording head 70 for a magnetic printer, the second thermal head member **70*b* is juxtaposed with the first thermal head member 70*a* with a prescribed space 77*h* therebetween. Magnetic head member 70*c* is arranged on the first and second thermal head members 70*a* and 70*b***.

The space **77*h* corresponding to the magnetic gap of magnetic head member 70*c* extends, immediately above the space 77*h* between the first and the second thermal head members 70*a* and 70*b*, parallel to the space 77*h*. A non-magnetic layer 77 is provided in space 77*h***.

The first thermal head member **70*a* has similar structure as the first thermal head member 60*a* of recording head 60** for a magnetic printer in accordance with the fourth embodiment, except the following points.

In the first thermal head member **70*a*, substrate 61*a* of the thermal head member 60*a* of the fourth embodiment corresponds to a substrate 71*a*, heat insulating layer 62*a* corresponds to a heat insulating layer 72*a*, heating resistor 64*a* corresponds to a heating resistor 74*a*, the plurality of conductor portions 63*a* correspond to a plurality of conductor portions 73*a*, and protective film 65*a* corresponds to a protective film 75*a*, respectively. The first thermal head member 70*a* differs from the first thermal head member 60*a* of the fourth embodiment in that it is provided with a glaze layer 79*a*. More specifically, in the first thermal head member 70*a*, a glaze layer 79*a* formed at a prescribed region on a surface of heat insulating layer 72*a* has columnar shape with its cross section being a quarter of a circle or of an ellipsoid, and its one side is in contact with non-magnetic layer 77**.

Heating resistor **74*a* is provided to cover both the surface of heat insulating layer 72*a* and the surface of glaze layer 79*a*. Because of glaze layer 79*a*, heating resistor 74*a* has a curve portion. On the surface of heating resistor 74*a*, a plurality of conductor portions 73*a* are provided, with the tip end portion of each of the conductor portions 73*a* being in contact with the curve portion of heating resistor 74*a*. More specifically, between the non-magnetic layer 77 and the tip end portion of each of the plurality of conductor portions 73*a*, there is the curve portion of heating resistor 74*a***.

The second thermal head member **70*b* has similar structure as the first thermal head member 70*a*. More specifically, in the second thermal head member 70*b*, substrate 71*a* of the first thermal head member 70*a* corresponds to a substrate 71*b*, heat insulating layer 72*a* correspond to a heat insulating layer 72*b*, heating resistor 74*a* corresponds to a heating resistor 74*b*, the plurality of conductor portions 73*a* correspond to a plurality of conductor portions 73*b*, magnetic film 78*a* corresponds to a magnetic film 78*b*, and glaze layer 79*a* corresponds to a glaze layer 79*b***.

Respective ones of the plurality of conductor portions **73*a* provided on the side of substrate 71*a* and respective ones of the plurality of conductor portions 73*b* provided on the side of substrate 71*b* are arranged such that a pair of corresponding conductor portions are approximately aligned on a line, with a prescribed space 77*h*** therebetween.

In recording head 70 for a magnetic printer, the heating member provided in relation to the plurality of conductor portions 73*a* and 73*b* includes a heating resistor 74*a* bonded to the plurality of conductor portions 73*a*, and a heating resistor 74*b* lbonded to the plurality of conductor portions 73*b*.

Further, recording head 70 for a magnetic printer includes a magnetic film 78*a* on that surface of the substrate 71*a* which is opposite to the surface on which heating resistor 74*a* is provided, and a magnetic film 78*b* on that surface of substrate 71*b* which is opposite to the surface on which the heating resistor 74*b* is provided. In this recording head 70 for a magnetic printer, at least by the magnetic films 78*a* and 78*b*, the magnetic head member 70*c* is formed.

In recording head 70 for a magnetic printer, a nonmagnetic layer 77 is provided to extend through a space 77*h* between the first and second thermal head members 70*a* and 70*b* and through a space 77*h* between magnetic films 78*a* and 78*b* which are aligned with the space 77*h*, and by this non-magnetic layer 77, the first and the second thermal head members 77*a* and 77*b* and the magnetic head member 70*c* are integrated.

A non-magnetic metal such as Al, Cu, Ta may be used at the material of non-magnetic layer 77, in addition to an insulating glass materials such as $SiO_2$. In recording head 70 for a magnetic printer, as is apparent from FIGS. 22 to 24, non-magnetic layer 77 and tip end portions of the plurality of conductor portions 73*a* and 73*b* are provided apart from each other by means of heating resistors 74*a*, 74*b* and/or glaze layers 79*a*, 79*b*, and as a result, even when the non-magnetic metal is used, each of the plurality of conductor portions 73*a* and 73*b* is not electrically short-circuited.

Preferably, the width (gap length) $d_{77}$ lof the space 77*h* between the first and the second thermal head members 70*a* and 70*b* should be about 0.1 μ to about 3.0 μm.

In recording head 70 for a magnetic printer, the mechanical strength required of a recording head for a magnetic printer is ensured by the substrates 71*a* and 71*b* as in the recording head 60 for a magnetic printer of the fourth embodiment. Therefore, in recording head 70 for a magnetic printer, similar to recording head 60 for the magnetic printer, the magnetic field leaking from the space 77*h* as the magnetic gap of magnetic head member 70*c* can be intensified by making thin the magnetic films 78*a* and 78*b*.

When a current is applied to each of the plurality of conductor portions 73*a* and 73*b*, heating resistor 74*a* provided on the side of substrate 71*a* in relation to the plurality of conductor portions 73*a* and heating resistor 74*b* provided on the side of substrate 71*b* in relation to the plurality of conductor portions 73*b* are heated, respectively. Portions of the heating resistors 74*a* and 74*b* which are heated of the recording head 70 for a magnetic printer are pressed onto the magnetic medium formed on the surface of the magnetic drum, and thus a magnetic latent image is formed on the magnetic medium.

Further, in recording head 70 for a magnetic printer, when a magnetic latent image is formed on the magnetic medium formed on the surface of the magnetic drum, it is possible to apply a bias magnetic field to the magnetic medium by means of magnetic head member 70*c*. Further, in recording head 70 for a magnetic printer, when a magnetic latent image is formed on the magnetic medium formed on the surface of the magnetic drum using magnetic head member 70*c*, thermal bias of the first thermal head member 70*a* and/or the second thermal head member 70*b* can be applied. Therefore, by this recording head 70 for a magnetic printer, a magnetic latent image having clear boundary between opposite magnetic polarities can be formed on the magnetic medium.

Since glaze layers 79*a* and 79*b* are provided in recording head 70 for a magnetic printer, contact between recording head 70 for a magnetic printer and the magnetic medium formed on the surface of the magnetic drum is further ensured, and the heat (information) of the heated portion of recording head 70 for a magnetic printer is transmitted with high efficiency of thermal input to the magnetic medium. An insulating glass such as $SiO_2$ may be used as the material of glaze layers 79*a*, 79*b*, and the thickness thereof is about 50 μm.

Figure 25A:
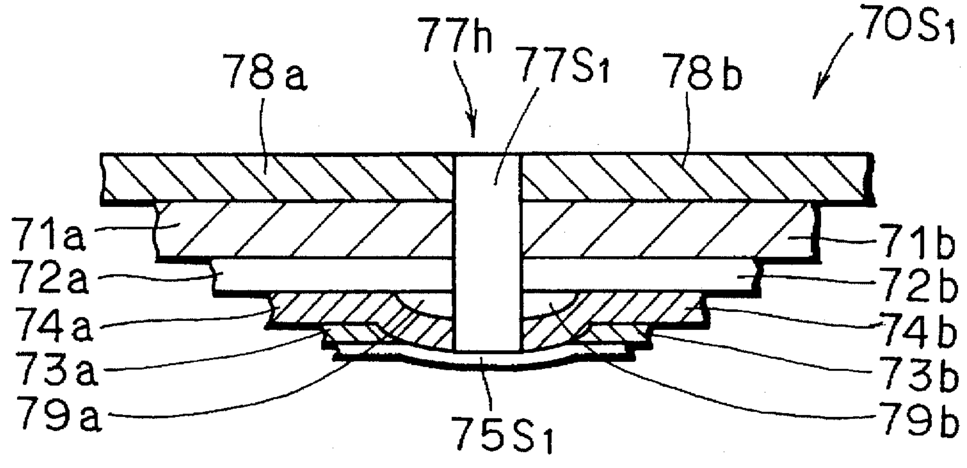
FIGS. 25A, 25B and 25C are cross sections schematically showing three modifications of a recording head 70 for a magnetic printer.
Figure 25B:
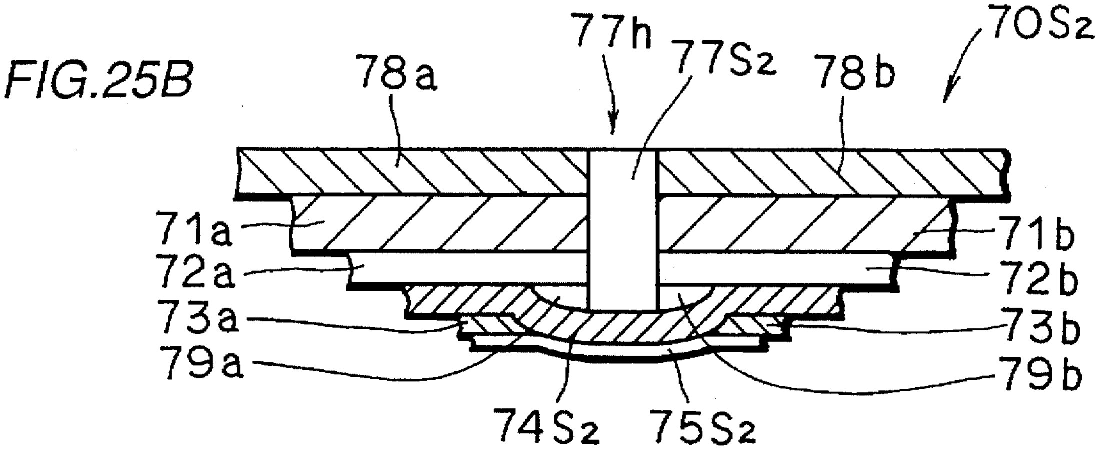
Figure 25C:
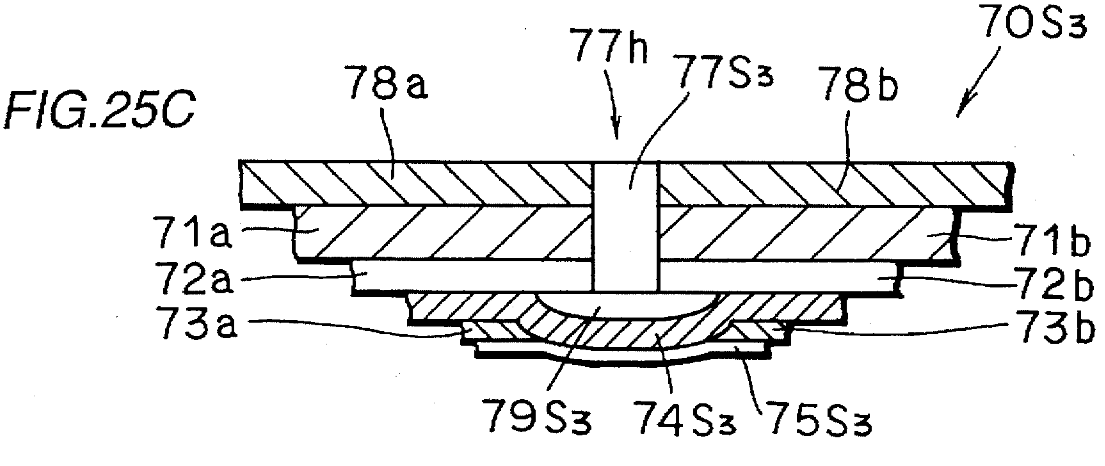

FIGS. 25A, 25B and 25C show three modifications of recording head 70 for a magnetic printer in accordance with this embodiment. For simplicity of description, only schematic cross sections corresponding to FIG. 23 of the recording head for a magnetic printer are shown in FIGS. 25A, 25B and 25C. Portions similar to those of recording head 70 for a magnetic printer are denoted by the same reference characters and description thereof is not repeated.

Recording head $\mathbf{70S_1}$ for a magnetic printer shown in FIG. 25A differs from recording head 70 for a magnetic printer only in that protective film $\mathbf{75S_1}$ is formed continuously including the region immediately below nonmagnetic layer $\mathbf{77S_1}$.

Recording head $\mathbf{70S_2}$ for a magnetic printer shown in FIG. 25B differs from recording head 70 for a magnetic printer only in that heating resistor $\mathbf{74S_2}$ and protective film $\mathbf{75S_2}$ are formed continuously including the region immediately below non-magnetic layer $\mathbf{77S_2}$.

Recording head $\mathbf{70S_3}$ for a magnetic printer shown in FIG. 25C differs from recording head 70 for a magnetic printer only in that glaze layer $\mathbf{79S_3}$, heating resistor $\mathbf{74S_3}$ and protective film $\mathbf{75S_3}$ are formed continuously including the region immediately below non-magnetic layer $\mathbf{77S_3}$.

Figure 26:
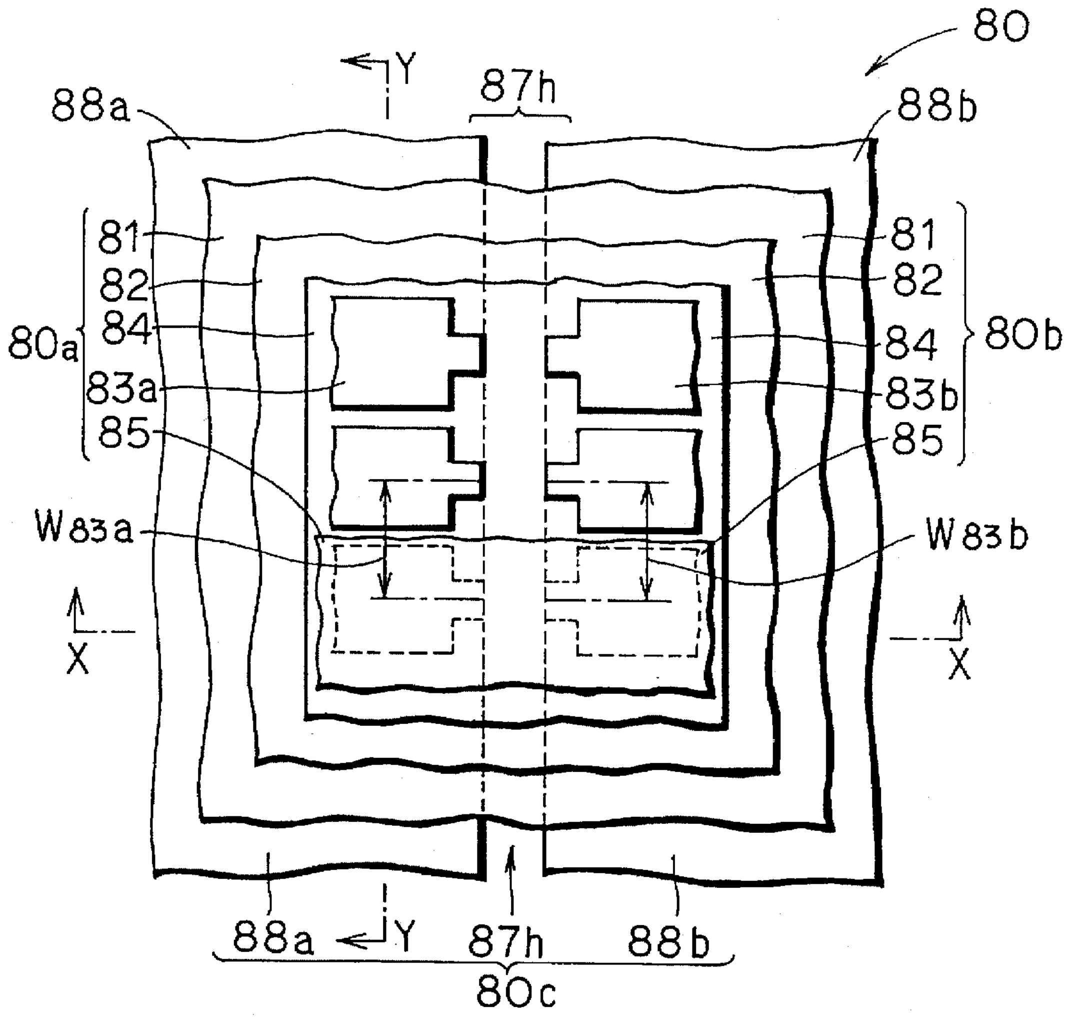
FIG. 26 is a plan view schematically showing a portion of a surface which is pressed onto a surface of a magnetic drum, viewed from a direction orthogonal to the rotation axis of the magnetic drum, of a recording head for a magnetic printer in accordance with a sixth embodiment of the present invention.
Figure 27:
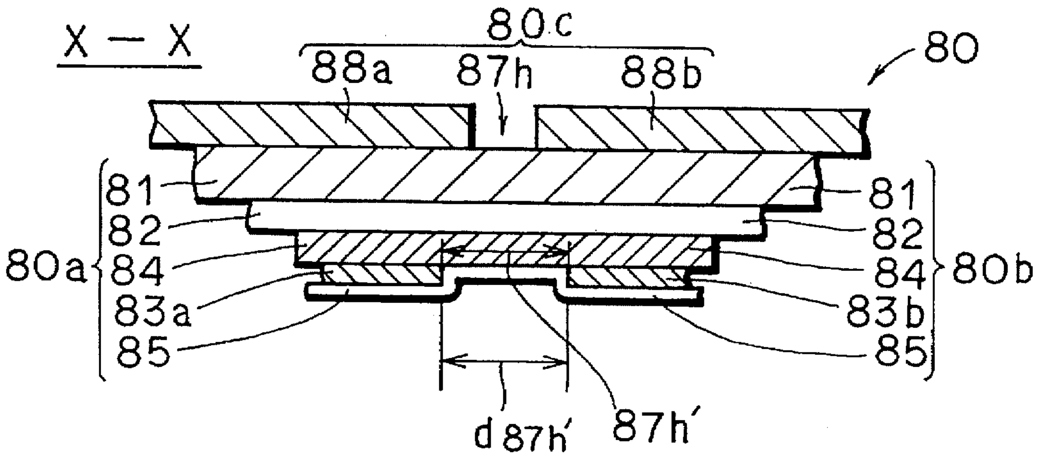
FIG. 27 schematically shows a cross section taken along the line X—X of the recording head for a magnetic printer shown in FIG. 26.
Figure 28:
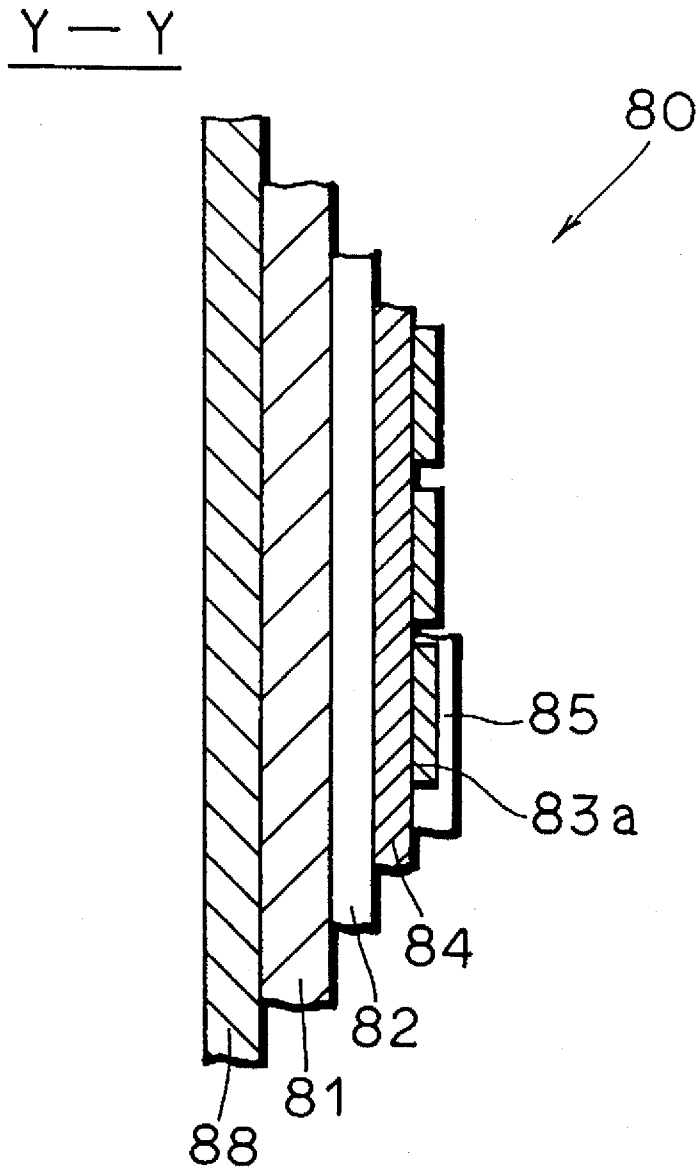
FIG. 28 schematically shows a cross section taken along the line Y—Y of the recording head for a magnetic printer shown in FIG. 26.

A sixth embodiment of the present invention will be described with reference to FIGS. 26 to 28. Referring to FIGS. 26 to 28, recording head 80 for a magnetic printer in accordance with this embodiment includes a first thermal head member 80*a*, a second thermal head member 80*b* and a magnetic head member 80*c*. The first and the second thermal head members 80*a* and 80*b* share at least a substrate 81.

Recording head 80 for a magnetic printer includes a substrate 81, a heat insulating layer 82 formed on one surface of substrate 81, a heating resistor 84 formed on a prescribed region of a surface of heat insulating layer 82, a plurality of conductor portions 83*a* and a plurality of conductor portions 83*b* formed on a surface of heating resistor 84, and protective film 85 formed to cover the surface of heat insulating layer 82, the surface of heating resistor 84 and the surfaces of the plurality of conductor portions 83*a* and 83*b*.

On the other surface of substrate 81 which is opposite to one surface on which the heating resistor is provided (hereinafter simply referred to as the other surface), a pair of magnetic films 88*a* and 88*b* are provided. Magnetic film 88*a* is juxtaposed with magnetic film 88*b* with a prescribed space 87*h* therebetween. A plurality of conductor portion 83*a* are provided on one surface of substrate 81 corresponding to the magnetic film 88*a*.

The plurality of conductor portions 83*b* are juxtaposed with the plurality of conductor portions 83*a* with a prescribed space 87*h*' therebetween, corresponding to the magnetic film 88*b* on one surface of substrate 81. The heating member provided in relation to the plurality of conductor portions 83*a* and 83*b* includes a heating resistor 84 provided at the space 87*h*' between the plurality of conductor portions 83*a* and 83*b*.

The plurality of conductor portions 83*a* and the plurality of conductor portions 83*b* are provided parallel to each other spaced by a prescribed narrow distance $W_{83a}$, $W_{83b}$ from each other, in a line orthogonal to the rotation axis of the magnetic drum. Respective ones of the plurality of conductor portions 83*a* and respective ones of the plurality of conductor portions 83*b* are arranged such that a pair of corresponding conductor portions are approximately aligned on a line, with a prescribed space 87*h*' therebetween.

Each of the plurality of conductor portions 83*a* and 83*b* has its tip end portion narrowed, so that the value of resistance of the heated portion of heating resistor 84 to be heated becomes high, as shown in FIG. 26.

Magnetic head member 80*c* is arranged on the first and second thermal head members 80*a* and 80*b*. The space 87*h* which corresponds to the magnetic gap of magnetic head member 80*c* is aligned with the space 87*h* between the first and the second thermal head members 80*a* and 80*b*.

The first thermal head member 80*a* includes a substrate 81, a heat insulating layer 82 formed on one surface of substrate 81, a heating resistor 84 formed at a prescribed region on a surface of heat insulating layer 82, a plurality of conductor portions 83*a* formed on the surface of heating resistor 84, and a protective film 85 provided to cover the surface of heat insulating layer 82, the surface of heating resistor 84 and the surfaces of the plurality of conductor portions 83*a*.

The second thermal head member 80*b* includes a substrate 81, a heat insulating layer 82 formed on the surface of substrate 81, a plurality of conductor portions 83*b* formed on the surface of heat insulating layer 82, and a protective film 85 formed to cover the surfaces of heat insulating layer 82, heating resistor 84 and the plurality of conductor portions 83*b*.

A method of manufacturing recording head 80 for a magnetic printer will be described in the following. Since the first and the second thermal head members 80*a* and 80*b* of recording head 80 for a magnetic printer can be manufactured through the known method of manufacturing a thermal head, description of the manufacturing method of the first and the second thermal head members 80*a* and 80*b* is not given here.

Figure 29A:
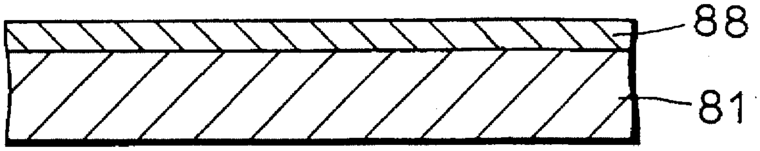
FIGS. 29A, 29B, 29C, 29D and 29E are cross sections schematically showing, in order, the steps of forming a pair of magnetic films 88*a* and 88*b* on the other surface of a substrate 81 in manufacturing a recording head 80 for a magnetic printer.
Figure 29B:
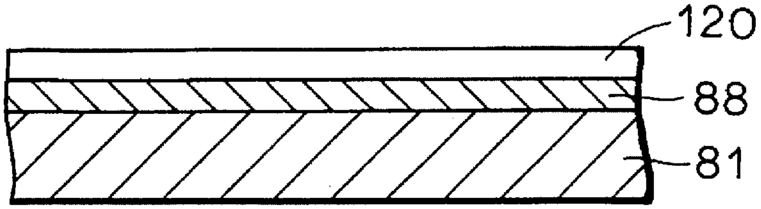
Figure 29C:
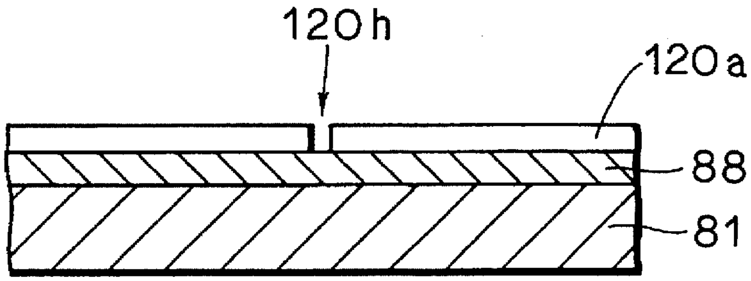

First, in the step shown in FIG. 29A, a magnetic thin film 88 is formed by known coating method, sputtering, vapor deposition or the like on the other surface of substrate 81. Next, in the step shown in FIG. 29B, a photosensitive material 120 such as a photoresist is provided on a surface of magnetic thin film 88. Then, in the step shown in FIG. 29C, that portion of photosensitive material 120 which would be the magnetic gap of magnetic head member 80*c* of recording head 80 for a magnetic printer is exposed with a laser beam, for example, by a known lithography, and then that portion is developed, so that a resist pattern 120*a* having an opening 120*h* is provided.

Figure 29D:
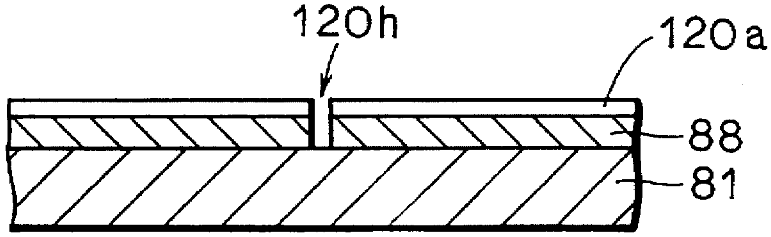
Figure 29E:
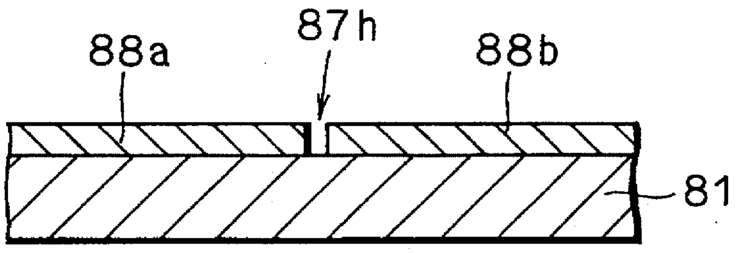

Next, in the step shown in FIG. 29D, magnetic thin film 88 exposed through the opening 120*h* is etched by known wet etching, dry etching or the like. In the step shown in FIG. 29E, a pair of magnetic films 88*a* and 88*b* are formed on the other surface of substrate 81 by removing the photosensitive material 120*a*.

Thereafter, on one surface of substrate 81 which is opposite to said the other surface on which magnetic films 88*a* and 88*b* have been formed, a heat insulating layer 82, a heating resistor 84, a plurality of conductor portions 83*a* and 83*b* and a protective film 85 are formed in this order, and thus recording head 80 for a magnetic printer is completed.

In the step of forming the plurality of conductor portions 83*a* and 83*b*, the plurality of conductor portions 83*a* and 83*b* are formed such that the space 87*h* between magnetic films 88*a* and 88*b* extends parallel thereto at immediately above the space between the plurality of conductor portions 83*a* and 83*b*.

In the method of manufacturing a recording head 80 for a magnetic printer described above, first a pair of magnetic films 88*a* and 88*b* are formed on the other surface of substrate 81, and then the first and the second thermal head members 80*a* and 80*b* are formed on one surface of the substrate 81. However, the first and the second thermal head members 80*a* and 80*b* may be first formed on one surface of substrate 81, and then a pair of magnetic films 88*a* and 88*b* may be formed on the other surface of substrate 81 such that the space 87*h* between the magnetic films 88*a* and 88*b* is aligned with the space between the plurality of conductor portions 83*a* and a plurality of conductor portions 83*b* formed on said one surface of the substrate 81.

Another method of manufacturing recording head 80 for a magnetic printer will be described in the following with reference to FIGS. 30A to 30E. Since the first and the second thermal head members 80*a* and 80*b* of recording head 80 for a magnetic printer can be manufactured through a known method of manufacturing a thermal head, description of the steps for manufacturing the first and the second thermal head members 80*a* and 80*b* is not given here.

Figure 30A:
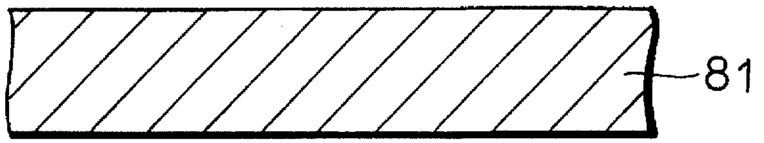
FIGS. 30A, 30B, 30C, 30D and 30E are cross sections schematically showing the steps of forming a pair of magnetic films 88*a* and 88*b* on the other surface of the substrate 81 in manufacturing the recording head 80 for a magnetic printer.
Figure 30B:
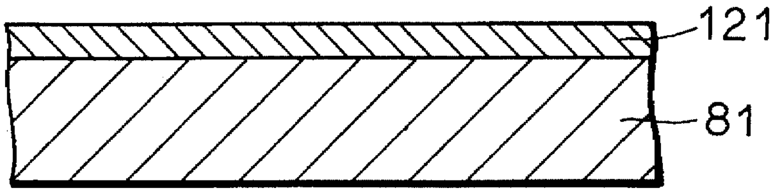
Figure 30C:
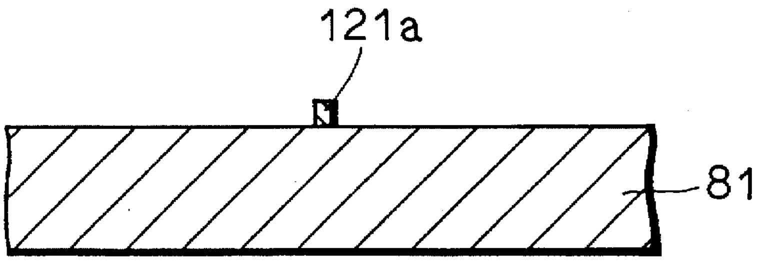

First, in the step shown in FIG. 30A, a substrate 81 is prepared, and thereafter, in the step shown in FIG. 30B, a photosensitive body 121 such as a photoresist is formed on the other surface of substrate 81. Next, in the step shown in FIG. 30C, by exposing and developing the photosensitive body 121 by, for example, laser beam, by using the known lithography, a resist pattern 121*a* is formed. Referring to FIG. 30C, in this resist pattern 121*a*, resist is left at a portion which will serve as the magnetic gap of magnetic head member 80*c* of recording head 80 for a magnetic printer.

Figure 30D:
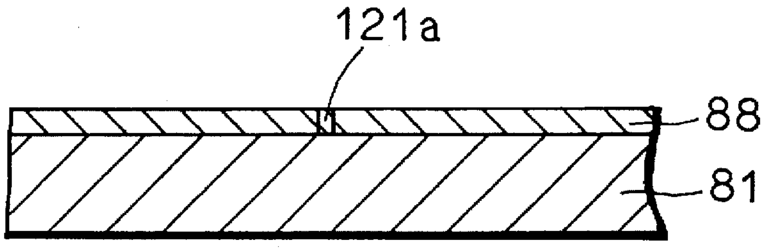
Figure 30E:
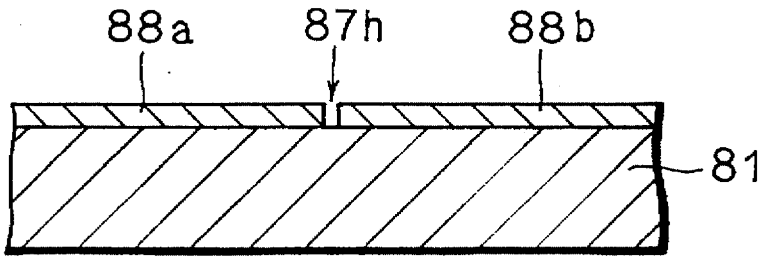

Next, in the step shown in FIG. 30D, a magnetic thin film 88 is formed by known coating method, sputtering, vapor deposition, electrolytic plating, electroless plating or the like in accordance with the resist pattern 121*a*. Then, in the step shown in FIG. 30E, the left photosensitive body 121*a* is removed, so that a pair of magnetic films 88*a* and 88*b* are formed on said other surface of substrate 81.

Thereafter, on one surface of substrate 81 which is opposite to said the other surface on which magnetic films 88*a* and 88*b* have been formed, heat insulating layer 82, heating resistor 84, the plurality of conductor portions 83*a* and 83*b* and protective film 85 are formed in this order, and thus the recording head 80 for a magnetic printer is completed. In the step of forming the plurality of conductor portions 83*a* and 83*b*, the plurality of conductor portions 83*a* and 83*b* are formed such that the space 87*h* between magnetic films 88*a* and 88*b* is aligned with the space 87*h*' between the plurality of conductor portions 83*a* and 83*b*.

In the above described method of manufacturing recording head 80 for a magnetic printer, first a pair of magnetic films 88*a* and 88*b* are formed on the other surface of substrate 81 and, thereafter, the first and the second thermal head members 80*a* and 80*b* are formed on one surface of substrate 81. However, the first and the second thermal head members 80*a* and 80*b* may be formed at first on one surface of substrate 81 and thereafter, a pair of magnetic films 88*a* and 88*b* may be formed such that the space 87*h*' between the plurality of conductor portions 83 and 83 formed on said one surface of the substrate 81 is aligned with a space 87*h* between the magnetic films 88*a* and 88*b*.

Figure 31:
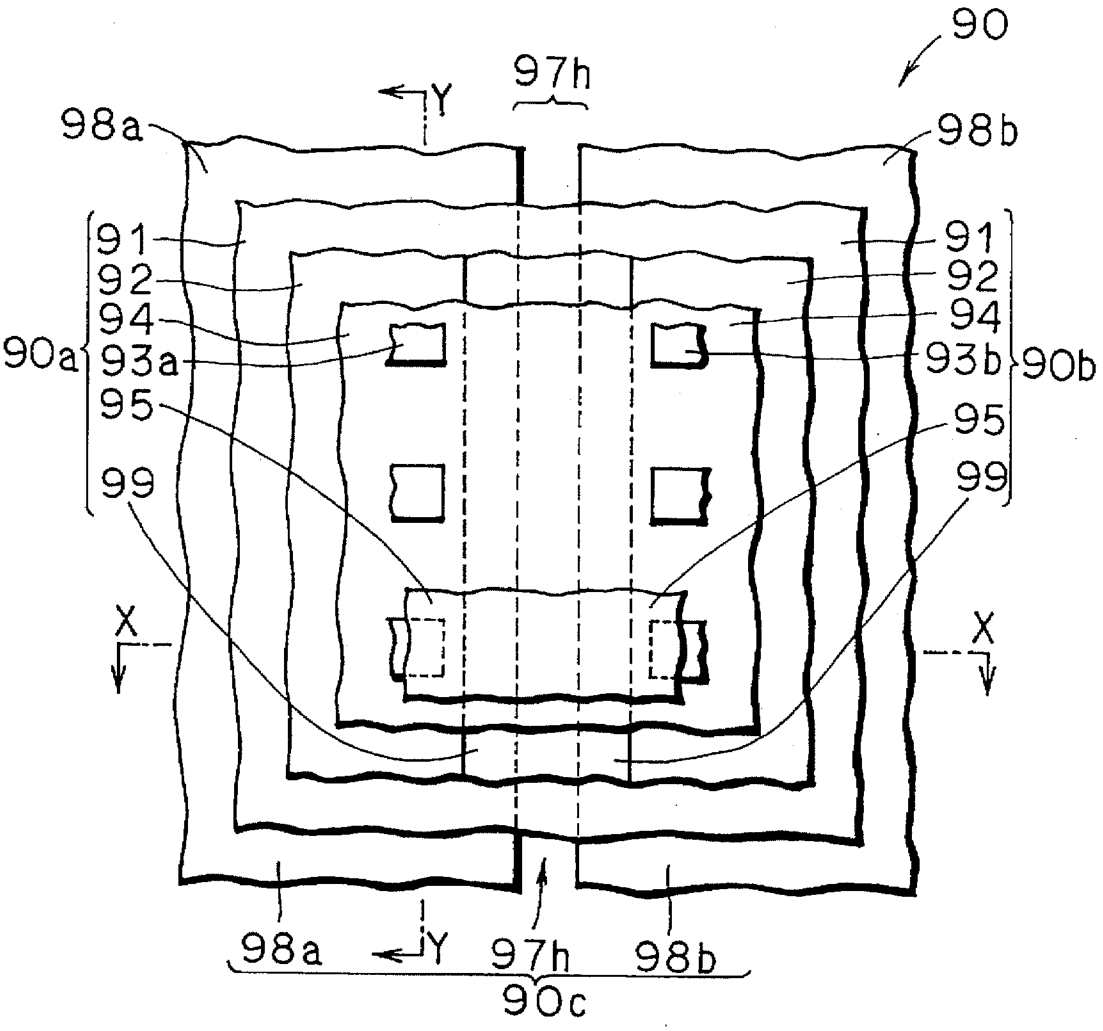
FIG. 31 is a plan view schematically showing a portion of a surface which is pressed onto a surface of a magnetic drum, viewed from a direction orthogonal to the rotation axis of the magnetic drum, of the recording head for a magnetic printer in accordance with a seventh embodiment of the present invention.
Figure 32:
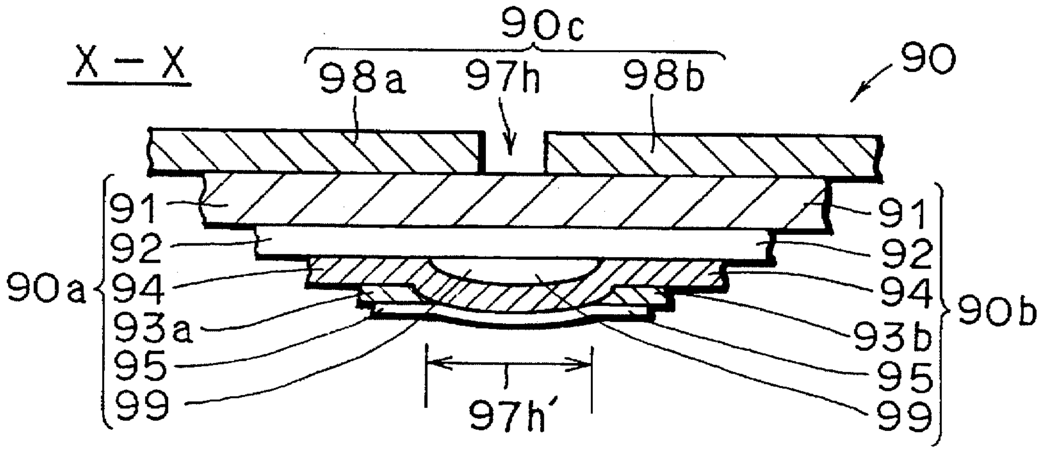
FIG. 32 schematically shows a cross section taken along the line X—X of the recording head for a magnetic printer shown in FIG. 31.
Figure 33:
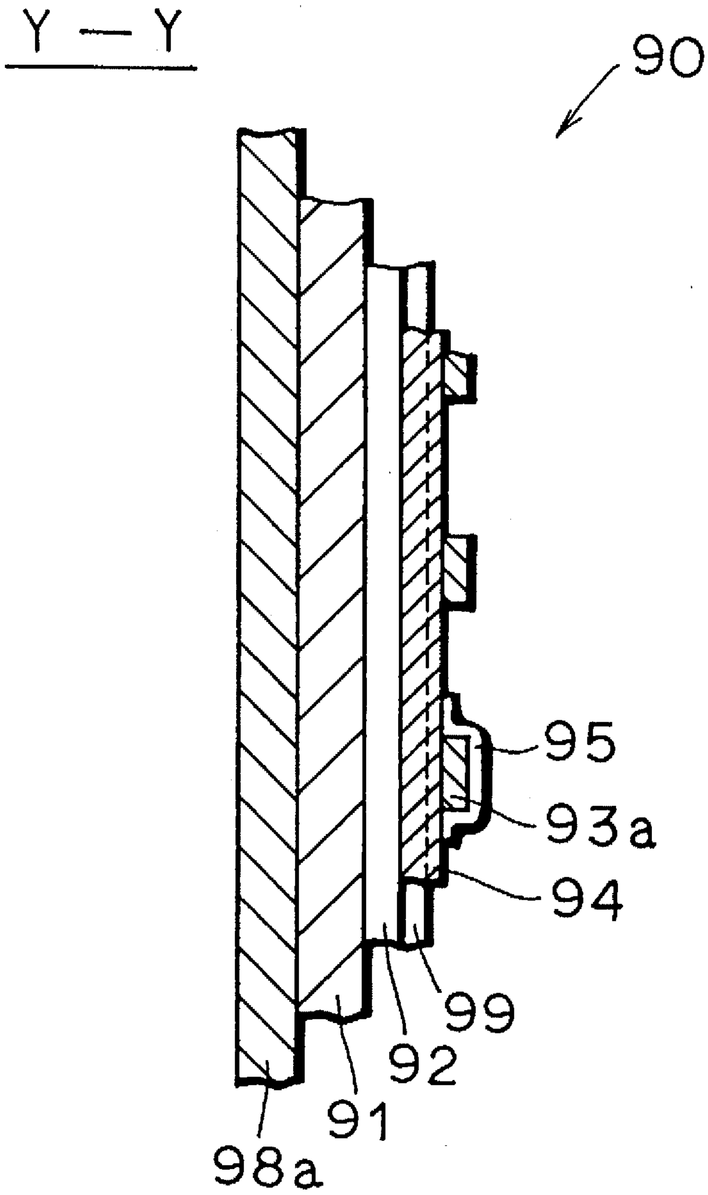
FIG. 33 schematically shows a cross section taken along the line Y—Y of the recording head for a magnetic printer shown in FIG. 31.

A seventh embodiment of the present invention will be described with reference to FIGS. 31 to 33.

In recording head 90 for a magnetic printer in accordance with the present embodiment, a substrate 91, a heat insulating layer 92, magnetic films 98*a* and 98*b* and the space 97*h* therebetween have similar structures as the corresponding portions of the sixth embodiment described above, as shown in FIGS. 31 to 33.

In this embodiment, there is provided a glaze layer 99 of a non-magnetic insulator having elliptical or semicircular cross section between heat insulating layer 92 and heating resistor 94, and heating resistor 94 is formed continuously covering the surfaces of heat insulating layer 92 and glaze layer 99. On the lower surface of heating resistor 94 except that portion which is immediately below the glaze layer 99, conductor portions 93*a* and 93*b* are formed, and a protective film 95 covers the conductor portions 93*a* and 93*b* as well as the surface of the heating resistor 94.

In the recording head for a magnetic printer in accordance with the present embodiment, the first and the second thermal head members 90*a* and 90*b* are formed sharing an integral substrate 91, heat insulating layer 92 and heating resistor 94. By applying a current to conductor portions 93*a* and 93*b* respectively, heating resistor 94 close thereto radiates heat, so that respective thermal head members operate. Further, magnetic thin films 98*a* and 98*b* constitute a magnetic head member 90*c* with the space 97*h* therebetween serving as the magnetic gap.

In the recording head for a magnetic printer of the present embodiment, since glaze layer 99 is provided between heat insulating layer 92 and heating resistor 94, the contact surface between recording head 90 for a magnetic printer and the magnetic recording medium comes to be a convex, so that the contact with the magnetic recording medium can be further ensured. As a result, heat (information) of the heated portion of the recording head 90 for a magnetic printer can be input and transmitted to the magnetic recording medium with high efficiency. A non-magnetic glass such as $SiO_2$ may be used as the material of glaze layer 99, and preferably, the thickness is about 50 μm. In this embodiment, the space 97*h*' between conductor portions 93*a* and 93*b* should preferably be about 10 μm to about 300 μm.

Other structures, functions and effects of recording head 90 for a magnetic printer of the present embodiment are similar to those of recording head 80 for a magnetic printer in accordance with the sixth embodiment described above.

Figure 35:
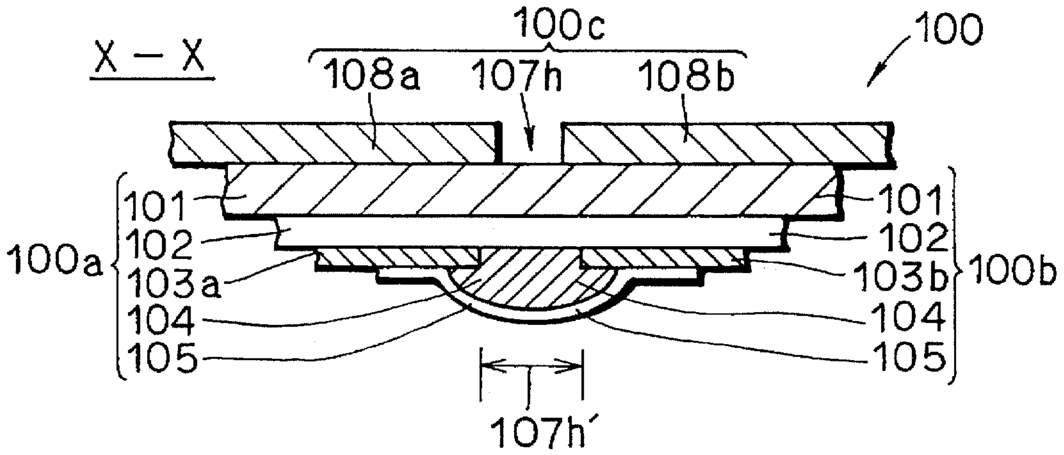
FIG. 35 schematically shows a cross section taken along the line X—X of the recording head for a magnetic printer shown in FIG. 34.
Figure 36:
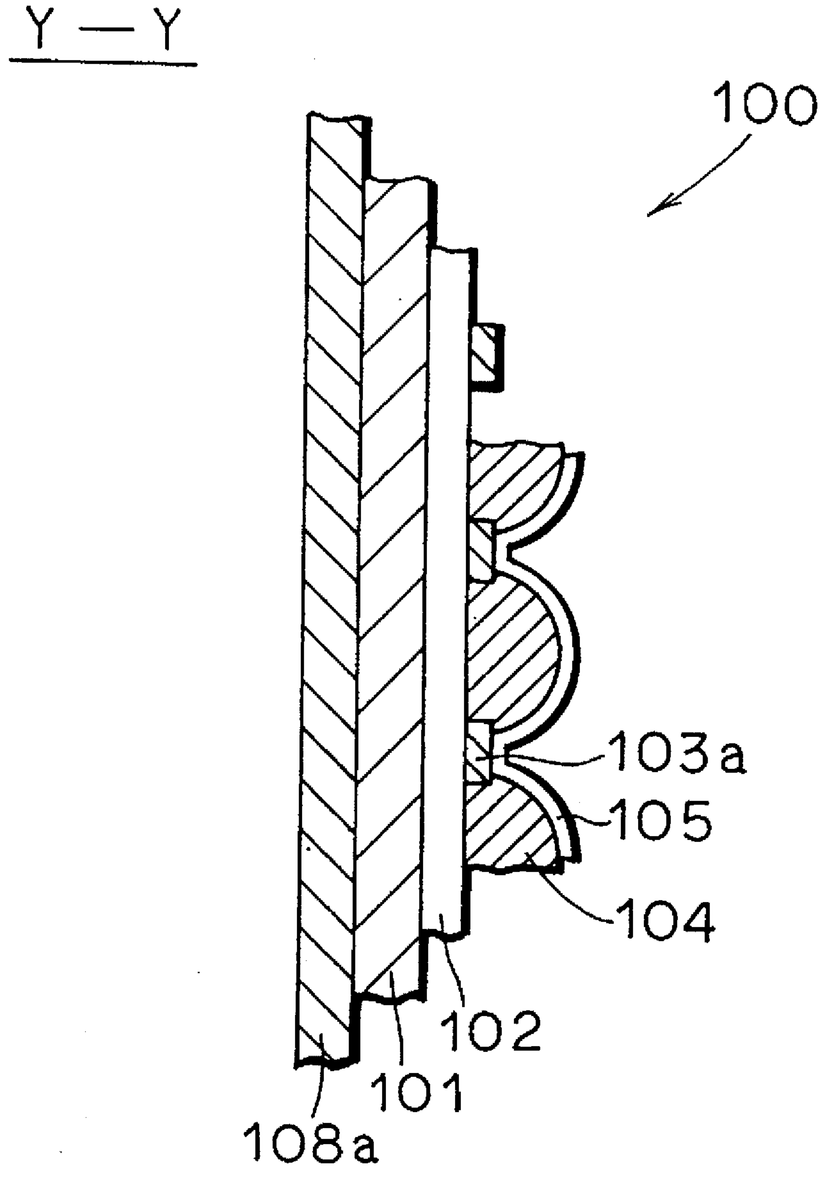
FIG. 36 schematically shows a cross section taken along the line Y—Y of the recording head for a magnetic printer shown in FIG. 34.
Figure 37:
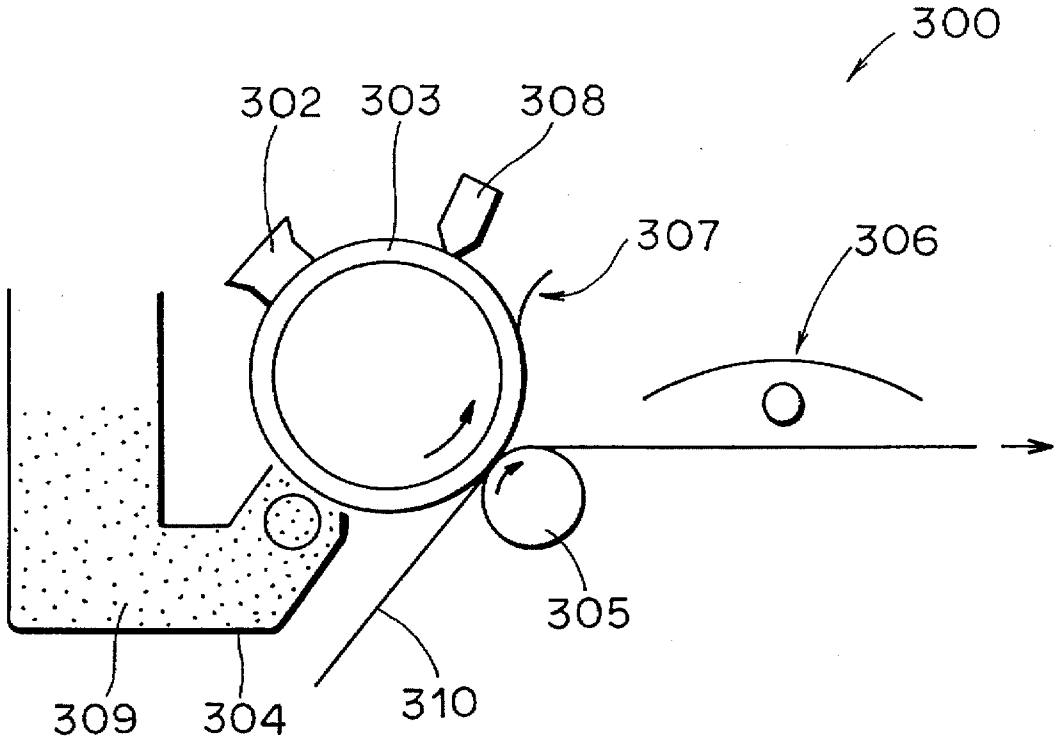
FIG. 37 PRIOR ART
FIG. 37 is a schematic diagram showing the operation of a conventional magnetic printer disclosed in Japanese Patent Laying-Open No. 62-65070.
Figure 38:
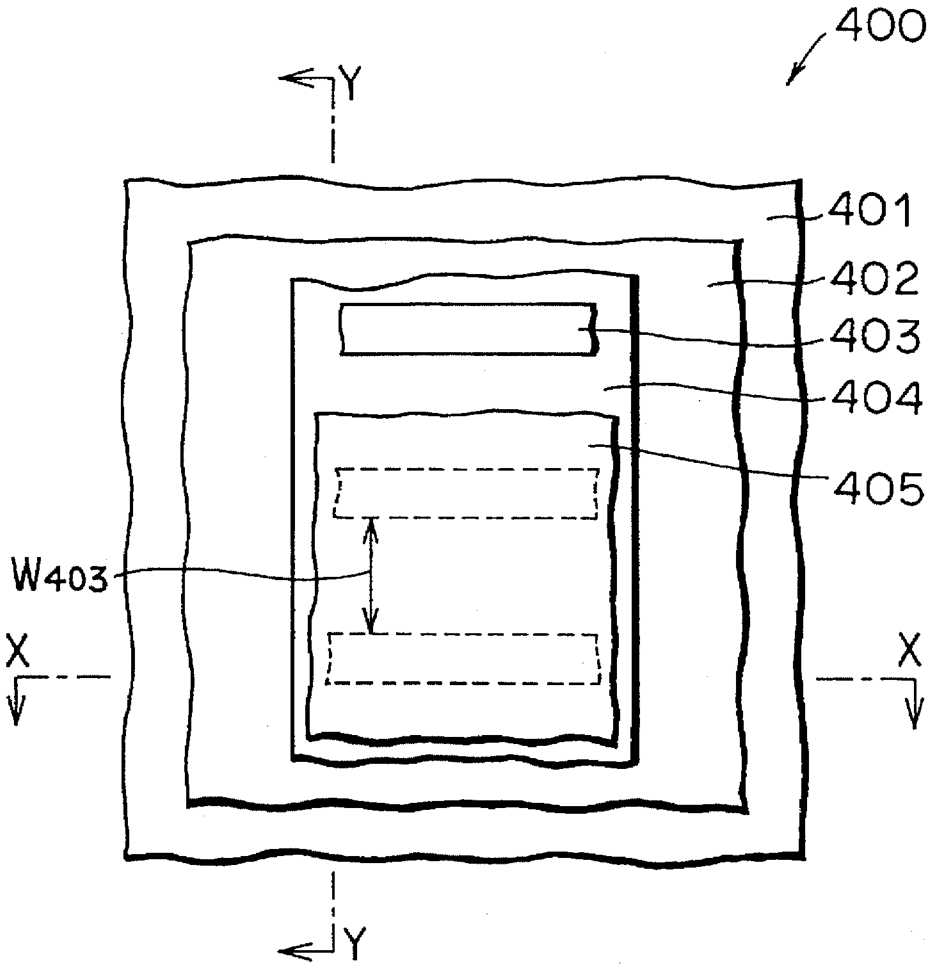
FIG.38 PRIOR ART
FIG. 38 is a plan view schematically showing a portion of a surface which is pressed onto a surface of a magnetic drum viewed from above, of the conventional thermal head.
Figure 39:
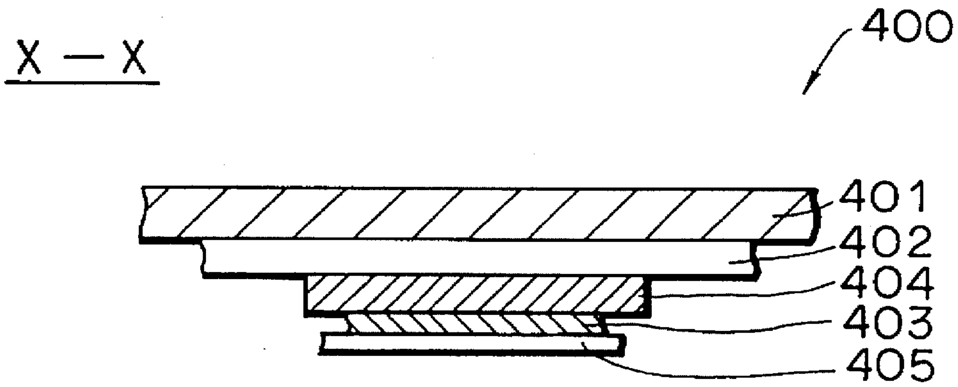
FIG.39 PRIOR ART
FIG. 39 schematically shows a cross section taken along the line X—X of the conventional thermal head shown in FIG. 38.
Figure 40:
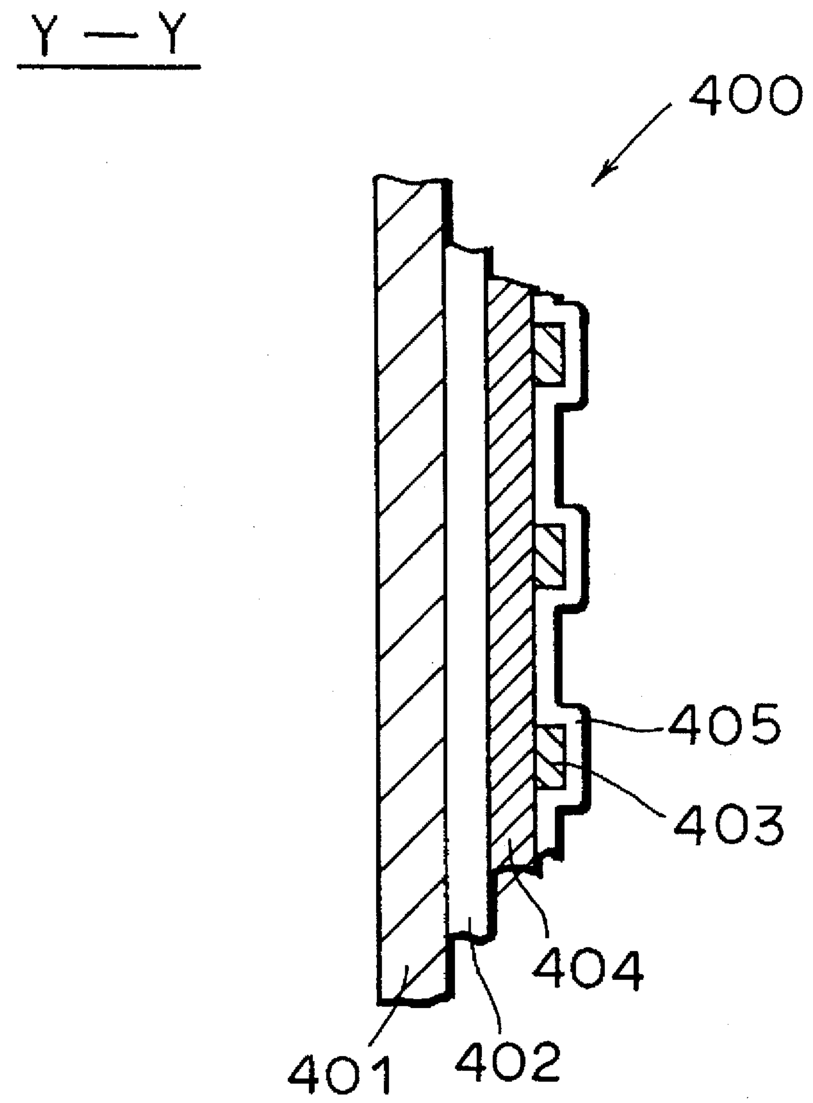
FIG.40 PRIOR ART
FIG. 40 schematically shows a cross section taken along the line Y—Y of the conventional thermal head shown in FIG. 38.
Figure 41:
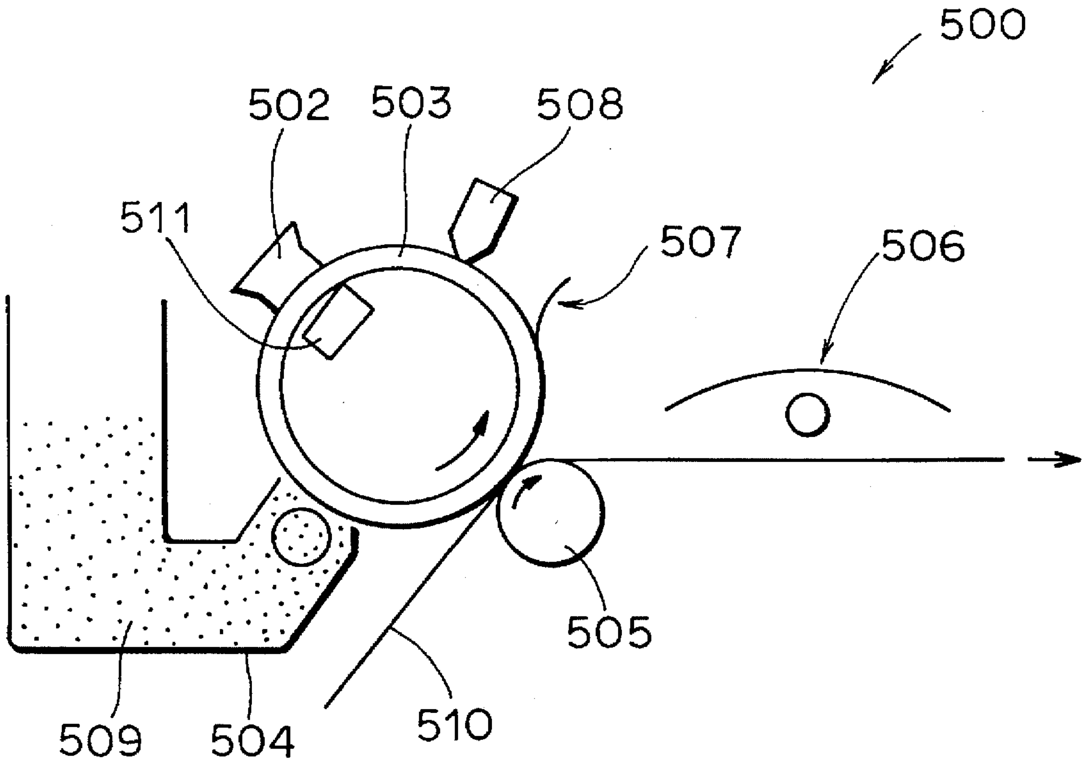
FIG.41 PRIOR ART
FIG. 41 is a schematic diagram showing the operation of a magnetic printer disclosed in Japanese Patent Laying-Open No. 3-154067.
Figure 42A:
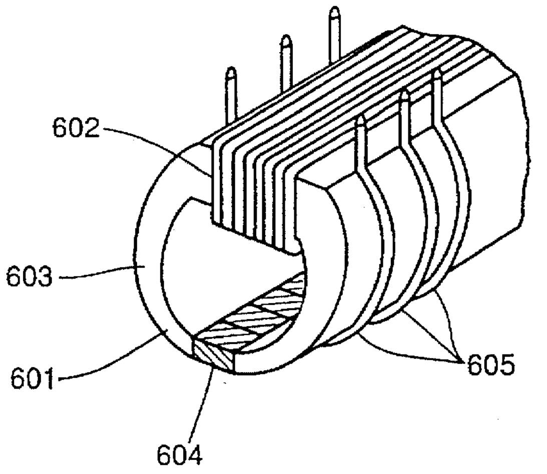
FIG. 42A is a schematic perspective view of a recording head for a magnetic printer disclosed in Japanese Patent Laying-Open No. 58-74362
Figure 42B:
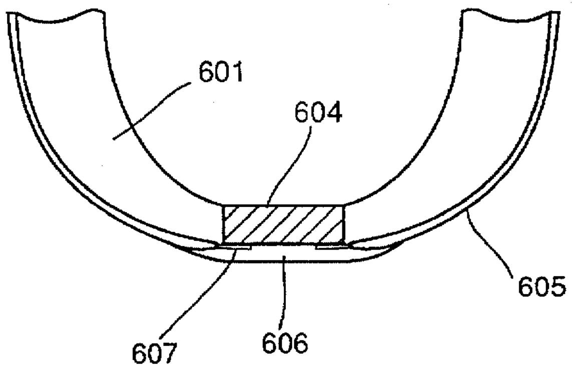
FIG. 42B is an enlarged view of a portion of the recording head for a magnetic printer shown in FIG. 42A which contacts with the magnetic recording medium.
Figure 43:
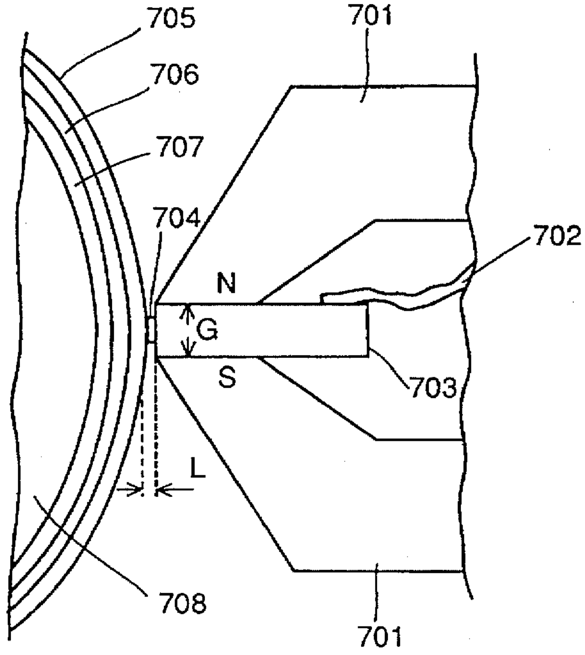
FIG. 43 shows, in enlargement, recording head portion of the magnetic printer disclosed in Japanese Patent Laying-Open No. 64-27961.

An eighth embodiment of the present invention will be described with reference to FIGS. 34 to 36.

A recording head 100 for a magnetic printer in accordance with the present embodiment has similar structure as the corresponding portions of recording heads 80 and 90 for a magnetic printer in accordance with the sixth and seventh embodiments above, in that it includes a pair of magnetic thin films 108*a* and 108*b* formed on one surface of a substrate 101 with a space 107*h* therebetween and heat insulating layer 102 formed on the other surface of substrate 101. In recording head 100 for a magnetic printer of this embodiment, on a surface of heating insulating layer 102 opposite to substrate 101, a pair of conductor portions 103*a* and 103*b* are formed with a space 107*h*' therebetween, and at the space 107*h*' and at the surfaces of conductor portions 103*a* and 103*b* in the vicinity thereof, heating resistor 104 is formed protruding downward in a semicircular or semielliptical shape. Surfaces of heating resistor 104 and of conductors 103*a* and 103*b* are covered with a protective film 105.

In recording head 100 for a magnetic printer in accordance with the present embodiment, the first and the second thermal head members 100*a* and 100*b* share the substrate 101, the heat insulating layer 102 and the heating resistor 104, while conductor portions 103*a* and 103*b* are provided for thermal head members 100*a* and 100*b*, respectively, so that these members serve as independent thermal heads. The pair of magnetic thin films 108*a* and 108*b* form a magnetic head member 100*c*, with the space 107*h* serving as the magnetic gap.

Figure 34:
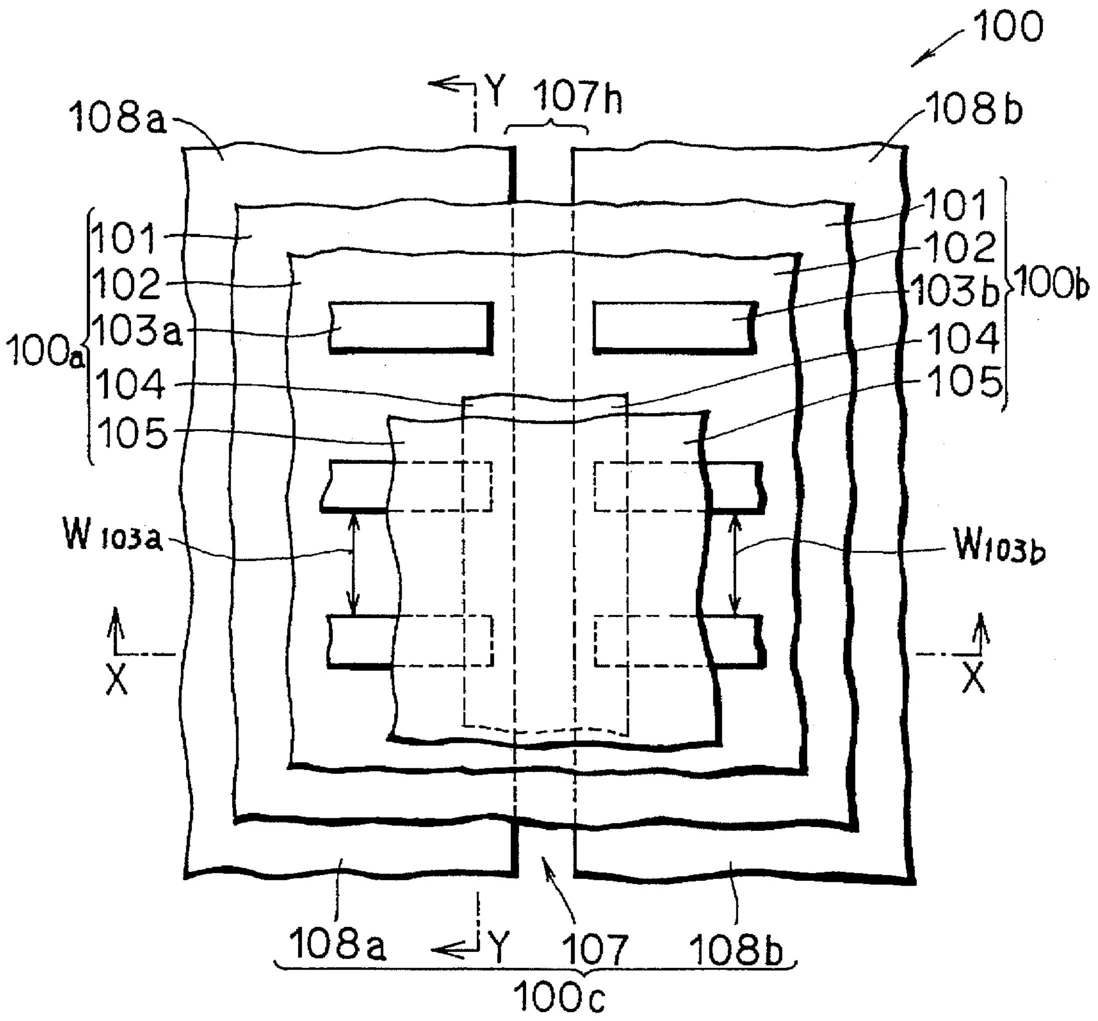
FIG. 34 is a plan view schematically showing a portion of a surface which is pressed onto a surface of a magnetic drum, viewed from a direction orthogonal to the rotation axis of the magnetic drum, of a recording head for a magnetic printer in accordance with an eighth embodiment of the present invention.

As shown in FIG. 34, several conductor portions 103*a* and 103*b* are formed parallel to each other with a prescribed space $W_{103a}$, $W_{103b}$ from each other in a direction of extension of the space 107*h*, and a pair of corresponding conductor portions 103*a* and 103*b* are arranged to be aligned in a line in the direction orthogonal to the space 107*h*.

In recording head 100 for a magnetic printer of the present embodiment also, when a current is applied to the conductor portion 103*a* or the conductor portion 103*b*, heating resistor 104 radiates heat. As the contact surface of heating resistor 104 to the magnetic recording medium has a convex semicircular or semielliptical shape, it can be efficiently pressed onto the magnetic recording medium, and by the heat from the heating resistor 104, thermal bias can be applied to the magnetic recording medium with high efficiency.

Materials, dimensional relations, functions and effects of various components of recording head 100 for a magnetic printer of the present embodiment are similar to those of the corresponding portions of other embodiments described above.

The structures of the first to eighth embodiments described above are simply examples of the present invention and not intended to limit the technical scope of the present invention. In the examples of the first to fifth embodiments, a non-magnetic layer is embedded in the space between the first and the second thermal head members and the magnetic gap of the magnetic head member. However, the present invention also covers such a recording head for a magnetic printer in that a such a space is an air gap. In the sixth to eighth embodiments above, examples in which the magnetic gap of the magnetic head member or the space between the first and the second thermal head member is an air gap have been mainly described. However, the present invention also covers a structure in which a non-magnetic layer is embedded in such a space in these embodiments.

Further, in the first to eighth embodiments above, the magnetic gap portion of the magnetic head member is orthogonal or approximately orthogonal to the conductor portions of the first and the second thermal head members. However, the magnetic gap portion of the magnetic head member may be formed with a prescribed angle of inclination with each of the conductor portions included in the first and the second thermal head members.

Further, in the present invention, thermal heads having various known structures may be adopted as the structures of the first and the second thermal head members, respectively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A recording head for a magnetic printer, comprising:

a first thermal head;

a second thermal head juxtaposed with said first thermal head with a prescribed linearly extending space therebetween; and a magnetic head positioned on said first thermal head and said second thermal head and having a magnetic gap extending, immediately above said space, linearly in a same linearly extending direction as said space.

2. The recording head for a magnetic printer according to claim 1, wherein said first thermal head and said second thermal head means and said magnetic head are formed integrally with at least a component shared by each other.

3. A recording head for a magnetic printer according to claim 1, wherein said first thermal head includes a first magnetic substrate, a first conductor portion formed on said first magnetic substrate, and first heating means for radiating heat when electric current is applied to said first conductor portion;

said second thermal head includes a second magnetic substrate, a second conductor portion formed on said second magnetic substrate, second heating means for radiating heat when electric current is applied to said second conductor portion; and said magnetic head has a structure including said first magnetic substrate and said second magnetic substrate, with a space between said first and second magnetic substrates serving as a magnetic gap.

4. A recording head for a magnetic printer according to claim 3, wherein said first heating means includes a first heating resistor bonded to a surface of said first conductor portion, and said second heating means includes a second heating resistor bonded to a surface of said second conductor portion.

5. A recording head for a magnetic printer according to claim 4, wherein said first heating resistor and said second heating resistor include a convex portion having approximately semicircular cross section.

6. A recording head for a magnetic printer according to claim 4, wherein said first heating resistor and said second heating resistor are directly formed on surfaces of said first conductor portion and said second conductor portion, and surfaces of said first heating resistor and said second heating resistor are covered by a protective film.

7. A recording head for a magnetic printer according to claim 4, wherein said first heating resistor and said second heating resistor include any selected from the group consisting of a $Ru_2O$ resistance paste, Ta-Si alloy, Ta-$SiO_2$, Ta-Si-C, $Ta_2N$, Ni-Cr alloy, Cr-Si-O and ZnN.

8. A recording head for a magnetic printer according to claim 3, wherein said first conductor portion is formed on said first magnetic substrate with a first heat insulating layer posed therebetween, and said second conductor portion is formed on said second magnetic substrate with a second heat insulating layer posed therebetween.

9. A recording head for a magnetic printer according to claim 8, wherein said heat insulating layer includes a material having low thermal conductivity selected from the group consisting of glass, polyimide, aromatic polyimide and polybenzimidazole.

10. A recording head for a magnetic printer according to claim 8, wherein a thickness of said heat insulating layer is from 20 μm to 200 μm.

11. A recording head for a magnetic primer according to claim 3, wherein a space between said first magnetic substrate and said second magnetic substrate and a space between said first conductor portion and said second conductor portion are filled by a same non-magnetic material.

12. A recording head for a magnetic printer according to claim 3, wherein said first heating means and said second heating means include a continuous common heating resistor.

13. A recording head for a magnetic printer according to claim 3, wherein said magnetic substrate includes a soft magnetic body selected from the group consisting of permalloy, Fe-Si alloy, Fe-Co alloy, Fe-Ni-Co alloy, Ni-Co alloy, Mn-Zn ferrite, Ni-Zn ferrite, Mg-Zn ferrite, Mg-Mn ferrite, sendust and an amorphous magnetic body.

14. A recording head for a magnetic printer according to claim 3, wherein a thickness of said magnetic substrate is from 0.2 mm to 5.0 mm.

15. A recording head for a magnetic printer according to claim 3, wherein said first conductor portion and said second conductor portion include a good electric conductor selected from the group consisting of Au, Pt and Cu.

16. A recording head for a magnetic printer according to claim 3, wherein a thickness of said first conductor portion and said second conductor portion is from 0.2 μm to 2.0 μm.

17. A recording head for a magnetic printer, comprising:

a first substrate having a first main surface and a second, rear main surface;

a first magnetic film formed on said main surface of said first substrate;

a first conductor portion formed on said second main surface of said first substrate;

a second substrate juxtaposed with said first substrate with a space therebetween, and having first and second main surfaces corresponding to said first main surface and said second main surface of said first substrate;

a second magnetic film formed on said first main surface of said second substrate;

a second conductor portion formed on said second main surface of the second substrate; and first heating means connected with said first conductor for radiating heat when electric current is applied to said first conductor portion and second heating means connected with said second conductor for radiating heat when electric current is applied to said second conductor portion; wherein said first substrate, said first conductor portion and said first heating means constitute a first thermal head, said second substrate, said second conductor portion and said second heating means constitute a second thermal head, and said first and second magnetic films constitute a magnetic head with a space therebetween serving as a magnetic gap.

18. A recording head for a magnetic printer according to claim 17, wherein said first heating means includes a first heating resistor bonded to a surface of said first conductor portion, and said second heating means includes a second heating resistor bonded to a surface of said second conductor portion.

19. A recording head for a magnetic printer according to claim 17, wherein said first heating means and said second heating means include an integral heating resistor bonded to each of said first conductor portion and said second conductor portion and formed continuous at a space between said first conductor portion and said second conductor portion.

20. A recording head for a magnetic printer according to claim 17, wherein said first heating means and said second heating means include a first heating resistor and a second heating resistor formed on the second main surfaces of said first substrate and said second substrate with a heat insulting layer interposed, respectively, and said first conductor portion and said second conductor portion are formed on surfaces of said first heating resistor and said second heating resistor opposite to said heat insulating layer.

21. The recording head for a magnetic printer according to claim 20, further comprising a glaze layer of a non-magnetic insulator interposed in a vicinity of a portion in contact with a space between said first conductor portion and said second conductor portion, between said first conductor portion and said first heating resistor and between said second conductor portion and said second heating resistor.

22. The recording head for a magnetic printer according to claim 17, wherein a thickness of said first substrate and said second substrate is from 0.2 mm to 5.0 mm.

23. The recording head for a magnetic printer according to claim 17, wherein material of said first substrate and said second substrate is a non-magnetic ceramics.

24. A recording head for a magnetic printer, comprising:

a substrate having a main surface ind a second, rear main surface;

a first magnetic film formed on said first main surface;

a second magnetic film formed on said first main surface juxtaposed with said first magnetic film with a space therebetween;

a first conductor portion formed corresponding to said first magnetic film on said second main surface;

a second conductor portion juxtaposed with said first conductor portion with a space therebetween, corresponding to said second magnetic film on said second main surface; and first heating means connected with said first conductor portion for radiating heat when electric current is applied to said first conductor portion and second heating means connected with said second conductor portion for radiating heat when electric current is applied to said second conductor portion; wherein said substrate, said first conductor portion and said first heating means constitute a first thermal head, said substrate, said second conductor portion and said second heating means constitute a second thermal head, said first and second magnetic films constitute a magnetic head with a space therebetween serving as a magnetic gap, and the space between said first magnetic film and said second magnetic film is arranged to extend immediately above a space between said first conductor portion and said second conductor portion in the same direction as said space.

25. The recording head for a magnetic printer according to claim 24, wherein said first heating means includes a first heating resistor bonded to a surface of said first conductor portion, and said second heating means includes a second heating resistor bonded to a surface of said second conductor portion.

26. A recording head for a magnetic printer according to claim 24, wherein said first heating means and said second heating means include an integral heating resistor bonded to surfaces of said first conductor portion and said second conductor portion and continuous at the space between said first conductor portion and said second conductor portion.

27. The recording head for a magnetic printer according to claim 24, wherein said first heating means and said second heating means include a first heating resistor and a second heating resistor formed on the second main surfaces of said first substrate and said second substrate with a heat insulating layer interposed, respectively, and said first conductor portion and said second conductor portion are formed on surfaces of said first heating resistor and said second heating resistor opposite to said heat insulating layer.

28. The recording head for a magnetic printer according to claim 27, further comprising a glaze layer of a non-magnetic insulator interposed in the vicinity of a portion in contact with the space between said first conductor portion and said second conductor portion, between said first conductor portion and said first heating resistor and between said second conductor portion and said second heating resistor.

29. The recording head for a magnetic printer according to claim 24, wherein a thickness of said first and second substrates is from 0.2 mm to 5.0 mm.

30. The recording head for a magnetic printer according to claim 24, wherein material of said first substrate and said second substrate is a non-magnetic ceramics.

* * * * *